United States Patent
Phan et al.

(10) Patent No.: US 12,460,178 B2
(45) Date of Patent: *Nov. 4, 2025

(54) METHOD OF INDUCING OR IMPROVING WOUND HEALING PROPERTIES OF MESENCHYMAL STEM CELLS

(71) Applicant: Cellresearch Corporation Pte. Ltd., Singapore (SG)

(72) Inventors: Toan Thang Phan, Singapore (SG); Gavin Tan, Singapore (SG)

(73) Assignee: Cellresearch Corporation Pte. Ltd., Singapore (SG)

( * ) Notice: Subject to any disclaimer, the term of this patent is extended or adjusted under 35 U.S.C. 154(b) by 803 days.

This patent is subject to a terminal disclaimer.

(21) Appl. No.: 16/382,071

(22) Filed: Apr. 11, 2019

(65) Prior Publication Data

US 2020/0325443 A1   Oct. 15, 2020
US 2021/0301252 A9   Sep. 30, 2021

Related U.S. Application Data

(60) Provisional application No. 62/656,531, filed on Apr. 12, 2018.

(51) Int. Cl.
*C12N 5/073* (2010.01)
*A61K 35/50* (2015.01)
*A61K 35/51* (2015.01)

(52) U.S. Cl.
CPC ............ *C12N 5/0605* (2013.01); *A61K 35/50* (2013.01); *A61K 35/51* (2013.01); *C12N 2501/12* (2013.01); *C12N 2501/15* (2013.01); *C12N 2501/165* (2013.01); *C12N 2501/17* (2013.01)

(58) Field of Classification Search
CPC .............. C12N 5/0605; C12N 2501/12; C12N 2501/15; C12N 2501/165; C12N 2501/17; A61K 35/50; A61K 35/51
See application file for complete search history.

(56) References Cited

U.S. PATENT DOCUMENTS

| | | | |
|---|---|---|---|
| 8,287,854 B2 | 10/2012 | Phan | |
| 9,085,755 B2 | 7/2015 | Phan et al. | |
| 9,737,568 B2 | 8/2017 | Phan et al. | |
| 9,844,571 B2 | 12/2017 | Phan et al. | |
| 10,988,736 B2 * | 4/2021 | Phan | C12N 5/0665 |
| | | | 435/325 |
| 2006/0078993 A1 | 4/2006 | Phan et al. | |
| 2008/0248005 A1 | 10/2008 | Phan | |
| 2010/0136681 A1 | 6/2010 | Arnaout | |
| 2013/0039893 A1 * | 2/2013 | Phan | G01N 27/44791 |
| | | | 435/377 |
| 2014/0315983 A1 | 10/2014 | Brown et al. | |
| 2014/0370600 A1 * | 12/2014 | Suh et al. | C12N 5/0675 |
| | | | 435/408 |
| 2015/0056144 A1 | 2/2015 | Aboody et al. | |
| 2021/0140942 A1 * | 5/2021 | Phan | G01N 33/5005 |
| | | | 435/41 |
| 2021/0254011 A1 * | 8/2021 | Phan | C12N 5/0665 |
| | | | 435/372 |

FOREIGN PATENT DOCUMENTS

| | | |
|---|---|---|
| CN | 1835751 | 9/2006 |
| CN | 1835751 A | 9/2006 |
| CN | 101040042 A | 9/2007 |
| CN | 101330935 A | 12/2008 |
| CN | 107338254 A | 11/2017 |
| JP | 2014-525262 A | 9/2014 |
| TW | 1773693 B | 8/2022 |
| TW | 202305117 A | 2/2023 |
| WO | 2004072273 A1 | 8/2004 |
| WO | 2006019357 A1 | 2/2006 |
| WO | 2007046775 A1 | 4/2007 |
| WO | 2017025729 A1 | 2/2017 |
| WO | 2017094879 A1 | 6/2017 |
| WO | 2017096607 A1 | 6/2017 |
| WO | 2018067071 A1 | 4/2018 |
| WO | 2019199230 A1 | 10/2019 |

OTHER PUBLICATIONS

Vu et al. Optimization of culture medium for the isolation and propagation of human breast cancer cells from primary tumour biopsies, Biomedical Research and Therapy, 2(2): 207-219 (Year: 2015).*

Choi et al. Different characteristics of mesenchymal stem cells isolated from different layers of full term placenta, Plos One, p. 1-17 (Year: 2017).*

U.S. Appl. No. 17/375,368, filed Jul. 2021, Phan, Toan, Thang.*

Jordan et al., Cell culture medium improvements by rigorous shuffling of components using media blending, Cytotechnology, 65: 31-40 (Year: 2013).*

Rafiq et al., Culture of human mesenchymal stem cells on microcarriers in a 5 l stirred-tank bioreactor, Biotechnol Lett, 35: 1233-1245. (Year: 2013).*

Ma et al., Immunobiology of mesenchymal stem cells, Cell Death and Differentiation, 21: 216-225. (Year: 2014).*

(Continued)

*Primary Examiner* — Arthur S Leonard
*Assistant Examiner* — Joseph Paul Miano
(74) *Attorney, Agent, or Firm* — Michael A. Whittaker

(57) ABSTRACT

The present invention relates to a method of inducing or improving wound healing properties of a mesenchymal stem cell population, the method comprising cultivating the mesenchymal stem cell population in a culture medium comprising DMEM (Dulbecco's modified eagle medium), F12 (Ham's F12 Medium), M171 (Medium 171) and FBS (Fetal Bovine Serum). The invention also relates to a mesenchymal stem population, wherein at least about 90% or more cells of the stem cell population express each of the following markers: CD73, CD90 and CD105 and lack expression of the following markers: CD34, CD45 and HLA-DR. The invention also relates to a pharmaceutical composition of this mesenchymal stem population.

10 Claims, 33 Drawing Sheets

Specification includes a Sequence Listing.

(56) References Cited

OTHER PUBLICATIONS

Written Opinion issued in PCT/SG2019/050204 dated Mar. 4, 2020 (9 pages).
International Search Report and Written Opinion issued in PCT/SG2019/050204 dated Aug. 7, 2019.
Subramanian et al, Comparative Characterization of Cells from the Various Compartments of the Human Umbilical Cord Shows that the Wharton's Jelly Compartment Provides the Best Source of Clinically Utilizable Mesenchymal Stem Cells. PLoS One. Jun. 10, 2015;10(6):e0127992 (25 pages).
Van Pham et al., Isolation and proliferation of umbilical cord tissue derived mesenchymal stem cells for clinical applications. Cell Tissue Bank. Jun. 2016;17(2):289-302.
Bao et al., The Role of Vascular Endothelial Growth Factor in Wound Healing. J Surg Res. May 15, 2009; 153(2): 347-358.
Beeravolu et al., Isolation and Characterization of Mesenchymal Stromal Cells from Human Umbilical Cord and Fetal Placenta. J Vis Exp. Apr. 3, 2017;(122).: e55224 (13 pages).
Bitto et al., Angiopoietin-1 gene transfer improves the impaired wound healing of the genetically diabetic mice without increasing VEGF expression. Clin Sci (Lond). Jun. 2008;114(12):707-718.
Conway et al, Hepatocyte growth factor regulation: An integral part of why wounds become chronic. Wound Repair Regen. Sep.-Oct. 2007;15(5):683-692.
Dominici et al., Minimal criteria for defining multipotent mesenchymal stromal cells. The International Society for Cellular Therapy position statement. Cytotherapy. 2006;8(4):315-317.
Froget et al., Wound healing mediator production by human dermal fibroblasts grown within a collagen-GAG matrix for skin repair in humans. Eur Cytokine Netw. Jan.-Mar. 2003;14(1):60-64.
Hanley et al., Efficient Manufacturing of Therapeutic Mesenchymal Stromal Cells Using the Quantum Cell Expansion System, Cytotherapy. Aug. 2014;16(8):1048-1058.
Jeschke et al., Umbilical Cord Lining Membrane and Wharton's Jelly-Derived Mesenchymal Stem Cells: the Similarities and Differences; The Open Tissue Engineering and Regenerative Medicine Journal, 2011;4:21-27.
Kundrotas, Surface markers distinguishing mesenchymal stem cells from fibroblasts. Acta Medica Lituanica. 2012;19(2):75-79.
Li et al., Mesenchymal stem cells modified with angiopoietin-1 gene promote wound healing. Stem Cell Res Ther. Sep. 16, 2013;4(5):113 (10 pages).
Li et al., HGF Accelerates Wound Healing by Promoting the Dedifferentiation of Epidermal Cells through β 1-Integrin/ILK Pathway. Biomed Res Int. 2013;2013:470418.
Life Technologies Corporation, catalogue No. M171500, Medium 171 . accessed online at https://www.thermofisher.com/order/catalog/product/M171500?SID=srch-hj-M171500 on Sep. 30, 2019.
Lonza catalog No. 12-604F, DMEM medium with L-GlutamineTM, and UltraGlutamineTM . Accessed online at : https://bioscience.lonza.com/lonza_bs/CH/en/search/?text=12-604F+ on Sep. 30, 2019.
Lonza catalog No. 12-719F, DMEM:F1. Accessed online at: https://bioscience.lonza.com/lonza_bs/CH/en/Culture-Media-and-Reagents/p/000000000000183938/Dulbecco%27s-Modified-Eagle-Medium%3AF12-%28DMEM%BAF12%29 on Sep. 30, 2019.
Pakyari et al., Critical Role of Transforming Growth Factor Beta in Different Phases of Wound Healing. Adv Wound Care (New Rochelle). Jun. 2013;2(5):215-224.
Ramirez et al., The Role of TGFβ Signaling in Wound Epithelialization . . . Adv Wound Care (New Rochelle). Jul. 1, 2014;3(7):482-491.

Schneider et al, Adipose-derived mesenchymal stem cells from liposuction and resected fat are feasible sources for regenerative medicine. Eur J Med Res. May 19, 2017;22(1):17 (11 pages).
Schugar et al., High Harvest Yield, High Expansion, and Phenotype Stability of CD146 Mesenchymal Stromal Cells from Whole Primitive Human Umbilical Cord Tissue. J Biomed Biotechnol. 2009;2009:789526 (11 pages).
Sensebe et al., Production of mesenchymal stromal/stem cells according to good manufacturing practices: a review. Stem Cell Res Ther. Jun. 7, 2013;4(3):66 (6 pages).
Sigma Aldrich, catalogue No. D5546, DMEM without L-glutamine. Accessed online at https://www.sigmaaldrich.com/catalog/product/sigma/d5546?lang=en&region=US on Sep. 30, 2019.
Sigma Aldrich, catalogue No. D6421, DMEM:F1. Accessed online at https://www.sigmaaldrich.com/catalog/product/sigma/d6421?lang=en&region=US on Sep. 30, 2019.
Sigma Aldrich, catalogue No. N4888, Nutrient Mixture F-12. Accessed online at https://www.sigmaaldrich.com/catalog/product/sigma/n4888?lang=en&region=US on Sep. 30, 2019.
Stubbendorf et al, Immunological Properties of Extraembryonic Human Mesenchymal Stromal Cells Derived from Gestational Tissue. Stem Cells And Development 2013;(19):2619-2629.
Talwadekar et al, Cultivation and Cryopreservation of Cord Tissue MSCs with Cord Blood AB Plasma. Biomed Res J 2014;1(2):126-136.
Talwadekar et al, Placenta-derived mesenchymal stem cells possess better immunoregulatory properties compared to their cord-derived counterparts—a paired sample study. Sci Rep. Oct. 28, 2015;5:15784 (12 pages).
Thermofisher Scientific, catalogue No. 11330057, DMEM/F-12. Accessed online at https://www.thermofisher.com/order/catalog/product/11330057?SID=srch-hj-11330057 on Sep. 30, 2019.
Thermofisher Scientific, catalogue No. 11765-054, Nutrient Mixture F-12. Accessed online at https://www.thermofisher.com/order/catalog/product/11765054?SID=srch-srp-11765054 on Sep. 30, 2019.
Thermofisher Scientific, catalogue No. 11965-084, DMEM. Accessed online at https://www.thermofisher.com/order/catalog/product/11965084?SID=srch-hj-11965-084 on Sep. 30, 2019.
Vonk et al., Autologous, allogeneic, induced pluripotent stem cell or a combination stem cell therapy? Where are we headed in cartilage repair and why: a concise review. Stem Cell Res Ther. May 15, 2015;6:94.
Yoshida et al., Neutralization of Hepatocyte Growth Factor Leads to Retarded Cutaneous Wound Healing Associated with Decreased Neovascularization and Granulation Tissue Formation. J Invest Dermatol. Feb. 2003;120(2):335-343.
Extended European Search Report issued in EP 19784508 dated Feb. 3, 2022 (7 pages).
Office Action issued by the JPO in Japanese Patent Application No. 2020-555404 dated Feb. 8, 2023—incl Engl lang trans (13 pages total).
Office Action issued by the Taiwanese Patent Office in parallel Taiwanese patent application No. 108112754 dated Aug. 18, 2023. received with English translation Nov. 29, 2023 (16 pages total).
Office Action issued by the PRC in Chinese Patent Application No. 201980039206.6 dated Oct. 12, 2023—incl Engl lang transl (26 pages total).
Office Action issued by CNIPA in Chinese Patent Application No. 201980039206.6 dated Nov. 15, 2024—incl Engl lang transl (20 pages total).

* cited by examiner

Fig. 1

world wide web:lonza.com
U.S. Scientific Support: 800-521-0390
scientific.support@lonza.com
EU/ROW Scientific Support: +49-221-99199-400
scientific.support.eu@lonza.com
Document # TS-12-604-3 08/11
© 2011 Lonza Walkersville, Inc.

Dulbecco's modified eagle medium (DMEM)

Product use

Dulbecco's modified eagle medium was developed in 1969 and is a modification of basal medium eagle (BME) that differs from BME and MEM by the following characteristics:
- Vitamins 4X greater than MEM. Vitamins and amino acids greater than BME
- Types and quantities of amino acids greater than MEM and BME
- Iron (ferric nitrate)

Description

- 12-604 With 4.5 g/L glucose, with L-glutamine
- 12-614 With 4.5 g/L glucose, without L-glutamine
- 12-707 With 1.0 g/L glucose, without L-glutamine
- 12-708 With 1.0 g/L glucose, and 25 mM HEPES buffer, without L-glutamine
- 12-709 With 4.5 g/L glucose, and 25 mM HEPES buffer, without L-glutamine
- 12-733 With 4.5 g/L glucose, without L-glutamine, without sodium pyruvate
- 12-741 With 4.5 g/L glucose, with L-glutamine, without sodium pyruvate
- 12-914 With 4.5 g/L glucose, without L-glutamine, screened to support hybridoma growth
- 12-917 With 4.5 g/L glucose, without L-glutamine or phenol red
- 15-604 With 4.5 g/L glucose, with L-glutamine, without sodium pyruvate, powder
- 15-614 With 4.5 g/L glucose, without L-glutamine or sodium pyruvate, powder
  (Powder formulations require the addition of 49.3 mL/L of NaHCO$_3$ 7.5% solution or 3.70 g/L of NaHCO$_3$ powder)

Quick reference chart

| | Glucose | L-glutamine | Phenol red | HEPES buffer | Sodium pyruvate |
|---|---|---|---|---|---|
| 12-604 | 4.5 g/L | + | + | − | + |
| 12-614 | 4.5 g/L | − | + | − | + |
| 12-707 | 1.0 g/L | − | + | − | + |
| 12-708 | 1.0 g/L | − | + | + | + |
| 12-709 | 4.5 g/L | − | + | + | + |
| 12-733 | 4.5 g/L | − | + | − | − |
| 12-741 | 4.5 g/L | + | + | − | − |
| 12-914 | 4.5 g/L | − | + | − | + |
| 12-917 | 4.5 g/L | − | − | − | + |

Fig. 2

Lonza Walkersville, Inc.
world wide web:lonza.com
biotechserv@lonza.com
Tech Service: 800-521-0390
Document # TS 12-615-2 11/08
Walkersville, MD 21793-0127 USA
© 2008 Lonza Walkersville, Inc.

Ham's F12 Medium

Product Use
Ham's F12 Medium is a nutrient mixture designed to cultivate a wide variety of mammalian and hybridoma cells when used with serum in combination with hormones and transferrin.

Specifications

| Sterility | pH | Osmolality (mOsm) |
|---|---|---|
| Negative | 7.07-7.40 | 266-305 |

| Cell Growth Generation | Endotoxin (EU/ml) |
|---|---|
| ≥75% of control | F10 |

Storage
2°C to 8°C

Product Use Statement
THESE PRODUCTS ARE FOR RESEARCH USE ONLY. Not approved for human or veterinary use, for application to humans or animals, or for use in clinical or *in vitro* procedures.

Ordering Information

| Catalog Number | Description | Size |
|---|---|---|
| 12-615F | Ham's F12 Medium with L-glutamine | 500 ml |

Fig. 3

world wide web.lonza.com
U.S. Scientific Support: 800-521-0390
scientific.support@lonza.com
EU/ROW Scientific Support: +49-221-99199-400
scientific.support.eu@lonza.com
Document # TS-12-719-3 08/11
© 2011 Lonza Walkersville, Inc.

DMEM: F12 (1:1) medium

Product use
DMEM combined with Hams F12 has been extensively used to demonstrate the effect of various hormones and growth factors on target tissues.

Description
| | |
|---|---|
| 12-719 | with L-glutamine, 15 mM HEPES, and 3.151 g/L glucose |
| 15-719 | powder – with L-glutamine, 15 mM HEPES, and 3.151 g/L glucose. Powdered medium requires the addition of 16.0 ml/L of NaHCO$_3$, 7.5% solution or 1.2 g/L NaHCO$_3$ powder |
| 04-687 | with 3.151 g/L glucose, with L-glutamine, without HEPES |

Specifications

| | Sterility | pH | Osmolality (mOsm) |
|---|---|---|---|
| 12-719 | Negative | 7.0-7.4 | 286-356 |
| 15-719* | Negative | 4.5-6.5 | 260-290 |
| 04-687 | Negative | FIO | FIO |

| | Cell growth promotion | Endotoxin (EU/ml) | Moisture |
|---|---|---|---|
| 12-719 | ≥ 75% of control | FIO | -- |
| 15-719* | ≥ 75% of control | ≤ 1 EU/ml | ≤ 2% |
| 04-687 | -- | FIO | -- |

* pH, osmolality, endotoxin, and moisture are done without NaHCO$_3$; NaHCO$_3$ is added for cell growth test.

Storage
2°C to 8°C

Product use statement
THESE PRODUCTS ARE FOR RESEARCH USE ONLY. Not approved for human or veterinary use, for application to humans or animals, or for use in clinical or in vitro procedures.

Ordering information

| Catalog number | Description | Size |
|---|---|---|
| 12-719F | DMEM: F12 with L-glutamine, 15 mM HEPES, and 3.151 g/L glucose | 500 ml |
| 12-719Q | DMEM: F12 with L-glutamine, 15 mM HEPES, and 3.151 g/L glucose | 1 L |
| 15-719D | DMEM: F12 powder – with L-glutamine, 15 mM HEPES, and 3.151 g/L glucose. Powdered medium requires the addition of 16.0 ml/L of NaHCO$_3$, 7.5% solution or 1.2 g/L NaHCO$_3$ powder | 1 x 10L |
| 04-687Q | DMEM: F12 with 3.151 g/L glucose, with L-glutamine, without HEPES | 1 L |

Fig. 4

Cascade Biologics™
invitrogen cell culture

invitrogen cell culture

Medium 171, Medium 171PRF, and MEGS

Medium 171
M-171-500
500 ml

Medium 171PRF
(Phenol Red-Free)
M-171PRF-500
500 ml

Product Description
Medium 171 and Medium 171PRF are sterile, liquid tissue culture media intended for use as one component in a complete culture environment for the growth of normal human mammary epithelial cells. Medium 171 is a basal medium containing essential and non-essential amino acids, vitamins, other organic compounds, trace minerals, and inorganic salts. Medium 171PRF is a phenol red-free version of Medium 171. These media do not contain antibiotics, antimycotics, hormones, growth factors, or proteins. These media are HEPES and bicarbonate buffered and are designed for use in an incubator with an atmosphere of 5% $CO_2$/95% air. To support plating and long-term proliferation of normal human mammary epithelial cells, these media must be supplemented with Mammary Epithelial Growth Supplement (MEGS, cat. no S-015-5).

Intended Use
Medium 171 is intended for use in the routine culture of normal human mammary epithelial cells. Medium 171PRF is intended for use by investigators who wish to culture normal human mammary epithelial cells in the absence of phenol red. When supplemented with MEGS, these media will support the plating and proliferation of normal human mammary epithelial cells at densities between 2.5 x $10^3$ cells/$cm^2$ and 8 x $10^4$ cells/$cm^2$. *This product is for research use only. Not for use in animals, humans, or diagnostic procedures.*

*Caution: If handled improperly, some components of this product may present a health hazard. Take appropriate precautions when handling this product, including the wearing of protective clothing and eyewear. Dispose of properly.*

Storage and Stability
Medium 171 and Medium 171PRF are stored at 4° C in our facility and are shipped at ambient temperature. Upon receipt, these media should be stored at 4° C and should not be frozen. Protect from light. Several components of these tissue culture media are light-labile, and we recommend that the media not be exposed to light for lengthy periods of time. If the media are warmed prior to use, do not exceed 37° C. When stored in the dark at 4° C, the product is stable until the expiration date on the label.

Preparation of Supplemented Medium 171
1. Thaw one bottle of MEGS. Take one bottle of Medium from cold storage. Make sure that the caps of the vessels are tight.
2. Gently swirl the bottle of supplement. Avoid splashing the supplement into the cap of the bottle or causing the supplement to foam.
3. Wipe the outside of the containers with a disinfecting solution such as 70% ethanol or isopropanol.
4. Using sterile technique in a laminar flow culture hood, transfer the entire contents of the bottle of supplement to the bottle of Medium.
5. Tightly cap the bottle of supplemented medium and swirl the contents to ensure a homogeneous solution. Avoid causing the medium to foam.

Storage and Stability of Supplemented Medium 171
Once Medium 171 or Medium 171PRF has been supplemented with MEGS, the supplemented medium should be stored in the dark at 4° C and should not be frozen. When stored in the dark at 4° C, the supplemented medium is stable for 1 month.

Selected References
The Medium 171 formulation is based on medium MCDB 170, with modifications.
Hammond SL, Ham RG, Stampfer MR; PNAS 81:5435-5439, 1984

*For research use only.*
Life Technologies Corporation • 5791 Van Allen Way • Carlsbad • CA 92008 • Tel: 800.955.6288 • wide web.invitrogen.com • E-mail: tech_support@invitrogen.com MAN0001535 Revised: 30 May 2009

Fig. 4 continued

Cascade Biologics™
invitrogen cell culture

invitrogen cell culture

MEGS
Mammary Epithelial Growth Supplement

Cat. no. S-015-5
5 ml

Product Description
Mammary Epithelial Growth Supplement (MEGS) is a sterile, concentrated (100X) solution intended for use as one component in a complete culture environment for the growth of normal human mammary epithelial cells. Each 5 ml bottle of MEGS contains all of the growth factors, hormones, and tissue extracts necessary for the culture of normal human mammary epithelial cells and is the correct amount of supplement for a 500 ml bottle of Medium 171 or Medium 171PRF. MEGS is an ionically-balanced supplement containing bovine pituitary extract (BPE), bovine insulin, hydrocortisone and recombinant human epidermal growth factor. When a 500 ml bottle of Medium 171 or Medium 171PRF is supplemented with MEGS, the final concentrations of the components in the supplemented medium are: BPE, 0.4% v/v; bovine insulin, 5 µg/ml; hydrocortisone, 0.5 µg/ml; and recombinant human epidermal growth factor, 3 ng/ml.

Intended Use
MEGS is intended for use in conjunction with Medium 171 or Medium 171PRF for the routine serum-free culture of normal human mammary epithelial cells. *This product is for research use only. Not for use in animals, humans, or diagnostic procedures.*

*Caution: If handled improperly, some components of this product may present a health hazard. Take appropriate precautions when handling this product, including the wearing of protective clothing and eyewear. Dispose of properly.*

Storage and Stability
MEGS is stored at –20° C at our facility and is shipped on dry ice. Upon receipt, the product should be stored at –20° C in a freezer that is not self-defrosting. When stored at –20° C, the product is stable until the expiration date shown on the label.

After long-term storage at –20° C, MEGS may contain a small amount of precipitate. This precipitate is formed from cold-insoluble material in the BPE component of the MEGS and will not affect the performance of the product.

Thawing
To thaw, place the product in a 37° C water bath or overnight at 4° C. If thawed in a water bath, do not leave the product at 37° C after the product has thawed. For instructions on adding MEGS to Medium 171, please refer to the instructions that accompany the basal medium.

Selected References
The MEGS formulation is based on published supplementation of medium MCDB 170, with modifications.

Hammond SL, Ham RG, Stampfer MR; PNAS 81:5435-5439, 1984.

Limited Use Label License No. 5: Invitrogen Technology
The purchase of this product conveys to the buyer the non-transferable right to use the purchased amount of the product and components of the product in research conducted by the buyer (whether the buyer is an academic or for-profit entity). The buyer cannot sell or otherwise transfer (a) this product (b) its components or (c) materials made using this product or its components to a third party or otherwise use this product or its components or materials made using this product or its components for Commercial Purposes. The buyer may transfer information or materials made through the use of this product to a scientific collaborator, provided that such transfer is not for any Commercial Purpose, and that such collaborator agrees in writing (a) not to transfer such materials to any third party, and (b) to use such transferred materials and/or information solely for research and not for Commercial Purposes. Commercial Purposes means any activity by a party for consideration and may include, but is not limited to: (1) use of the product or its components in manufacturing; (2) use of the product or its components to provide a service, information, or data; (3) use of the product or its components for therapeutic, diagnostic or prophylactic purposes; or (4) resale of the product or its components, whether or not such product or its components are resold for use in research. For products that are subject to multiple limited use label licenses, the terms of the most restrictive limited use label license shall control. Life Technologies Corporation will not assert a claim against the buyer of infringement of patents owned or controlled by Life Technologies Corporation which cover this product based upon the manufacture, use or sale of a therapeutic, clinical diagnostic, vaccine or prophylactic product developed in research by the buyer in which this product or its components was employed, provided that neither this product nor any of its components was used in the manufacture of such product. If the purchaser is not willing to accept the limitations of this limited use statement, Life Technologies is willing to accept return of the product with a full refund. For information on purchasing a license to this product for purposes other than research, contact Licensing Department, Life Technologies Corporation, 5791 Van Allen Way, Carlsbad, California 92008. Phone (760) 603-7200. Fax (760) 602-6500. Email: outlicensing@invitrogen.com.
©2009 Life Technologies Corporation. All rights reserved.
For research use only. Not intended for any animal or human therapeutic or diagnostic use.

*For research use only.*

Life Technologies Corporation • 5791 Van Allen Way • Carlsbad • CA 92008 • Tel: 800.955.6288 • world wide web:invitrogen.com • E-mail: tech_support@invitrogen.com MAN0001585
Revised: 30 May 2009

Fig. 5

PTT6 Medium ingredients list

| Medium composition List | Company Name | Catalogue Number |
|---|---|---|

Basic media

| Medium composition List | Company Name | Catalogue Number |
|---|---|---|
| DMEM (also referred to herein as PTT6-basal medium) | Lonza | 12-604F |
| DMEM/F12 | Lonza | 12-719F |
| M171 | Life technologies | M171500 |

Serum

| Medium composition List | Company Name | Catalogue Number |
|---|---|---|
| Fetal Bovine Serum | GE Healthcare | A15-151 |

Antibiotic

| Medium composition List | Company Name | Catalogue Number |
|---|---|---|
| Penicillin-Streptomycin-Amphotericin B | Lonza | 17-745E |

Supplements

| Medium composition List | Company Name | Catalogue Number |
|---|---|---|
| Adenine (optional) | Sigma | A8626-25G |
| Hydrocortisone (optional) | Sigma | H-0888 |
| Epidermal Growth Factor | Millipore | GF-144 |
| T3 (3,3',5-Triiodo-L-thyronine sodium salt) (optional) | Sigma | 200-223-5 |
| Recombinant Human Insulin AOF | Life Technologies | A11382IJ |

| | 1 | 2 | 3 | 4 | 5 | 6 | 7 | 8 | 9 | 10 | 11 | 12 |
|---|---|---|---|---|---|---|---|---|---|---|---|---|
| A | | Std. 1 | | CL-MSC in PTT4 | | | | Std. 1 | | CL-MSC in PTT6 | | |
| B | | Std. 2 | | WJ-MSC in PTT4 | | | | Std. 2 | | WJ-MSC in PTT6 | | |
| C | | Std. 3 | | AT-MSC in PTT4 | | | | Std. 3 | | AT-MSC in PTT6 | | |
| D | | Std. 4 | | BM-MSC in PTT4 | | | | Std. 4 | | BM-MSC in PTT6 | | |
| E | | Std. 5 | | CL-MSC in PTT4 | | | | Std. 5 | | CRootA | | |
| F | | Std. 6 | | WJ-MSC in PTT4 | | | | Std. 6 | | CRootC | | |
| G | | Std. 7 | | AT-MSC in PTT4 | | | | Std. 7 | | CRootD | | |
| H | | Blank | | BM-MSC in PTT4 | | | | Blank | | CRootC | | |

Figure 8

METHOD OF INDUCING OR IMPROVING WOUND HEALING PROPERTIES OF MESENCHYMAL STEM CELLS

The present application claims the benefit of priority of U.S. Provisional Application No. 62/656,531 filed Apr. 12, 2018, the content of which is hereby incorporated by reference it its entirety for all purposes.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

SEQUENCE LISTING

The instant application contains a Sequence Listing which has been submitted in ASCII format via EFS-Web and is hereby incorporated by reference in its entirety. Said ASCII copy, created on Apr. 11, 2019, is named SCH-4500-UT-_SeqListing.txt and is 58 kilobytes in size.

FIELD OF THE INVENTION

The present invention relates to a method of inducing or improving wound healing properties of a mesenchymal stem cell population. The invention is also directed to a cell culture medium suitable for inducing or improving wound healing properties of mesenchymal stem cells and/or suitable for isolating a mesenchymal stem cell population. The invention is also directed to a pharmaceutical composition and uses of the isolated mesenchymal stem cell population. The invention is also directed to methods of treating a disease or disorder comprising administering a mesenchymal stem cell population or a pharmaceutical composition containing such a mesenchymal stem cell population of the invention to a subject in need thereof. The invention is also directed to an extremely homogenous and well-defined mesenchymal stem cell population, for example of the umbilical cord or of the placenta.

BACKGROUND OF THE INVENTION

Mesenchymal stem cells isolated from the amniotic membrane of the umbilical cord have been first reported in US patent application 2006/0078993 (leading to granted U.S. Pat. Nos. 9,085,755, 9,737,568 and 9,844,571) and the corresponding International patent application WO2006/019357. Since then, the umbilical cord tissue has gained attention as a source of multipotent cells; due to its widespread availability, the umbilical cord and in particular stem cells isolated from the amniotic membrane of the umbilical cord (also referred to as "cord lining stem cells") have been considered as an excellent alternative source of cells for regenerative medicine. See, Jeschke et al. Umbilical Cord Lining Membrane and Wharton's Jelly-Derived Mesenchymal Stem Cells: the Similarities and Differences; The Open Tissue Engineering and Regenerative Medicine Journal, 2011, 4, 21-27.

A subsequent study compared the phenotype, proliferation rate, migration, immunogenicity, and immunomodulatory capabilities of human mesenchymal stem cells (MSCs) derived from the amniotic membrane of the umbilical cord (umbilical cord lining (CL-MSCs), umbilical cord blood (CB-MSCs), placenta (P-MSCs), and Wharton's jelly (WJ-MSCs) (Stubbendorf et al, Immunological Properties of Extraembryonic Human Mesenchymal Stromal Cells Derived from Gestational Tissue, STEM CELLS AND DEVELOPMENT Volume 22, Number 19, 2013, 2619-2629). Stubbendorf et al concluded that extraembryonic gestational tissue-derived MSC populations show a varied potential to evade immune responses as well as exert immunomodulatory effects. The authors also found that CL-MSCs showed the most promising potential for a cell-based therapy, as the cells showed low immunogenicity, but they also showed enhanced proliferative and migratory potential so that future research should concentrate on the best disease models in which CL-MSCs could be administered.

While mesenchymal stem cells of the amniotic membrane can easily be obtained using the protocol as described in US patent application 2006/0078993 and International patent application WO2006/019357, it would be of advantage for clinical trials with these cord lining MSC to have at hand a method that allows to isolate a population of these cord lining MSC's that is highly homogenous and can thus be used for clinical trials. In addition, it would be an advantage to have at hand a method that induces or improves wound healing properties of a mesenchymal stem cell population in general.

Accordingly, it is an object of the invention to provide a method of inducing or improving wound healing properties of a mesenchymal stem cell population. It is also an object to isolate a population of mesenchymal stem cells from the amniotic membrane of umbilical cord that meets this need. It is thus also an object of the invention to provide a highly homogenous population of mesenchymal stem cells.

SUMMARY OF THE INVENTION

This object is accomplished by the methods, the mesenchymal stem population, the respective pharmaceutical composition and cell culture medium having the features of the independent claims.

In a first aspect, the invention provides a method of inducing or improving wound healing properties of a mesenchymal stem cell population, method comprising cultivating the mesenchymal stem cell population in a culture medium comprising DMEM (Dulbecco's modified eagle medium), F12 (Ham's F12 Medium), M171 (Medium 171) and FBS (Fetal Bovine Serum). The mesenchymal stem cell population may be a mesenchymal stem cell population of the umbilical cord, a placental mesenchymal stem cell population, a mesenchymal stem cell population of the cord blood, a mesenchymal stem cell population of the bone marrow, or an adipose-tissue derived mesenchymal stem cell population.

In a second aspect, the invention provides an isolated mesenchymal stem population, wherein at least about 90% or more cells of the stem cell population express each of the following markers: CD73, CD90 and CD105. Preferably, the isolated mesenchymal stem population lack expression of the following markers: CD34, CD45 and HLA-DR. In embodiments of this second aspect, at least about 91% or more, about 92% or more, about 93% or more, about 94% or more, about 95% or more, about 96% or more, about 97% or more, about 98% or more about 99% or more cells of the isolated mesenchymal stem cell population express each of CD73, CD90 and CD105. In addition, in these embodiments of the second aspect, at least about 91% or more, about 92% or more, about 93% or more, about 94% or more, about 95% or more, about 96% or more, about 97% or more, about 98% or more about 99% or more cells of the isolated mesenchymal stem cell population preferably lack expression of the markers CD34, CD45 and HLA-DR. The mesenchymal stem cell population may be obtained by a method of inducing or improving wound healing properties of the first aspect. Thus, the method of the first aspect can also be a method of isolating a mesenchymal stem cell population.

In a third aspect, the invention provides a pharmaceutical composition containing a mammalian cell of (the second aspect of) the invention.

In a fourth aspect, the invention provides a method of making a culture medium for either inducing or improving wound healing properties of a mesenchymal stem cell population or for isolating a mesenchymal stem cell population, the method comprising mixing to obtain a final volume of 500 ml culture medium:
  i. 250 ml of DMEM
  ii. 118 ml M171
  iii. 118 ml DMEM/F12
  iv. 12.5 ml Fetal Bovine Serum (FBS) to obtain a final concentration of 2.5% (v/v).

In a fifth aspect, the invention provides a cell culture medium obtainable by the method of the fourth aspect.

In a sixth aspect, the invention provides a method of isolating a mesenchymal stem cell population, comprising cultivating the mesenchymal stem cell population in the culture medium prepared by the method of the fourth aspect.

In a seventh aspect, the invention provides a cell culture medium comprising:
  DMEM in the final concentration of about 55 to 65% (v/v),
  F12 in a final concentration of about 5 to 15% (v/v),
  M171 in a final concentration of about 15 to 30% (v/v) and
  FBS in a final concentration of about 1 to 8% (v/v).

In an eight aspect, the invention provides the use of a cell culture medium of the seventh aspect for inducing or improving wound healing properties of a mesenchymal stem cell population or for isolating the mesenchymal stem cell population.

BRIEF DESCRIPTION OF THE DRAWINGS

The invention will be better understood with reference to the detailed description when considered in conjunction with the non-limiting examples and the drawings, in which:

FIG. 1 shows the technical information sheet of Lonza for Dulbecco's modified eagle medium, including the catalogue number of the DMEM used for the making of the illustrative example of a medium of the invention (PTT-6) in the Experimental Section;

FIG. 2 shows the technical information sheet of Lonza for Ham's F12 medium;

FIG. 3 shows the technical information sheet of Lonza for DMEM:F12 (1:1) medium, including the catalogue number of the DMEM:F12 (1:1) medium used for the making of the illustrative example of a medium of the invention (PTT-6) in the Experimental Section;

FIG. 4 shows the technical information sheet of Life Technologies Corporation for M171 medium, including the catalogue number of the M171 medium used for the making of the illustrative example of a medium of the invention (PTT-6) in the Experimental Section;

FIG. 5 shows the list of ingredients, including their commercial supplier and the catalogue number that have been used in the Experimental Section for the making of the medium PTT-6.

In more detail, FIG. 6A shows the percentage of isolated mesenchymal cord lining stem cells expressing stem cell markers CD73, CD90 and CD105 after isolation from umbilical cord tissue and cultivation in DMEM/10% FBS.

FIG. 6B shows the percentage of isolated mesenchymal cord lining stem cells expressing stem cell markers CD73, CD90 and CD105 after isolation from umbilical cord tissue and cultivation in PTT-4.

FIG. 6C shows the percentage of isolated mesenchymal cord lining stem cells expressing stem cell markers CD73, CD90 and CD105 after isolation from umbilical cord tissue and cultivation in PTT-6.

FIG. 7A shows the percentage of isolated mesenchymal cord lining stem cells that express the stem cell markers CD73, CD90 and CD105 and lack expression of CD34, CD45 and HLA-DR after isolation from umbilical cord tissue and cultivation in PTT-6 medium.

FIG. 7B shows the percentage of isolated bone marrow mesenchymal stem cells that express CD73, CD90 and CD105 and lack expression of CD34, CD45 and HLA-DR.

FIG. 8 shows a set up of the experiments with dark grey wells, standards reconstituted with PTT-4 medium and corresponding samples from MSCs cultured in PTT-4; Light grey wells, standards reconstituted with PTT-6 medium and corresponding samples from MSCs cultured in PTT-6. Samples in italic are control supernatants that are being tested as part of recurrent testing of stored samples.

DETAILED DESCRIPTION OF THE INVENTION

Figure 6A:
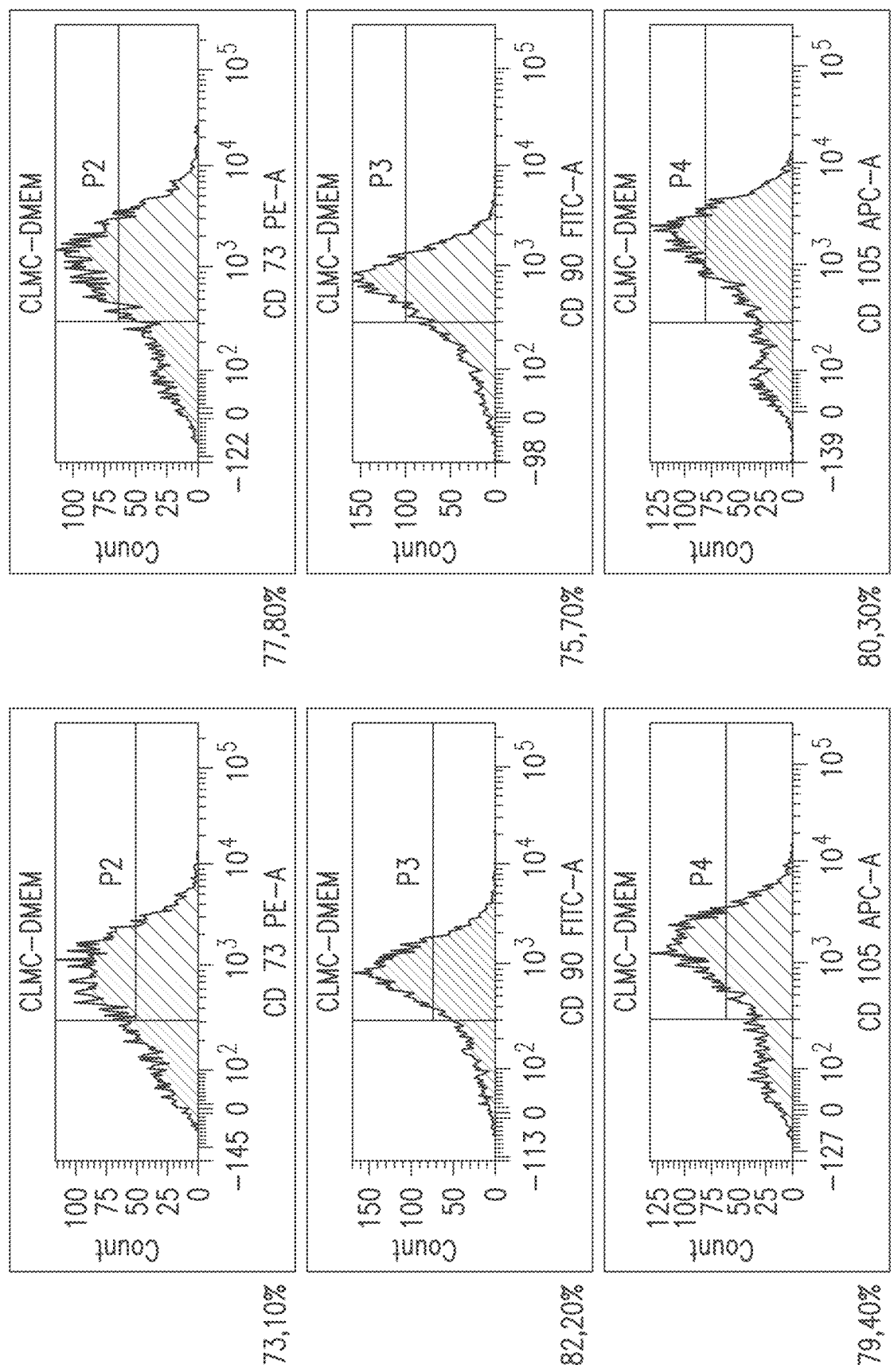
FIGS. 6A-C show the results of flow cytometry experiments in which mesenchymal stem cells isolated from the umbilical cord have been analysed for the expression of the mesenchymal stem cell markers CD73, CD90 and CD105. For these experiments, mesenchymal stem cells were isolated from umbilical cord tissue by cultivation of the umbilical cord tissue in three different cultivation media, followed by subculturing of the mesenchymal stem cells in the respective medium. The three following culture media were used in these experiments: a) 90% (v/v/DMEM supplemented with 10% FBS (v/v), b) the culture medium PTT-4 described in US patent application US 2008/0248005 and the corresponding International patent application WO2007/046775 that consist of 90% (v/v) CMRL1066, and 10% (v/v) FBS (see paragraph [0183] of WO2007/046775 and c) the culture medium of the present invention PTT-6 the composition of which is described herein. In this flow cytometry analysis, two different samples of the cord lining mesenchymal stem cell (CLMC) population were analysed for each of the three used culture media. The results are shown in FIG. 6A to FIG. 6C.

As explained above, in a first aspect the invention is directed to a method of inducing or improving wound healing properties of a mesenchymal stem cell population, the method comprising cultivating the mesenchymal stem cell population in a culture medium comprising DMEM (Dulbecco's modified eagle medium), F12 (Ham's F12 Medium), M171 (Medium 171) and FBS (Fetal Bovine Serum). It has been surprisingly found in the present application that using such a medium has the effect of inducing or improving wound healing properties of a wide range of mesenchymal stem cell population, irrespective of the natural environment/compartment of the mesenchymal stem population. Without wishing to be bound by theory, it is believed that the induction or improvement of the wound healing properties of the mesenchymal stem cell population is caused by the ability of the medium of the present invention to increase the expression and/or secretion of at least one, two, three or all four of Angiopoietin 1 (Ang-1), TGF-β1, VEGF, and HGF by the mesenchymal stem cell population. Cf. the Experimental Section showing that the expression/secretion of Angiopoietin 1 (Ang-1), TGF-β1, VEGF, and HGF by a mesenchymal stem cell population of the amniotic membrane of umbilical cord is increased by cultivation in the culture medium of the present invention PTT-6 relative to cultivation of such mesenchymal stem cell population in a medium (PTT-4) that has been used in US patent application US 2008/0248005 and the corresponding International patent application WO2007/046775 for the isolation of a mesenchymal stem cell population of the amniotic membrane of umbilical cord which was shown in US patent application US 2008/0248005 and International patent application WO2007/046775 to have excellent wound healing properties (cf. Examples 23-26 of WO 2007/046775 showing that such a mesenchymal stem cell population of the amniotic membrane of the umbilical cord (UCMC) alleviate full thickness burns (Example 23), partial-thickness wounds (Example 24), non-healing radiation wound (Example 25) as well as non-healing diabetic wound and non-healing diabetic foot wounds (Example 26)). As shown in the experimental section herein cultivation in a medium comprising DMEM (Dulbecco's modified eagle medium), F12 (Ham's F12 Medium), M171 (Medium 171) and FBS (Fetal Bovine Serum), increases the amounts of Angiopoietin 1 (Ang-1), TGF-β1, VEGF, and/or HGF not only in mesenchymal stem cell population of the amniotic membrane of umbilical cord but also in mesenchymal stem cell populations of other compartments of the umbilical cord such as Wharton's Jelly or of a (neighbouring) compartment such as the placenta. Thus, it is believed that the present application provides a generally applicable teaching to induce or improve wound healing properties of a given mesenchymal stem population by cultivating the mesenchymal stem cell population in a medium of the invention such as the medium PTT-6.

In this context, the finding of the present invention that a combined increase in the amount of Ang-1, TGF-β1, VEGF, and/or HGF that a mesenchymal stem cell population produces is to improve or improve the wound healing properties of this stem cell population also open up to mimicking the wound healing properties of the stem cell population by an composition/solution that contains three or four of Ang-1, TGF-β1, VEGF, or HGF as the only wound healing proteins.

In this context, it is noted that involvement of the proteins Angiopoietin 1 (Ang-1), TGF-β1, VEGF, and HGF in the wound healing process is known to the person skilled in the art. For the involvement of Angiopoietin 1 in wound healing, see, for example, Li et al. Stem Cell Research & Therapy 2013, 4:113 "Mesenchymal stem cells modified with angiopoietin-1 gene promote wound healing" or Bitto et al, "Angiopoietin-1 gene transfer improves the impaired wound healing of the genetically diabetic mice without increasing VEGF expression", Clinical Science May 14, 2008, 114 (12) 707-718. In the study of Li et al, the angiopoietin-1 gene was inserted into bone marrow mesenchymal stem cells and the results showed that that"Ang1-MSCs significantly promoted wound healing with increased epidermal and dermal regeneration, and enhanced angiogenesis compared with MSCs, Ad-Ang1 or sham treatment." Notably, Li et al authors state that mesenchymal stem cells (MSCs) alone do not produce enough Ang-1 and for this reason, the authors inserted the Ang1-gene into the MSC to come up with a genetically modified cell. In contrast to the study of Li, it has been surprisingly found in the present application that cultivation of "natural" mesemchymal stem cells in a culture medium such as PTT-6 provide conditions under which for example, cord tissue mesenchymal stem cells (i.e. a mesenchymal stem cell population that is cultivated in PTT-6) produce increased level of Ang-1 and thus render the mesenchymal stem cells suitable for wound healing or further improve their wound healing properties. This means the present invention provides the advantage that instead of genetically modifying naturally occurring mesenchymal stems to induce wound healing properties in mesenchymal stem cells (which is not only laboursome but also not a preferred option for therapeutic applications because of the inherent risks of gene therapy) the wound healing properties of naturally occurring mesenchymal stem cells are induced or enhanced by "simple" cultivation of a mesenchymal stem cell population in the culture medium of the invention. This approach is easier, safer and also more cost efficient.

Reverting to the other proteins that, for the involvement of Hepatocyte Growth Factor (HGF) in wound healing, in particular healing of chronic/non-healing wounds, see for example, Yoshida et al., "Neutralization of Hepatocyte Growth Factor Leads to Retarded CutaneousWound Healing Associated with Decreased Neovascularization and Granulation Tissue Formation" J. Invest. Dermatol. 120:335-343, 2003, Li, Jin-Feng et al. "HGF Accelerates Wound Healing by Promoting the Dedifferentiation of Epidermal Cells through β1-Integrin/ILK Pathway." BioMed Research International 2013 (2013): 470418 or Conway et al, "Hepatocyte growth factor regulation: An integral part of why wounds become chronic". Wound Rep Reg (2007) 15 683-692.

For the involvement of Vascular Endothelial Growth Factor (VEGF) in wound healing, in particular healing of chronic/non-healing wounds, see for example Froget et al., Eur. Cytokine Netw., Vol. 14, March 2003, 60-64 or Bao et al., "The Role of Vascular Endothelial Growth Factor in Wound Healing" J Surg Res. 2009 May 15; 153(2): 347-358.

For the involvement of Transforming Growth Factor Beta (including TGF-β1, TGF-β2, and TGF-β3) in wound healing, in particular healing of chronic/non-healing wounds see for example, Ramirez et al. "The Role of TGFb Signaling in Wound Epithelialization" Advances In Wound Care, Volume 3, Number 7, 2013, 482-491 or Pakyari et al., Critical Role of Transforming Growth Factor Beta in Different Phases of Wound Healing, Advances In Wound Care, Volume 2, Number 5, 2012, 215-224.

In this context, it is also noted that the present invention has the further surprising advantage that cultivation in the culture medium of the present invention provides for the isolation of a mesenchymal stem cell population such as an mesenchymal stem cell population of the amniotic membrane of umbilical cord of which more than 90%, or even 99% or more of the cells are positive for the three mesenchymal stem cell markers CD73, CD90 and while at the same these stem cells lack expression of CD34, CD45 and HLA-DR (see the Experimental Section), meaning 99% or even more cells of this population express the stem cell markers CD73, CD90 and CD105 while not expressing the markers CD34, CD45 and HLA-DR. Such an extremely homogenous and well-defined cell population is the ideal candidate for clinical trials and cell-based therapies since, they for example, fully meet the criteria generally accepted for human mesenchymal stem cells to be used for cellular therapy as defined, for example, by Dominici et al, "Minimal criteria for defining multipotent mesenchymal stromal cells. The International Society for Cellular Therapy position statement", Cytotherapy (2006) Vol. 8, No. 4, 315-317, Sensebe et al., "Production of mesenchymal stromal/stem cells according to good manufacturing practices: a, review", Stem Cell Research & Therapy 2013, 4:66), Vonk et al., Stem Cell Research & Therapy (2015) 6:94, or Kundrotas Acta Medica Lituanica. 2012. Vol. 19. No. 2. P. 75-79. Also, using a bioreactor such as a Quantum Cell Expansion System, it is possible to obtain high numbers of mesenchymal stem cells such as 300 to 700 million mesenchymal stem cells per run (see also the Experimental Section). Thus, the present invention provides the further advantage to provide the amounts of stem cells that are needed for therapeutic applications such as their use in wound healing in a cost efficient manner. In addition, all components used for making the culture medium of the present invention are commercially available in GMP quality. Accordingly, the present invention opens the route to the GMP production of a highly homogenous mesenchymal stem cell population, for example of placental tissue or umbilical cord tissue, for example, a mesenchymal stem cell population of the amniotic membrane of the umbilical cord or a mesenchymal stem cell population of Wharton's jelly.

The mesenchymal stem cell population that is being rendered suitable for wound healing (either by inducing wound healing properties in a population that had no wound healing properties before undergoing the cultivation process of the invention or by improving the wound healing properties) may be any suitable mesenchymal stem cell known in the art, for example, an adult stem cell population or a neonatal stem cell. The mesenchymal stem cell population may be derived from any mammalian tissue or compartment/body part known to contain mesenchymal stem cells. In illustrative examples, the mesenchymal stem cell population may be a mesenchymal stem cell population of the umbilical cord (these are examples of neonatal stem cells), a placental mesenchymal stem cell population (also a further example of neonatal stem cells), a mesenchymal stem cell population of the cord-placenta junction (a further example of a neonatal stem cell population), a mesenchymal stem cell population of the cord blood (yet a further example of neonatal stem cells), a mesenchymal stem cell population of the bone marrow (which may be an adult stem cell population), or an adipose-tissue derived mesenchymal stem cell population (yet an another example of an adult stem cell population).

The mesenchymal stem cell population of the umbilical cord may be (derived) from any compartment of umbilical cord tissue that contains mesenchymal stem cells. The mesenchymal stem cell population may be a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord but also a mixed mesenchymal stem cell population of the umbilical cord (MC), meaning a population of mesenchymal stem cells that includes stem cells of two or more of these compartments. Mesenchymal stem cells of these compartments and the isolation therefrom are known to the person skilled in the art and are described, for example, by Subramanian et al "Comparative Characterization of Cells from the Various Compartments of the Human Umbilical Cord Shows that the Wharton's Jelly Compartment Provides the Best Source of Clinically Utilizable Mesenchymal Stem Cells", PLoS ONE 10(6): e0127992, 2015 and the references cited therein, Van Pham et al. "Isolation and proliferation of umbilical cord tissue derived mesenchymal stem cells for clinical applications", Cell Tissue Bank (2016) 17:289-302, 2016. A mixed mesenchymal stem cell population of the umbilical cord can, for example, be obtained by removing the arteries and veins from the umbilical cord tissue, cutting the remaining tissue and the Wharton's jelly into piece and and cultivating the umbilical cord tissue (by tissue explant) in the culture medium of the present invention. A mixed mesenchymal stem cell population of the umbilical cord may also be obtained by culturing entire umbilical cord tissue with intact umbilical vessels as tissue explant under the conditions (cultivation in serum-supplemented DMEM with 10% fetal bovine serum, 10% horse serum, and 1% Penicillin/Streptomycin) as described by Schugar et al. "High harvest yield, high expansion, and phenotype stability of CD146 mesenchymal stromal cells from whole primitive human umbilical cord tissue. Journal of biomedicine & biotechnology. 2009; 2009:789526". In this context, it is noted that a mesenchymal stem cell population of the cord-placenta junction can be isolated as described by Beeravolu et al. "Isolation and Characterization of Mesenchymal Stromal Cells from Human Umbilical Cord and Fetal Placenta." J Vis Exp. 2017; (122): 55224.

In accordance with the above, it is noted here that the mesenchymal stem cell population that is cultivated in the present invention in a culture medium comprising DMEM (Dulbecco's modified eagle medium), F12 (Ham's F12 Medium), M171 (Medium 171) and FBS (Fetal Bovine Serum) to induce or improve its wound healing properties can be isolated from its natural environment prior to cultivation in the culture medium of the present invention. Such an approach is in particular used for mesenchymal stem cell population that cannot easily be isolated by tissue explant such as a mesenchymal stem cell population of the cord blood or a mesenchymal stem cell population of the bone marrow. This approach can however also be taken for a mesenchymal stem cell population of the umbilical cord, a mesenchymal stem cell population of the placenta or an adipose-tissue derived mesenchymal stem cell population. Such a stem cell population, say a mesenchymal stem cell population of Wharton's jelly may first be isolated as described above by Subramanian et al, 2015, PLoS ONE, supra or International Patent application WO 2004/072273 "Progenitor Cells From Wharton's Jelly Of Human Umbilical Cord" and then be subjected to cultivation of the isolated mesenchymal stem cell population in the culture medium of the present invention that comprises DMEM (Dulbecco's modified eagle medium), F12 (Ham's F12 Medium), M171 (Medium 171) and FBS (Fetal Bovine Serum). Also a placental mesenchymal stem cell population may be isolated from placenta as described in European patent application EP1 288 293, Talwadekar et al, "Cultivation and Cryopreservation of Cord Tissue MSCs with Cord Blood AB Plasma" Biomed Res J 2014; 1(2):126-136, Talwadekar et al, "Placenta-derived mesenchymal stem cells possess better immunoregulatory properties compared to their cord-derived counterparts—a paired sample study" Scientific Reports 5:15784 (2015), or Beeravolu et al. "Isolation and Characterization of Mesenchymal Stromal Cells from Human Umbilical Cord and Fetal Placenta." J Vis Exp. 2017; (122): 55224, for example, and subsequently cultivated in the culture medium of the present invention. Likewise, an adipose-tissue derived mesenchymal stem cell population may be isolated as described by Schneider et al, "Adipose-derived mesenchymal stem cells from liposuction and resected fat are feasible sources for regenerative medicine" Eur J Med Res. 2017; 22: 17 as the references cited therein and subsequently cultivated in the culture medium of the present invention (cf, also the Experimental Section). As a further illustrative example, also a mesenchymal stem cell population of the cord-placenta junction can first be isolated as described by Beeravolu et al. "Isolation and Characterization of Mesenchymal Stromal Cells from Human Umbilical Cord and Fetal Placenta." J Vis Exp. 2017; (122): 55224 and subsequently cultivated in the culture medium of the present invention.

Alternatively, and in particular for mesenchymal stem cells that can be isolated by means of tissue explants, the mesenchymal stem cell population can be isolated directly from its natural tissue environment by cultivating the natural tissue in the cell culture medium of the invention. Such a methodology is particularly suited for cultivation of mesenchymal stem cell populations from umbilical cord tissue, placental tissue (the placental tissue may, for example, comprise or be the amniotic membrane of placenta) or from the cord-placenta junction.

In this context, it is noted that the culture medium of the present invention therefore also allows the isolation of a mesenchymal stem cell population (also referred hereas as "mesenchymal stem cells") from its natural environment. Accordingly, the culture medium of the present invention also isolation of a mesenchymal stem cell population under conditions that allow cell proliferation of the mesenchymal stem/progenitor cells without differentiation of the mesenchymal stem/progenitor cells.

In one embodiment, the culture medium of the present invention allows the isolation of mesenchymal stem cell population from the amniotic membrane under conditions that allow cell proliferation of the mesenchymal stem/progenitor cells without differentiation of the mesenchymal stem/progenitor cells. Thus, after isolation of the mesenchymal stem cells from the amniotic membrane as described herein the isolated mesenchymal stem/progenitor cell population has the capacity to differentiate into multiple cell types as described in US patent application 2006/0078993, U.S. Pat. No. 9,085,755, International patent application WO2006/019357, U.S. Pat. No. 8,287,854 or WO2007/046775, for instance. As described in US patent application 2006/0078993, for example, the mesenchymal stem cells of the amniotic membrane of the umbilical cord have a spindle shape, express the following genes: POU5f1, Bmi-1, leukemia inhibitory factor (LIF), and secrete Activin A and Follistatin. The mesenchymal stem cells isolated in the present invention can, for example, be differentiated into any type of mesenchymal cell such as, but not limited to, skin fibroblasts, chondrocytes, osteoblasts, tenocytes, ligament fibroblasts, cardiomyocytes, smooth muscle cells, skeletal muscle cells, adipocytes, mucin producing cells, cells derived from endocrine glands such as insulin producing cells (for example, β-islet cells) or neurectodermal cells. The stem cells isolated in the present invention can be differentiated in vitro in order to subsequently use the differentiated cell for medical purposes. An illustrative example of such an approach is the differentiation of the mesenchymal stem cells into insulin producing β-islet cells which can then be administered, for example by implantation, to a patient that suffers from an insulin deficiceny such as diabetes mellitus (cf. also WO2007/046775 in this respect). Alternatively, the mesenchymal stem cells of the invention can be used in their undifferentiated state for cell-based therapy, for example, for wound healing purposes such as treatment of burns or chronic diabetic wounds. In these therapeutic applications the mesenchymal stem cells of the invention can either serve to promote wound healing by interacting with the surrounding diseased tissue or can also differentiate into a respective skin cell (cf., again WO2007/046775, for example).

In accordance with the above disclosure, it is noted here that such a mesenchymal stem cell population described herein can be isolated and cultivated (i.e. are derived) from any umbilical cord tissue as long as the umbilical cord tissue contains the amniotic membrane (which is also referred to as "cord lining"). Accordingly, the mesenchymal stem cell population can be isolated from (pieces of) the entire umbilical cord as described in the Experimental section of the present application. This umbical cord tissue may thus contain, in addition to the amniotic membrane, any other tissue/component of the umbilical cord. As shown, for example, in FIG. 16 of US patent application 2006/0078993 or International patent application WO2006/019357, the amniotic membrane of the umbilical cord is the outmost part of the umbilical cord, covering the cord. In addition, the umbilical cord contains one vein (which carries oxygenated, nutrient-rich blood to the fetus) and two arteries (which carry deoxygenated, nutrient-depleted blood away from the fetus). For protection and mechanical support these three blood vessels are embedded in the Wharton's jelly, a gelatinous substance made largely from mucopolysaccharides. Accordingly, the umbilical cord tissue used in the present invention can also comprise this one vein, the two arteries and the Wharton's jelly. The use of such an entire (intact) section of the umbilical cord has the advantage that the amniotic membrane does not need to be separated from the other components of the umbilical cord. This reduces the isolation steps and thus makes the method of the present invention, simpler, faster, less error prone and more economical—which are all important aspects for the GMP production that is necessary for therapeutic application of the mesenchymal stem cells. The isolation of the mesenchymal stem cells can thus start by tissue explant, which may be followed by subsequent subculturing (cultivation) of the isolated mesenchymal stem cells if greater amounts of the mesenchymal stem cells are desired, for example, for use in clinical trials. Alternatively, it is also possible to first separate the amniotic membrane from the other components of the umbilical cord and isolate the mesenchymal cord lining stem cells from the amniotic membrane by cultivation of the amniotic membrane in a culture medium of the present invention. This cultivation can also be carried out by tissue explant, optionally followed by subculturing of the isolated mesenchymal stem cells.

In this context, the term "tissue explant" or "tissue explant method" is used in its regular meaning in the art to refer a method in which a tissue (for example, placental tissue or umbilical cord tissue), once being harvested, or a piece of the tissue is being placed in a cell culture dish containing culture (growth) medium and by which over time, the stem cells migrate out of the tissue onto the surface of the dish. These primary stem cells can then be further expanded and transferred into fresh dishes through micropropagation (subculturing) as also described here. In this context, it is noted that in terms of production of the cells for therapeutic purposes, in the first step of isolating/obtaining a mesenchymal stem cell population of the present invention, for example, umbilical cord mesenchymal stem cells such as amniotic membrane or Wharton's jelly mesenchymal stem cells, a master cell bank of the isolated mesenchymal stem cells is obtained, while in the subsequent subculturing a working cell bank can be obtained. If a mesenchymal stem cell population of the invention (in particular a population of the mesenchymal stem cells of which at least about 97% or more, 98% or more or 99% or more of the cells express each of the markers CD73, CD90 and CD105 and lack expression of each of the markers: CD34, CD45 and HLA-DR) is used for clinical trials or as an approved therapeutic, a cell population of the working cell bank will be typically used for this purpose. Both the stem cell population of the isolation step (which may make up the master cell bank) and the stem cell population of the subculturing step (which may make up the working cell bank) can, for example, be stored in cryo-preserved form.

As mentioned above, the present method of inducing or improving the wound healing properties of the mesenchymal cell population (and optionally at the same time of isolating mesenchymal stem cells from a tissue such as Wharton's jelly or the amniotic membrane of umbilical cord) has the advantage that all components used in the culture medium of the invention are available in GMP quality and thus provide the possibility to isolate the mesenchymal stem cells under GMP conditions for subsequent therapeutic administration.

By "inducing or improving wound healing properties of a mesenchymal stem cell population" is meant herein the ability of the culture medium to increase or start (induce) the expression and/or secretion of at least one of the proteins Ang-1, TGF-β1, VEGF, and HGF by the mesenchymal stem cell population. As explained above, the involvement of all of these four proteins in wound healing is known. "Inducing or improving the wound healing properties" is assessed relative to the cultivation of the mesenchymal stem cell population in a reference (culture) medium such as the medium PTT-4 (that consists of 90% (v/v) CMRL1066, and 10% (v/v) FBS) that has been used in US patent application US 2008/0248005 and the corresponding International patent application WO2007/046775 for the isolation and cultivation of a mesenchymal stem cell population of the amniotic membrane of umbilical cord which was shown in US patent application US 2008/0248005 and International patent application WO2007/046775 to have excellent wound healing properties. In case, the mesenchymal stem cell population will secrete a bigger amount (corresponding to a higher secretion level or a higher concentration) of at least one of the four marker proteins Ang-1, TGF-β1, VEGF, and HGF into the supernatant/culture medium, when cultivated in a culture medium of the invention compared to cultivation of the mesenchymal stem cell population in the reference medium, then the wound healing properties of the mesenchymal stem cell population are increased. In case, no (detectable) secretion of none of these four marker proteins by the mesenchymal stem cell population is observed during cultivation in the reference medium while detectable secretion of at least one of the four markers is observed during or after cultivation of the mesenchymal stem cell population in the culture medium of the invention, then the wound healing properties of the stem cell population are induced. The wound healing properties of the mesenchymal stem cell population are also improved when the expression or secretion of least two or of least three or of all of the four marker proteins Ang-1, TGF-β1, VEGF, and HGF is increased relative to cultivation of the stem cell population in the reference medium. The secretion of the four marker proteins into the culture medium (and thus the production of these factors by the stem cell population) can be measured/determined with any suitable method, for example, by measuring the amount of protein by means of commercially available antibodies/immunoassays (cf, the Experimental Section). Such measurements can be made in an automated fashion, using, for example a system such as the FLEXMAP 3D system (Luminex Corporation, Austin, Texas, USA).

By "DMEM" is meant Dulbecco's modified eagle medium which was developed in 1969 and is a modification of basal medium eagle (BME) (cf. FIG. 1 showing the data sheet of DMEM available from Lonza). The original DMEM formula contains 1000 mg/L of glucose and was first reported for culturing embryonic mouse cells. DMEM has since then become a standard medium for cell culture that is commercially available from various sources such as ThermoFisher Scientific (catalogue number 11965-084), Sigma Aldrich (catalogue number D5546) or Lonza, to name only a few suppliers. Thus, any commercially available DMEM can be used in the present invention. In preferred embodiments, the DMEM used herein is the DMEM medium available from Lonza under catalog number 12-604F. This medium is DMEM supplemented with 4.5 g/L glucose and L-glutamine). In another preferred embodiment the DMEM used herein is the DMEM medium of Sigma Aldrich catalogue number D5546 that contains 1000 mg/L glucose, and sodium bicarbonate but is without L-glutamine.

By "F12" medium is meant Ham's F12 medium. This medium is also a standard cell culture medium and is a nutrient mixture initially designed to cultivate a wide variety of mammalian and hybridoma cells when used with serum in combination with hormones and transferrin (cf. FIG. 2, showing the data sheet of Ham's F12 medium from Lonza). Any commercially available Ham's F12 medium (for example, from ThermoFisher Scientific (catalogue number 11765-054), Sigma Aldrich (catalogue number N4888) or Lonza, to new only a few suppliers) can be used in the present invention. In preferred embodiments, Ham's F12 medium from Lonza is used.

By "DMEM/F12" or "DMEM:F12" is meant a 1:1 mixture of DMEM with Ham's F12 culture medium (cf. FIG. 3 showing the data sheet for DMEM: F12 (1:1) medium from Lonza). Also DMEM/F12 (1:1) medium is a widely used basal medium for supporting the growth of many different mammalian cells and is commercially available from various supplier such as ThermoFisher Scientific (catalogue number 11330057), Sigma Aldrich (catalogue number D6421) or Lonza. Any commercially available DMEM:F12 medium can be used in the present invention. In preferred embodiments, the DMEM:F12 medium used herein is the DMEM/F12 (1:1) medium available from Lonza under catalog number 12-719F (which is DMEM: F12 with L-glutamine, 15 mM HEPES, and 3.151 g/L glucose).

By "M171" is meant culture medium 171, which has been developed as basal medium for the culture of for the growth of normal human mammary epithelial cells (cf. FIG. 4 showing the data sheet for M171 medium from Life Technologies Corporation). Also this basal medium is widely used and is commercially available from supplier such as ThermoFisher Scientific or Life Technologies Corporation (catalogue number M171500), for example. Any commercially available M171 medium can be used in the present invention. In preferred embodiments, the M171 medium used herein is the M171 medium available from Life Technologies Corporation under catalogue number M171500.

By "FBS" is meant fetal bovine serum (that is also referred to as "fetal calf serum"), i.e. the blood fraction that remains after the natural coagulation of blood, followed by centrifugation to remove any remaining red blood cells. Fetal bovine serum is the most widely used serum-supplement for in vitro cell culture of eukaryotic cells because it has a very low level of antibodies and contains more growth factors, allowing for versatility in many different cell culture applications. The FBS is preferably obtained from a member of the International Serum Industry Association (ISIA) whose primary focus is the safety and safe use of serum and animal derived products through proper origin traceability, truth in labeling, and appropriate standardization and oversight. Suppliers of FBS that are ISIA members include Abattoir Basics Company, Animal Technologies Inc., Biomin Biotechnologia LTDA, GE Healthcare, Gibco by Thermo Fisher Scientific and Life Science Production, to mention only a few. In currently preferred embodiments, the FBS is obtained from GE Healthcare under catalogue number A15-151.

Turning now to the culture medium of the present invention, the culture medium may comprise for inducing or improving the wound healing properties or for the isolation or cultivation of the mesenchymal stem cells DMEM in a final concentration of about 55 to 65% (v/v), F12 in a final concentration of about 5 to 15% (v/v), M171 in a final concentration of about 15 to 30% (v/v) and FBS in a final concentration of about 1 to 8% (v/v). The value of "% (v/v)" as used herein refers to the volume of the indivual component relative to the final volume of the culture medium. This means, if DMEM is, for example, present in the culture medium a final concentration of about 55 to 65% (v/v), 1 liter of culture medium contains about 550 to 650 ml DMEM.

In other embodiments, the culture medium may comprise DMEM in a final concentration of about 57.5 to 62.5% (v/v), F12 in a final concentration of about 7.5 to 12.5% (v/v), M171 in a final concentration of about 17.5 to 25.0% (v/v) and FBS in a final concentration of about 1.75 to 3.5% (v/v). In further embodiments, the culture medium may comprise DMEM in a final concentration of about 61.8% (v/v), F12 in a final concentration of about 11.8% (v/v), M171 in a final concentration of about 23.6% (v/v) and FBS in a final concentration of about 2.5% (v/v).

In addition to the above-mentioned components, the culture medium may comprise supplements that are advantageous for cultivation of the mesenchymal cord lining stem cells. The culture medium of the present invention may, for example, comprises Epidermal Growth Factor (EGF). If present, EGF may be present in the culture medium in a final concentration of about 1 ng/ml to about 20 ng/ml. In some of these embodiments, the culture medium may comprise EGF in a final concentration of about 10 ng/ml.

The culture medium of the present invention may also comprise insulin. If present, insulin may be present in a final concentration of about 1 µg/ml to 10 µg/ml. In some of these embodiments, the culture medium may comprise Insulin in a final concentration of about 5 µg/ml.

The culture medium may further comprises at least one of the following supplements: adenine, hydrocortisone, and 3,3',5-Triiodo-L-thyronine sodium salt (T3). In such embodiments, the culture medium may comprise all three of adenine, hydrocortisone, and 3,3',5-Triiodo-L-thyronine sodium salt (T3). In these embodiments, the culture medium may comprise adenine in a final concentration of about 0.05 to about 0.1 µg/ml adenine, hydrocortisone in a final concentration of about 1 to about 10 µg/ml hydrocortisone and/or 3,3',5-Triiodo-L-thyronine sodium salt (T3) in a final concentration of about 0.5 to about 5 ng/ml.

In one embodiment of the method of the invention, tissue such as umbilical cord tissue or placental may be cultured till a suitable number of (primary) mesenchymal stem cells such as cord lining stem cells, Wharton's Jelly or placental stem cells cells have outgrown from the tissue. In typical embodiments, the umbilical cord tissue is cultivated until cell outgrowth of the mesenchymal stem cells of the respective tissue reaches about 70 to about 80% confluency. It is noted here that the term "confluency" or "confluence" is used in its regular meaning in the art of cell culture and is meant as an estimate/indicator of the number of adherent cells in a culture dish or a flask, referring to the proportion of the surface which is covered by cells. For example, 50 percent confluence means roughly half of the surface is covered and there is still room for cells to grow. 100 percent confluence means the surface is completely covered by the cells, and no more room is left for the cells to grow as a monolayer.

Once a suitable number of primary cells (mesenchymal stem cells) have been obtained from the respective tissue by tissue explant, the mesenchymal stem cells are removed from the cultivation container used for the cultivation. By so doing, a master cell bank containing the (primary) isolated mesenchymal stem cells of for example, the umbilical cord or the placeta can be obtained. Typically, since such mesenchymal stem cells are adherent cells, harvesting the cells is carried out using standard enzymatic treatment. For example, the enzymatic treatment may comprise trypsination as described in International US patent application 2006/0078993, International patent application WO2006/019357 or International patent application WO2007/046775, meaning outgrowing cells can be harvested by trypsinization (0.125% trypsin/0.05% EDTA) for further expansion. If the harvested mesenchymal stem cells are, for example, used for generating a master cell bank, the cells can also be cryopreserved and stored for further use as explained herein below.

Once being harvested, the mesenchymal stem cells can be transferred to a cultivation container for subculturing. Subculturing or culturing (both terms are used interchangeable hereinafter) will be also be carried out if a mesenchymal stem cell population is employed that has been isolated from its natural environment earlier (as explained above, such isolated stem cells used in the method of the invention may be from cord blood, bone marrow or adipose tissue but also from cord tissue or placental tissue). The subculturing can also be started from frozen primary cells, i.e. from the master cell bank. For subculturing any suitable amount of cells can be seeded in a cultivation container such as cell culture plate. The mesenchymal cells can, for this purpose, be suspended in a suitable medium (most conveniently, the culture medium of the present invention) for subculturing at a concentration of, for example, about $0.5\times10^6$ cells/ml to about $5.0\times10^6$ cells/ml. In one embodiment the cells are suspended for subcultivation at a concentration of about $1.0\times10^6$ cells/ml. The subculturing can be carried by cultivation either in simple culture flasks but also, for example, in a multilayer system such as CellStacks (Corning, Corning, NY, USA) or Cellfactory (Nunc, part of Thermo Fisher Scientific Inc., Waltham, MA, USA) that can be stacked in incubators. Alternatively, the subculturing can also be carried out in a closed self-contained system such as a bioreactor. Different designs of bioreactors are known to the person skilled in the art, for example, parallel-plate, hollow-fiber, or micro-fluidic bioreactors. See, for example, Sensebe et al. "Production of mesenchymal stromal/stem cells according to good manufacturing practices: a review", supra. An illustrative example of a commercially available hollow-fiber bioreactor is the Quantum® Cell Expansion System (Terumo BCT, Inc). that has, for example, been used for the expansion of bone marrow mesenchymal stem cells for clinical trials (cf., Hanley et al, Efficient Manufacturing of Therapeutic Mesenchymal Stromal Cells Using the Quantum Cell Expansion System, *Cytotherapy*. 2014 August; 16(8): 1048-1058). Another example of a commercially available bioreactors that can be used for the subculturing of the mesenchymal stem cell population of the present invention is the Xuri Cell Expansion System available from GE Heathcare. The cultivation of the mesenchymal stem cell population in an automated system such as the Quantum® Cell Expansion System is of particular benefit if a working cell bank for therapeutic application is to be produced under GMP conditions and a high number of cells is wanted.

The subculturing of the mesenchymal stem cells of the invention takes place in a culture medium of the present invention. Accordingly, the culture medium of the present invention can be used both for the isolation of the mesenchymal stem cell population, for example, from the amniotic membrane of placenta, or from the amniotic membrane or from Wharton's jelly of umbilical cord and the subsequent cultivation of the isolated primay cells by subcultivation. Also for the subcultivation, the mesenchymal stem cells can be cultured till a suitable amount of cells have grown. In illustrative embodiments the mesenchymal stem cells are subcultured till the mesenchymal stem cells reach about 70 to about 80% confluency.

The isolation/cultivation of the population of mesenchymal stem cell population can be carried out under standard condition for the cultivation of mammalian cells. Typically, the method of the invention of isolating the population of the mesenchymal stem cells is typically carried out under conditions (temperature, atmosphere) that are normally used for cultivation of cells of the species of which the cells are derived. For example, human umbilical cord tissue and the mesenchymal cord lining stem cells, respectively, are usually cultivated at 37° C. in normal atmosphere with 5% $CO_2$. In this context, it is noted that the in present invention the mesenchymal cell population may be derived of any mammalian species, such as mouse, rat, guinea pig, pig, rabbit, goat, horse, dog, cat, sheep, monkey or human, with mesenchymal stem cells of human origin being preferred in one embodiment.

Once a desired/suitable number of mesenchymal stem cells have been obtained from the culture or subculture, the mesenchymal stem cells are harvested by removing them from the cultivation container used for the subcultivation. The harvesting of the mesenchymal stem cells is typically again carried out by enzymatic treatment, including comprises trypsination of the cells. The isolated mesenchymal stem cells are subsequently collected and are either be directedly used or preserved for further use. Typically, preserving is carried out by cryo-preservation. The term "cryo-preservation" is used herein in its regular meaning to describe a process where the mesenchymal stem cells are preserved by cooling to low sub-zero temperatures, such as (typically) −80° C. or −196° C. (the boiling point of liquid nitrogen). Cryo-preservation can be carried out as known to the person skilled in the art and can include the use of cryo-protectors such as dimethylsulfoxide (DMSO) or glycerol, which slow down the formation of ice-crystals in the cells of the umbilical cord.

The isolated population of the mesenchymal stem cells that is obtained by the cultivation and/or isolation method of the present invention is highly defined and homogenous. In typical embodiments of the method at least about 90% or more, about 91% or more, about 92% or more, about 93% or more, about 94% or more, about 95% or more, about 96% or more, about 97% or more, about 98% or more about 99% or more of the isolated mesenchymal stem cells express the following markers: CD73, CD90 and CD105. In addition, in these embodiments at least about 90% or more, about 91% or more, about 92% or more, about 93% or more, about 94% or more, about 95% or more, about 96% or more, about 97% or more, about 98% or more about 99% or more of the isolated mesenchymal stem cells may lack expression of the lack expression of the following markers: CD34, CD45 and HLA-DR. In particular embodiments, about 97% or more, about 98% or more, or about 99% or more of the isolated mesenchymal stem cell population express CD73, CD90 and CD105 while lacking expression of CD34, CD45 and HLA-DR.

Thus, in line with the above disclosure the present invention is also directed to a mesenchymal stem population such as a placental mesenchymal stem cell population, or an umbilical cord mesenchymal stem cell population (for example, isolated from Wharton's jelly or the amniotic membrane of the umbilical cord), wherein at least about 90% or more cells of the stem cell population express each of the following markers: CD73, CD90 and CD105. In preferred embodiments at least about 91% or more, about 92% or more, about 93% or more, about 94% or more, about 95% or more, about 96% or more, about 97% or more, about 98% or more about 99% or more cells of the isolated mesenchymal stem cell population are CD73+, CD90+ and CD105+, meaning that this percentage of the isolate cell population express each of CD73, CD90 and CD105 (cf. the Experimental Section of the present application). In addition, at least about 90% or more, about 91% or more, about 92% or more, about 93% or more, about 94% or more, about 95% or more, about 96% or more, about 97% or more, about 98% or more about 99% or more of the isolated mesenchymal stem cells may lack expression of the following markers: CD34, CD45 and HLA-DR. In particular embodiments about 97% or more, about 98% or more, or about 99% or more of the isolated mesenchymal stem cell population express CD73, CD90 and CD105 while lacking expression of CD34, CD45 and HLA-DR. Such a highly homogenous population of mesenchymal stem cells derived from the amniotic membrane of the umbilical cord has been reported here for the first time and meets the critiera for mesenchymal stem cells to be used for cellular therapy (also cf. the Experimental Section and, for example, Sensebe et al. "Production of mesenchymal stromal/stem cells according to good manufacturing practices: a review", supra). It is noted in this context that this mesenchymal stem cell population can be obtained by either the isolating method of the present invention but also by a different method such as cell sorting, if wanted.

In line with the above, the present invention is also directed to a pharmaceutical composition comprising a mesenchymal stem population as described herein, wherein at least about 90% or more cells of the stem cell population express each of the following markers: CD73, CD90 and CD105 and optionally, lack expression of CD34, CD45 and HLA-DR. The pharmaceutical composition may comprise any pharmaceutically acceptable excipient and may be formulated for any desired pharmaceutical way of administration. The pharmaceutical composition may, for example, be adapted for systemic or topical application. In a related aspect, the present invention also provides a pharmaceutical composition that contains three or four of Ang-1, TGF-β1, VEGF, or HGF as the only wound healing proteins. Such a pharmaceutical composition may be formulated as a liquid, for example, by using a pharmaceutically suitable buffer such 0.9% saline, Ringer's solution or phosphate buffered saline (PBS) or a lyophilisate/freeze-dried formulation.

In a further aspect the invention is directed to a method of making a culture medium for inducing or improving wound healing properties and/or for isolating the mesenchymal stem cell population, wherein the method comprises mixing to obtain a final volume of 500 ml culture medium:
  i. 250 ml of DMEM
  ii. 118 ml M171
  iii. 118 ml DMEM/F12
  iv. 12.5 ml Fetal Bovine Serum (FBS) to reach a final concentration of 2.5% (v/v).

As explained above, DMEM/F12 medium is a 1:1 mixture of DMEM and Ham's F12 medium. Thus, 118 ml DMEM/F12 medium contain 59 ml DMEM and 59 ml F12. Accordingly, when using this method of making a culture medium, the final concentrations (v/v) mit 500 ml total volume are as follows:
  DMEM: 250 ml+59 ml=309 ml, corresponds to 309/500=61.8% (v/v)
  M171: 118 ml, corresponds to 118/500=23.6% (v/v)
  F12: 59 ml, corresponds to 59/500=11.8% (v/v).

Embodiments of this method of making a culture medium further comprise adding
  v. 1 ml EGF stock solution (5 μg/ml) to achieve a final EGF concentration of 10 ng/ml, and
  vi. Insulin 0.175 ml stock solution (14.28 mg/ml) to achieve a final insulin concentration of 5 μg/ml.

It is noted here that in these embodiments, the above-mentioned volumes of these components i. to vi when mixed result in a final volume of 499.675 ml culture medium. If no further components are added to the culture medium, the remaining 0.325 ml (to add up to a volume of 500 ml) can, for example, be any of components i. to iv, that means either DMEM, M171, DMEM/F12 or FBS. Alternatively, the concentration of the stock solution of EGF or Insulin can of course be adjusted such that the total volume of the culture medium is 500 ml. In addition, it is also noted that components i. to iv. do not necessarily have to be added in the order in which they are listed but it is of course also possible to use any order to mix these components to arrive at the culture medium of the present invention. This means, that for example, M171 and DMEM/F12 can be mixed together and then combined with DMEM and FBS to reach final concentrations as described here, i.e. a final concentration of DMEM of about 55 to 65% (v/v), a final concentration of F12 of about 5 to 15% (v/v), a final concentration of M171 of about 15 to 30% (v/v) and a final concentration of FBS of about 1 to 8% (v/v).

In other embodiments, the method further comprises adding to DMEM a volume of 0.325 ml of one or more of the following supplements: adenine, hydrocortisone, 3,3',5-Triiodo-L-thyronine sodium salt (T3), thereby reaching a total volume of 500 ml culture medium. In this embodiments, the final concentration of these supplements in DMEM may be as follows:

about 0.05 to 0.1 µg/ml adenine, for example about 0.025 µg/ml adenine,
about 1 to 10 µg/ml hydrocortisone,
about 0.5 to 5 ng/ml 3,3',5-Triiodo-L-thyronine sodium salt (T3), for example 1.36 ng/ml 3,3',5-Triiodo-L-thyronine sodium salt (T3).

In line with the above disclosure, the invention is also directed to a cell culture medium that is obtainable or that is obtained by the method of making the medium as described here.

In addition, the invention also concerns a method of isolating mesenchymal stem cells from the amniotic membrane of the umbilical cord, wherein this method comprises cultivating amniotic membrane tissue in the culture medium prepared by the method as described here.

Thus, the present invention is also directed to a cell culture medium comprising:

DMEM in the final concentration of about 55 to 65% (v/v),
F12 in a final concentration of about 5 to 15% (v/v),
M171 in a final concentration of about 15 to 30% (v/v) and
FBS in a final concentration of about 1 to 8% (v/v).

In certain embodiments of the culture medium described here, the medium comprises DMEM in the final concentration of about 57.5 to 62.5% (v/v), F12 in a final concentration of about 7.5 to 12.5% (v/v), M171 in a final concentration of about 17.5 to 25.0% (v/v) and FBS in a final concentration of about 1.75 to 3.5% (v/v). In other embodiments the culture medium may comprise DMEM in a final concentration of about 61.8% (v/v), F12 in a final concentration of about 11.8% (v/v), M171 in a final concentration of about 23.6% (v/v) and FBS in a final concentration of about 2.5% (v/v).

In addition, the culture medium may further comprise Epidermal Growth Factor (EGF) in a final concentration of about 1 ng/ml to about 20 ng/ml. In certain embodiments, the culture medium comprise EGF in a final concentration of about 10 ng/ml. The culture medium described herein may further comprise Insulin in a final concentration of about 1 µg/ml to 10 µg/ml. In such embodiments the culture medium may comprise Insulin in a final concentration of about 5 µg/ml.

The cell culture medium of the invention may further comprise at least one of the following supplements: adenine, hydrocortisone, and 3,3',5-Triiodo-L-thyronine sodium salt (T3). In certain embodiments the culture medium comprises all three of adenine, hydrocortisone, and 3,3',5-Triiodo-L-thyronine sodium salt (T3). If present, the culture medium may comprise adenine in a final concentration of about 0.01 to about 0.1 µg/ml adenine or of about 0.05 to about 0.1 µg/ml adenine, hydrocortisone in a final concentration of about 0.1 to about 10 µg/ml hydrocortisone or of about 1 to about 10 µg/ml hydrocortisone and/or 3,3',5-Triiodo-L-thyronine sodium salt (T3) in a final concentration of about 0.5 to about 5 ng/ml.

In embodiments of the cell culture medium, 500 ml of the cell culture medium of the present invention comprise:
i. 250 ml of DMEM
ii. 118 ml M171
iii. 118 ml DMEM/F12
iv. 12.5 ml Fetal Bovine Serum (FBS) (final concentration of 2.5%)

In further embodiments, the cell culture medium may further comprise
v. EGF in a final concentration of 10 ng/ml, and
vi. Insulin in a final concentration of 5 µg/ml.

Both, insulin and and EGF can be added to to the culture medium using a stock solution of choice, such that the total volume of the culture medium does not exceed 500 ml.

In a particular example, the components i. to vi. of the culture medium of the present invention are the components indicated in FIG. 5, meaning they are obtained from the respective manufacturers using the catalogue number indicated in FIG. 5. The medium that is obtained from mixing the components i. to vi. as indicated in FIG. 5 is also referred herein as "PTT-6". It is again noted in this context that the constituents i. to vi. as well as any other ingredient such as an antibiotic of any other commercial supplier can be used in making the medium of the present invention.

In addition, the cell culture medium of the invention may comprise adenine in a final concentration of about 0.01 to about 0.1 µg/ml adenine or of about 0.05 to about 0.1 µg/ml adenine, hydrocortisone in a final concentration of about 0.1 to 10 µg/ml, of about 0.5 to about 10 µg/ml, or of about 1 to about 10 µg/ml hydrocortisone and/or 3,3',5-Triiodo-L-thyronine sodium salt (T3) in a final concentration of about 0.1 to about 5 ng/ml or of about 0.5 to about 5 ng/ml.

Finally, the invention also provides a method of treating a non-human mammal (such as cats, dogs, horses, to name only a few) or a human patient having a disease or suffering from a condition, the method comprising administering to the non-human mammal or human patient a mesenchymal stem cell population or a pharmaceutical composition containing a stem cell population as disclosed herein. The disease can be any disease or condition, in particular any disease or condition in which healing of wound is wanted/required. The subject (patient or non-human mammal) may suffer from a wound that is caused by a burn, a bite, a trauma, a surgery, or a disease such as a skin disease or a metabolic disorder. As an example of such a metabolic disorder, the patient may, for example, be afflicted with Type I or Type II diabetes and suffers from chronic foot ulcers. For treating the subject, the mesenchymal stem cell population of the invention may be administered in any suitable way, for example, including but not limited to, topical administration, by implantation or by injection. In principle any way of topical administration is meant herein. The administering the mesenchymal stem cell population may be performed by means of a syringe. It is however also possible, to contact the mesenchymal stem cells within a cream, ointment, gel, suspension or any other suitable substance before applying the mesenchymal stem cells to the subject. The stem cell population may, for example, then be placed directly onto a wound such as a burn or a diabetic wound (see International patent application WO2007/046775). After its application to the subject the mesenchymal stem cell population may be held in place e.g. by a dressing such as Tegaderm® dressing and a crepe bandage to cover the Tegaderm® dressing. Alternatively, the stem cell population may also be implanted subcutaneously, for example, directly under the skin, in body fat or in the peritoneum.

The present invention also relates to a unit dosage comprising about 20 million cells, of about 15 million cells, of about 10 million cells, of about 5 million cells, of about 4 million cells, of about 3 million cells, of about 2 million cells, of about 1 million cells, of about 0.5 million cells, of about 0.25 million cells or of less than 0.25 million cells of a mesenchymal stem cell population as described herein.

It is also envisioned that the unit dosage comprises about 10, about 9, about 8, about 7, about 6, about 5, about 4, about 3, about 2, about 1, about 0.5, about 0.25, or about 0.1 million cells. Preferably the unit dosage comprises about 10 million cells. It is further envisioned that the unit dosage comprises about 1000 cells to about 5 million cells. The unit dosage can be applied in a dosage of about 100,000 cells, 300,000 cells or 500,000 cells. As described herein the unit dosage may be applied topically, in particular if used for wound healing. For example, the unit dosage may be applied topically per $cm^2$.

If wanted, the unit dosage may be applied once, twice, three times or more a week. For example, the unit dosage can be applied for one, two, three, four, five, six, seven, eight, nine, ten, elven weeks or more. The unit dosage comprising of about 100,000 cells, about 300,000 cells or about 500,000 cells can be applied two times a week for 8 weeks, preferably onto 1 $cm^2$.

The unit dosage can be contained in any suitable container. For example, the unit dosage can be contained in a 1 ml vial. In such cases, for example 0.1 ml of the vial can be applied onto the subject, preferably per $cm^2$. The unit dosage may alternatively be contained in a syringe.

The unit dosage of the present invention the cells can be in contact with a pharmaceutically acceptable carrier, for example a liquid carrier. The carrier may be any known carrier such as HypoThermosol™, Hypothermosol™-FRS or PlasmaLyte. The culture medium of the present invention may also be used as carrier for a (unit dosage) of the mesenchymal stem cell population of the present invention. In that case, the mesenchymal stem cells may be separated from the carrier before administration. For example, the cells can be centrifuged and isolated before administration to a subject.

The method of treatment and the unit dosage of the present invention can comprise utilization of viable cells. The viability of the mesenchymal stem cell population can be tested with known methods, for example, staining with Tryphan Blue as described in the Experimental Section.

The invention will be further illustrated by the following non-limiting Experimental Examples.

The invention will be further illustrated by the following non-limiting Experimental Examples.

Sequences as used herein are depicted in below Table 1.

TABLE 1

Sequences of proteins used herein.

| SEQ ID NO. | What | Sequence |
|---|---|---|
| 1 | CD73 identifier P21589 of Uniprot, version number 1 as of May 1, 1991: | MCPRAARAPATLLLALGAVLWPAAGAWELTILHTNDVHSRLEQTSEDS SKCVNASRCMGGVARLFTKVQQIRRAEPNVLLLDAGDQYQGTIWFTVY KGAEVAHFMNALRYDAMALGNHEFDNGVEGLIEPLLKEAKFPILSANIK AKGPLASQISGLYLPYKVLPVGDEVVGIVGYTSKETPFFLSNPGTNLVFED EITALQPEVDKLKTLNVNKIIALGHSGFEMDKLIAQKVRGVDVVVGGHS NTFLYTGNPPSKEVPAGKYPFIVTSDDGRKVPVVQAYAFGKYLGYLKIE FDERGNVISSHGNPILLNSSIPEDPSIKADINKWRIKLDNYSTQELGKTIVY LDGSSQSCRFRECNMGNLICDAMINNNLRHTDEMFWNHVSMCILNGGG IRSPIDERNNGTITWENLAAVLPFGGTFDLVQLKGSTLKKAFEHSVHRYG QSTGEFLQVGGIHVVYDLSRKPGDRVVKLDVLCTKCRVPSYDPLKMDE VYKVILPNFLANGGDGFQMIKDELLRHDSGDQDINVVSTYISKMKVIYP AVEGRIKFSTGSHCHGSFSLIFLSLWAVIFVLYQ |
| 2 | CD90 identifier P04216 of Uniprot, version number 2 as of May 2, 2002: | MNLAISIALLLTVLQVSRGQKVTSLTACLVDQSLRLDCRHENTSSSPIQY EFSLTRETKKHVLFGTVGVPEHTYRSRTNFTSKYNMKVLYLSAFTSKDE GTYTCALHHSGHSPPISSQNVTVLRDKLVKCEGISLLAQNTSWLLLLLLS LSLLQATDFMSL |
| 3 | CD105 identifier P17813 of Uniprot, version number 2 as of Jul. 15, 1998: | MDRGTLPLAVALLLASCSLSPTSLAETVHCDLQPVGPERGEVTYTTSQVS KGCVAQAPNAILEVHVLFLEFPTGPSQLELTLQASKQNGTWPREVLLVL SVNSSVFLHLQALGIPLHLAYNSSLVTFQEPPGVNTTELPSFPKTQILEWA AERGPITSAAELNDPQSILLRLGQAQGSLSFCMLEASQDMGRTLEWRPRT PALVRGCHLEGVAGHKEAHILRVLPGHSAGPRTVTVKVELSCAPGDLDA VLILQGPPYVSWLIDANHNMQIWTTGEYSFKIFPEKNIRGFKLPDTPQGL LGEARMLNASIVASFVELPLASIVSLHASSCGGRLQTSPAPIQTTPPKDTC SPELLMSLIQTKCADDAMTLVLKKELVAHLKCTITGLTFWDPSCEAEDR GDKFVLRSAYSSCGMQVSASMISNEAVVNILSSSSPQRKKVHCLNMDSL SFQLGLYLSPHFLQASNTIEPGQQSFVQVRVSPSVSEFLLQLDSCHLDLGP EGGTVELIQGRAAKGNCVSLLSPSPEGDPRFSFLLHFYTVPIPKTGTLSCT VALRPKTGSQDQEVHRTVFMRLNIISPDLSGCTSKGLVLPAVLGITFGAF LIGALLTAALWYIYSHTRSPSKREPVVAVAAPASSESSSTNHSIGSTQSTP CSTSSMA |
| 4 | CD34 identifier P28906 of Uniprot, version number 2 as of | MLVRRGARAGPRMPRGWTALCLLSLLPSGFMSLDNNGTATPELPTQGT FSNVSTNVSYQETTTPSTLGSTSLHPVSQHGNEATTNITETTVKFTSTSVIT SVYGNTNSSVQSQTSVISTVFTTPANVSTPETTLKPSLSPGNVSDLSTTSTS LATSPTKPYTSSSPILSDIKAEIKCSGIREVKLTQGICLEQNKTSSCAEFKK DRGEGLARVLCGEEQADADAGAQVCSLLLAQSEVRPQCLLLVLANRTEI |

TABLE 1-continued

Sequences of proteins used herein.

| SEQ ID NO. | What | Sequence |
|---|---|---|
| | Jul. 15, 1998: | SSKLQLMKKHQSDLKKLGILDFTEQDVASHQSYSQKTLIALVTSGALLA VLGITGYFLMNRRSWSPTGERLGEDPYYTENGGGQGYSSGPGTSPEAQG KASVNRGAQENGTGQATSRNGHSARQHVVADTEL |
| 5 | CD45 identifier P08575 of Uniprot, version number 2 as of Jul. 19, 2003: | MYLWLKLLAFGFAFLDTEVFVTGQSPTPSPTGLTTAKMPSVPLSSDPLPT HTTAFSPASTFERENDFSETTTSLSPDNTSTQVSPDSLDNASAFNTTGVSS VQTPHLPTHADSQTPSAGTDTQTFSGSAANAKLNPTPGSNAISDVPGERS TASTFPTDPVSPLTTTLSLAHHSSAALPARTSNTTITANTSDAYLNASETT TLSPSGSAVISTTTIATTPSKPTCDEKYANITVDYLYNKETKLFTAKLNVN ENVECGNNTCTNNEVHNLTECKNASVSISHNSCTAPDKTLILDVPPGVEK FQLHDCTQVEKADTTICLKWKNIETFTCDTQNITYRFQCGNMIFDNKEIK LENLEPEHEYKCDSEILYNNHKFTNASKIIKTDFGSPGEPQIIFCRSEAAHQ GVITWNPPQRSFHNFTLCYIKETEKDCLNLDKNLIKYDLQNLKPYTKYV LSLHAYIIAKVQRNGSAAMCHFTTKSAPPSQVWNMTVSMTSDNSMHVK CRPPRDRNGPHERYHLEVEAGNTLVRNESHKNCDFRVKDLQYSTDYTF KAYFHNGDYPGEPFILHHSTSYNSKALIAFLAFLIIVTSIALLVVLYKIYDL HKKRSCNLDEQQELVERDDEKQLMNVEPIHADILLETYKRKIADEGRLF LAEFQSIPRVFSKFPIKEARKPFNQNKNRYVDILPYDYNRVELSEINGDAG SNYINASYIDGFKEPRKYIAAQGPRDETVDDFWRMIWEQKATVIVMVTR CEEGNRNKCAEYWPSMEEGTRAFGDVVVKINQHKRCPDYIIQKLNIVNK KEKATGREVTHIQFTSWPDHGVPEDPHLLLKLRRRVNAFSNFFSGPIVVH CSAGVGRTGTYIGIDAMLEGLEAENKVDVYGYVVKLRRQRCLMVQVE AQYILIHQALVEYNQFGETEVNLSELHPYLHNMKKRDPPSEPSPLEAEFQ RLPSYRSWRTQHIGNQEENKSKNRNSNVIPYDYNRVPLKHELEMSKESE HDSDESSDDDSDSEEPSKYINASFIMSYWKPEVMIAAQGPLKETIGDFWQ MIFQRKVKVIVMLTELKHGDQEICAQYWGEGKQTYGDIEVDLKDTDKS STYTLRVFELRHSKRKDSRTVYQYQYTNWSVEQLPAEPKELISMIQVVK QKLPQKNSSEGNKHHHKSTPLLIHCRDGSQQTGIFCALLNLLESAETEEVV DIFQVVKALRKARPGMVSTFEQYQFLYDVIASTYPAQNGQVKKNNHQE DKIEFDNEVDKVKQDANCVNPLGAPEKLPEAKEQAEGSEPTSGTEGPEH SVNGPASPALNQGS |
| 6 | HLA-DR identifier P01903 of Uniprot, version number 1 as of Jul. 21, 1986: | MAISGVPVLGFFIIAVLMSAQESWAIKEEHVIIQAEFYLNPDQSGEFMFDF DGDEIFHVD MAKKETVWRLEEFGRFASFEAQGALANIAVDKANLEIMTKRSNYTPITN VPPEVTVLTNSPVELREPNVLICFIDKFTPPVVNVTWLRNGKPVTTGVSE TVFLPREDHLFRKFHYLPFLP STEDVYDCRVEHWGLDEPLLKHWEFDAPSPLPETTENVVCALGLTVGL VGIIIGTIFIIKGVRKSNAAERRGPL |
| 7 | Human TGFbeta1 Uniprot no: P36897 version number 1 as of Jun. 1, 1994 | MEAAVAAPRPRLLLLVLAAAAAAAAALLPGATALQCFCHLCTKDNFTCVT DGLCFVSVTETTDKVIHNSMCIAEIDLIPRDRPFVCAPSSKTGSVTTTYCCNQ DHCNKIELPTTVKSSPGLGPVELAAVIAGPVCFVCISLMLMVYICHNRTVIH HRVPNEEDPSLDRPFISEGTTLKDLIYDMTTSGSGSGLPLLVQRTIARTIVLQE ESIGKGRFGEVWRGKWRGEEVAVKIFSSREERSWFREAEIYQTVMLRHENIL LGFIAADNKDNGTWTQLWLVSDYHEHGSLFDYLNRYTVTVEGMIKLALSTA ASGLAHLHMEIVGTQGKPAIAHRDLKSKNILVKKNGTCCIADLGLAVRHDSA ATDTIDIAPNHRVGTKRYMAPEVLDDSINMKHFESFKRADIYAMGLVFWEIA ARRCSIGGIHEDYQLPYYDLVPSDPSVEEMRKVVCEQKLRPNIPNRWQSCEAL ALRVMAKIMRECWYANGAARLTALRIKKTLSQLSQQEGIKM |
| 8 | Human VEGFA Uniprot no: P15692 version number 2 as of Nov. 16, 2001 | MNFLLSWVHWSLALLLYLHHAKWSQAAPMAEGGGQNHHEVVKFMDVYQ QRSYCHPIETLVDIFQEYPDEIEYIFKPSCVPLMRCGGCCNDEGLECVPTEESNI NITMQIMRIKPHQGQHIGEMSFLQHNKCECRPKKDRARQEKKSVRGKGKGQK QKRKRKKSRYKSWSVYVGARCCLMPWSLPGPHPCGPCSERRKHLFVQDPQTC TCKCSCKNTDSRCKARQLELNERTCRCDKPRR |
| 9 | HUMAN Platelet-derived growth factor receptor alpha Uniprot no: P16234, version number 1 as of Apr. 1, 1990 | MGTSHPAFLVLGCLLTGLSLILCQLSLPSILPNENEKVVQLNSSFSLRCFGESE EVSWQYPMSEEESSDVEIRNEENNSGLFVTVLEVSSASAAHTGLYTCYYNHT TQTEENELEGRHIYIYVPDPDVAFVPLGMTDYLVIVEDDDSAIIPCRTTDPETP PVTLHNSEGVVPASYDSRQGFNGTFTVGPYICEATVKGKKFQTIPFNVYALK KATSELDLEMEALKTVYKSGETIVVTCAVFNNEVVDLQWTYPGEVKGKGIT TMLEEIKVPSIKLVYTLTVPEATVKDSGDYECAARQATREVKEMKKVTISVH HEKGFIEIKPTFSQLEAVNLHEVKHFVVEVRAYPPPRISWLKNNLTLIENLTEIT ITTDVEKIQEIRYRSKLKLIRAKEEDSGHYTIVAQNEDAVKSYTFELLTQVPSSI SILDLVDDHHGSTGGQTVRCTAEGTPLPDIEWMICKDKIKKCNNETSWTILANN NVSNIITEIHSRDRSTVEGRVTFAKVEETIAVRCLAKNLLGAENRELKLVAPTL LRSELTVAAAVLVLLVIVIISLIVLVVIWKQKPRYEIRWRVIESISPDGHEYIYV VDPMQLPYDSRWEFPRDGLVLGRVLGSGAFGKVVEGTAYGLSRSQPVMKV VAVKMLKPTARSSEKQALMSELKIMTHLGPHLNIVNLLGACTKSGPIYIITEY YCFYGDLVNYLHKNRDSFLSHHPEKPKKELDIFGLNPADESTRSYVILSFENN |

TABLE 1-continued

Sequences of proteins used herein.

| SEQ ID NO. | What | Sequence |
|---|---|---|
| | | NGDYMDMKQADTTQYVPMLERKEVSKYSDIQRSLYDRPASYKKKSMLDSE EVKNLLSDDNSEGLTLLDLLSFTYQVARGMEFLASKNCVHRDLAARNVLLA AQGKIVKICDFGLA RDIMHDSNYVSKGSTFLPVKWMAPESIFDNLYTTLSDVWSYGILLWEIFSLG GTPYPGMMVDSTFYNKIKSGYRMAKPDHATSEVYEIMVKCWNSEPEKRPS FYHLSEIVENLLPGQYKKSYEKIHLDFLKSDHPAVARMRVDSDNAYIGVTY KNEEDKLKDWEGGLDEQRLSADSGYIIPLPDIDPVPEEEDLGKRNRHSSQTS EESAIETGSSSSTFIKREDETIEDIDMMDDIGIDSSDLVEDSFL |
| 10 | Human Ang-1 Uniprot no: Q15389 version number 2 as of Jan. 1, 1998 | MTVFLSFAFLAAILTHIGCSNQRRSPENSGRRYNRIQHGQCAYTFILPEHD GNCRESTTDQYNTNALQRDAPHVEPDFSSQKLQHLEHVMENYTQWLQ KLENYIVENMKSEMAQIQQNAVQNHTATMLEIGTSLLSQTAEQTRKLTD VETQVLNQTSRLEIQLLENSLSTYKLEKQLLQQTNEILKIHEKNSLLEHKI LEMEGKHKEELDTLKEEKENLQGLVTRQTYIIQELEKQLNRATTNNSVL QKQQLELMDTVHNLVNLCTKEGVLLKGGKREEEKPFRDCADVYQAGF NKSGIYTIYINNMPEPKKVFCNMDVNGGGWTVIQHREDGSLDFQRGWK EYKMGFGNPSGEYWLGNEFIFAITSQRQYMLRIELMDWEGNRAYSQYD RFHIGNEKQNYRLYLKGHTGTAGKQSSLILHGADFSTKDADNDNCMCK CALMLTGGWWFDACGPSNLNGMFYTAGQNHGKLNGIKWHYFKGPSYS LRSTTMMIRPLDF |
| 11 | Human HGF Uniprot no: P14210 version number 2 as of Aug. 1, 1991 | MWVTKLLPALLLQHVLLHLLLLPIAIPYAEGQRKRRNTIHEFKKSAKTTL IKIDPALKIKTKKVNTADQCANRCTRNKGLPFTCKAFVFDKARKQCLWF PFNSMSSGVKKEFGHEFDLYENKDYIRNCIIGKGRSYKGTVSITKSGIKCQ PWSSMIPHEHSFLPSSYRGKDLQENYCRNPRGEEGGPWCFTSNPEVRYE VCDIPQCSEVECMTCNGESYRGLMDHTESGKICQRWDHQTPHRHKFLPE RYPDKGFDDNYCRNPDGQPRPWCYTLDPHTRWEYCAIKTCADNTMND TDVPLETTECIQGQGEGYRGTVNTIWNGIPCQRWDSQYPHEHDMTPENF KCKDLRENYCRNPDGSESPWCFTTDPNIRVGYCSQIPNCDMSHGQDCYR GNGKNYMGNLSQTRSGLTCSMWDKNMEDLHRHIFWEPDASKLNENYC RNPDDDAHGPWCYTGNPLIPWDYCPISRCEGDTTPTIVNLDHPVISCAKT KQLRVVNGIPTRTNIGWMVSLRYRNKHICGGSLIKESWVLTARQCFPSR DLKDYEAWLGIHDVHGRGDEKCKQVLNVSQLVYGPEGSDLVLMKLAR PAVLDDFVSTIDLPNYGCTIPEKTSCSVYGWGYTGLINYDGLLRVAHLYI MGNEKCSQHHRGKVTLNESEICAGAEKIGSGPCEGDYGGPLVCEQHKM RMVLGVIVPGRGCAIPNRPGIFVRVAYYAKWIHKIILTYKVPQS |
| 12 | PDGFB human Uniprot no: P01127 version number 1 as of Jul. 21, 1986 | MNRCWALFLSLCCYLRLVSAEGDPIPEELYEMLSDHSIRSFDDLQRLLHG DPGEEDGAELDLNMTRSHSGGELESLARGRRSLGSLTIAEPAMIAECKTR TEVFEISRRLIDRTNANFLVWPPCVEVQRCSGCCNNRNVQCRPTQVQLR PVQVRKIEIVRKKPIFKKATVTLEDHLACKCETVAAARPVTRSPGGSQEQ RAKTPQTRVTIRTVRVRRPPKGKHRKFKHTHDKTALKETLGA |
| 13 | Human IL-10 Uniprot no: P22301 version number 1 as of Aug. 1, 1991 | MHSSALLCCLVLLTGVRASPGQGTQSENSCTHFPGNLPNMLRDLRDAFS RVKTFFQMKDQLDNLLLKESLLEDFKGYLGCQALSEMIQFYLEEVMPQ AENQDPDIKAHVNSLGENLKTLRLRLRRCHRFLPCENKSKAVEQVKNAF NKLQEKGIYKAMSEFDIFINYIEAYMTMKIRN |

EXPERIMENTAL EXAMPLES

1. Cryopreservation of Umbilical Cord Tissue Prior to Isolation of Mesenchymal Stem Cells Umbilical cord tissue (the umbilical cords were donated with informed consent of the mother) was processed for the subsequent isolation of the mesenchymal stel cells from the amniotic membrane of the umbilical cord as follows.

1.1 Washing of Umbilical Cord Tissue Sample:
  a. Remove scalpels from the protective cover.
  b. Hold the umbilical cord securely using the forceps and cut the cord into a 10 cm length piece using a scalpel. Place the unusable cord back in the original tissue cup.
  c. Transfer the 10 cm long umbilical cord piece into a new 150 mm culture dish. The 150 mm culture dish may be used in place of the cups.
  d. Use the cover of the 150 mm culture dish as a resting place for forceps and scalpel.
  e. Remove 25 ml Plasmalyte A (Baxter, Catalog #2B2543Q) with a 30 ml syringe. Hold the syringe at a 45° angle using one hand and dispense the Plasmalyte A directly onto the umbilical cord tissue.
  f. Holding the culture dish at a slight angle remove the Plasmalyte A with a 30 ml syringe and blunt needle.
  g. Collect used Plasmalyte A in a 300 ml transfer bag that serves as a trash container and dispose it in the biohazard bin.
  h. Repeat wash procedure, if necessary using a new culture dish for each wash. Make sure all blood clots on the surface have been removed. More Plasmalyte A can be used if needed to clean the tissue.
  i. Place the tissue into a new labeled tissue culture dish to continue cutting the tissue. Place 20 ml of Plasmalyte A into the dish so the tissue does not dry out while cutting it.

j. Cut the cords into equal approximately 1-cm sections resulting in 10 sections in total.
k. Further cut each 1 cm section into smaller pieces with approximately 0.3 cm×0.3 cm to 0.5 cm×0.5 cm per section.
l. Remove any Plasmalyte A that is in the dish.
m. Pull 25 ml Plasmalyte A with a 30 ml syringe from the original Plasmalyte A bag and dispense directly on the umbilical cord tissue pieces.
n. Hold culture dish in an angle to collect all Plasmalyte A used for washing the tissue on one side and remove it with a syringe and blunt needle.
o. Repeat wash one more time. There should not be any clots left.

NOTE: If the cord is not frozen right away, the umbilical cord tissue is kept in Plasmalyte A until ready to freeze.

1.2 Cryopreservation of Umbilical Cord Tissue:
a. Prepare cryopreservation solution:
  i. Prepare 50 ml freezing solution consisting of 60% Plasmalyte A, 30% of 5% Human Serum Albumin, and 10% dimethyl sulfoxide (DMSO).
  ii. Label a 150 ml transfer bag with "Tissue freeze solution" and attach a plasma transfer set to the port using aseptic technique.
  iii. Remove 30 ml Plasmalyte A with a 30 ml Syringe from the original Plasmalyte A bag and transfer it in the transfer bag labeled "tissue freeze solution" with the time and date solution is made.
  iv. Remove 15 ml of 5% Human Serum Albumin with a 20 ml syringe and transfer it into the labeled transfer bag.
  v. Add 5 ml DMSO to the transfer bag.
  vi. Mix well and record mixing of freeze solution
b. Remove the Plasmalyte A from the tissue before adding the freeze solution.
c. Using a 60 ml syringe, pull all 50 mls of the freeze solution into the syringe add approximately 30 ml freeze solution to the 150 mm cell culture dish containing the umbilical cord tissue. Place a blunt needle on the syringe to keep it sterile.
d. Swirl the culture dish containing the tissue and freezing solution every minute for 10 minutes.
e. Using forceps, select 8 randomly chosen sections and place them in each of the four 4 ml cryovials. Select 4 randomly chosen sections and place them into one 1.8 ml cryovial. These sections should be free of blood clots.
f. Fill each cryovial containing the umbilical cord tissue with the remaining freezing solution to the 3.6 ml filling line for the 4 ml tubes and the 1.8 ml line for the 1.8 ml Nunc vial.
g. Label one Bactec Lytic/10—Anaerobic/F and one Bactec Plus Aerobic/F bottle with tissue ID.
h. Remove 20 ml freeze solution from the culture dish with a syringe and a blunt needle, after wiping the Bactec vials with an alcohol swab, switch the blunt needle for an 18 g needle and inoculate the aerobic and the anaerobic Bactec bottles with 10 ml each.
i. Start controlled rate freezer.
j. After controlled rate freeze is completed place the units in a continuous temperature monitored liquid nitrogen freezer until further use.

2. Isolation of Mesenchymal Cord Lining Stem Cells from Umbilical Cord Tissue 2.1. Preparing Media for Processing MSCs from Umbilical Cord Tissue:
a. To make 500 ml PTT-6 (culture/growth media) add the following in the order listed:
  i. DMEM, 250 ml
  ii. M171 118 ml
  iii. DMEM F12 118 ml
  iv. FBS 12.5 ml (final concentration of 2.5%)
  v. EGF 1 ml (final concentration of 10 ng/ml)
  vi. Insulin 0.175 ml (final concentration of 5 µg/ml)

The above-mentioned volumes of components i. to vi when result in a final volume of 499.675 ml culture medium. If no further components are added to the culture medium, the remaining 0.325 ml (to add up to a volume of 500 ml) can, for example, be any of components i. to iv, that means either DMEM, M171, DMEM/F12 or FBS. Alternatively, the concentration of the stock solution of EGF or Insulin can of course be adjusted such that the total volume of the culture medium is 500 ml. Alternatively, a stock solution of an antibiotic such as Penicillin-Streptomycin-Amphotericin can be added to result in a final volume of 500 ml. It is also possible to add to the culture medium a volume of 0.325 ml of one or more of the following supplements: adenine, hydrocortisone, 3,3',5-Triiodo-L-thyronine sodium salt (T3), thereby reaching a total volume of 500 ml culture medium.

vii. Label the bottle "PTT-6" with date media was prepared, initial of the operator, and the phrase "expires on" followed by the expiration date. Expiration date is the earliest expiration date of any of the component or 1 month from the preparation date, whichever comes first.
b. To make the rinse media (Hank's Buffered Salt Solution (HBSS) without Calcium or Magnesium and with 5% FBS), add 2.5 ml FBS to 47.5 ml of HBSS in a 50 ml centrifuge tube. Label the tube "Rinse Media" with operator initials and date the media is made.
c. All media will be tested for sterility using Bactec Lytic/10—Anaerobic/F (Becton Dickinson & Company) and Bactec Pluc+Aerobic/F (Becton Dickinson & Company). Inject 20 ml of prepared media into each bottle.

2.2 Thawing of Umbilical Cord Tissue for MSC Harvesting:
a. Initiate the thaw once an operator is prepared to process the sample in the clean room. Do not thaw more than 1 vial at a time unless the vials originate from the same donor.
b. Wipe the water bath with disinfectant followed by 70% isopropanol and fill it with 1 L sterile water. Heat the water bath up to 36-38° C.
c. Prepare 10 mL of rinse medium consisting of 70% to 90% PlasmaLyte A in the clean room under a biosafety cabinet. Sterile filter the solution with a 0.2-µm syringe filter attached to a 10 ml syringe and keep the solution refrigerated until use.
d. Place a processing label on a 50 ml conical tube.
e. Confirm water bath temperature is at 36-38° C.
f. Take vial(s) of tissue from the liquid nitrogen storage and thaw rapidly in the 37° C. water bath filled with 1 L of sterile water. The vial holder for the Mr. Frosty Nalgene Cryo 1° C. freezing container floats with vials in place and can be used as a floating rack when thawing samples.
g. Remove the vial from the water bath and spray them with 70% Isopropanol solution. A good time to pull the vial from the water bath is when small ice can be seen floating in the vial—suggest internal temperature of the vial is less than 37° C.
  h. Place vial into pass-through and alert the clean room processing technician.
2.3 Preparing for Tissue Processing:
  a. Umbilical cord tissue processing should be performed in an environmentally monitored (EM) clean room. At the end of each shift, full room and hood cleaning are performed
  b. Prepare/clean the biosafety cabinet.
  c. Perform viable particle counting while working in the biosafety cabinet.
  d. Assemble all necessary supplies in the biosafety cabinet checking each for packaging damage and expiration dates. When handling syringes, serological pipets, sterile forceps, scalpels, tissue plates, and needles, make sure not to touch any surface that will come in contact with the sterile product. Only the exterior of the syringe barrel, tubing, plunger tip and/or needle cap or sheath may be safely handled. Discard supply if the surface has been touched or has touched a non-sterile surface.
  e. Record lot numbers and expiration dates (if applicable) of all reagents and supplies to be used.
  f. Receive the thawed vial by cleaning the vial with lint-free wipe moistened with 70% alcohol before transferring into the biosafety cabinet.
  g. Using an aspirating needle with a syringe, withdraw as much liquid from the vial. Avoid suctioning the tissue.
  h. Using sterile forceps, transfer the tissue into a sterile 100 mm petri dish.
  i. Add an aliquot of 5 ml rinse medium to the tissue fragments.
  j. Swirl the contents for 15-30 seconds, then remove the rinse medium with a pipette or syringe with aspirating needle. Repeat this rinse process twice.
  k. Add 2 mL of rinse medium to the tissue to avoid drying out the tissue.
2.4. Initiating MSC Outgrowth from Tissue:
  a. Label the bottom of a 6-well plate "Outgrowth 1" with MSC lot number or umbilical cord tissue ID and the date outgrowth is initiated. If 60 mm tissue culture dish is used, divide the plate into 4 quadrants by drawing a grid on the bottom of the dish.
  b. Using sterile, disposable forceps, place one 3×3 mm to 5×5 mm tissue into each well. If using a 60 mm tissue culture dish, place the tissue into the middle of each quadrant to keep the tissues apart (more than 1 cm from each other).
  c. Fill each well with 3 ml of PTT-6.
  d. Using an aspirating needle coupled to 30 ml syringe, withdraw enough media to barely cover the tissue. Do not tilt the plate. Do not touch the bottom of the well with the aspirating needle.
  e. Using an inverted light microscope, observe for cell outgrowth every day (24±6 hrs). Real time cell culture imaging system may be used in place of the light microscope.
  f. Change media every day. Be sure to equilibrate the media to room temperature before use.
    i. Aspirate off the medium.
    ii. Add 3 ml of PTT-6.
    iii. Aspirate until tissue is barely submerged in the medium.
  g. When cellular outgrowth is observed from the tissue, transplant the tissue to a new 6-well plate using the same procedure as 4.a to 4.e above except label the plate "Outgrowth 2". Maintain cell outgrowth in "Outgrowth 1" plate by adding 2 ml of PTT-6 to each well. Observe for confluency every day. Replace media every 2-3 days (be sure to equilibrate the media to room temperature before use).
  h. When cell outgrowth is observed in "Outgrowth 2" plate, repeat step 4.a to 4.e except label the plate "Outgrowth 3." Maintain cell outgrowth in "Outgrowth 2" plate by adding 2 ml of PTT-6 to each well. Observe for confluency every day. Replace media every 2-3 days (be sure to equilibrate the media to room temperature before use).
  i. When outgrowth is observed in "Outgrowth 3" plate, discard the tissue. If the tissues are very small and do not seem to interfere with cell growth, dispose of the tissue when subculturing.
  j. When cells reach 40-50% confluency, observe cells every days to prevent over-expansion.
  k. When cells reach 70-80% confluency, subculture the cells. Do not allow cells to expand beyond 80% confluence.

With the size of the tissue explants being about 1-3 mm, and the tissue explant/cell culture is performed in 175 mm squared culture dishes, the average number of mesenchymal stem cells harvested from an explant is typically about 4,000-6,000 cells/explant. Accordingly, when the mesenchymal stem cells are simultaneously grown out of 48 explants about 300,000 cells can be obtained at harvest. These 300,000 mesenchymal stem cells collected from explants can then be used for subculturing by seeding a 175 $cm^2$ cell culture flask with such 300,000 cells as described in the following Example 2.5 (this can be referred to as Passage 1). The mesenchymal stem cells obtained from this passage 1 can then be used to seed again 175 $cm^2$ flasks (Passage 2) and expand the cells as described in the following Example 2.5. The cells obtained from both Passage 1 and Passage 2 can be "banked" by cryo-preservation, with the mesenchymal stem cells obtained after Passage 2 being considered to represent the Master Cell Bank which will be for further expansion of the mesenchymal stem cells, for example, in a bioreactor as explained below in Example 2.7.

2.5. Subculturing MSC in Cell Culture Dishes
  a. Perform viable particle while working in the biosafety cabinet. Equilibrate all media to room temperature before use.
  b. When cell outgrowth reaches about 70-80% confluency, subculture cells.
    i. Remove PTT-6 from the petri dish.
    ii. Rinse with HBSS without Calcium or Magnesium.
    iii. Add 0.2 ml 1× TrypLE-EDTA and swirl for 1-2 minutes.
    iv. Tilt the dish 30-45° to allow cells to shift down by gravitational flow. Gentle tapping on the side of the plate expedites detachment.
    v. Add 1 ml of PTT-6. Pipette up and down gently then transfer cells to a 15 ml centrifuge tube. Use clean pipette tip with each well. Cells from all 6 wells can be pooled into a single 15 ml tube.
    vi. Centrifuge for 10 minutes at 1200 rpm.
    vii. Remove supernatant and resuspend cells with 5 ml PTT-6.
  c. Subculturing MSC
    i. Aliquot 50 μl of the cell suspension and assay for TNC and viability by Trypan Blue Exclusion Assay.

ii. Count cells using a hemocytometer. Expect to count 20-100 cells/square. If the count higher than 100, dilute the original sample 1:5 and repeat Trypan Blue method using a hemocytometer.
iii. Calculate viable cells/ml and total viable cells:
  1. Viable cells/ml=viable cell count×dilution factor×$10^4$
  2. Total viable cells=viable cell count×dilution factor× total volume×$10^4$
iv. Calculate % viability:
  1. % viability=viable cell count×100/(viable cell count+ dead cell count)
v. Dilute the cell suspension to $1.0×10^6$ cells/ml:
  1. "X" volume=Total viable cells/$10^6$ cells/ml
  2. For example, if total viable cell number is $1.0×10^7$;
  3. "X"=$10^7/10^6$ cells/ml or 10 ml, therefore, you would bring your total cell volume up to 10 ml by adding 5 ml to your cell suspension (that is at 5 ml).
vi. If the cell suspension is less than 106/ml, determine the volume required to seed 2×106 cells for each 150 mm petri dish or 175 cm2 flask.
  1. Volume for $2×10^6$ cells=$2×10^6$ cells÷viable cells/ml
  2. For example, if viable cells/ml is $8×10^5$ cells/ml, $2×10^6$ cells÷$8×10^5$ cells/ml or 2.5 ml are needed.
vii. Set aside 0.5 ml for MSC marker analysis.
viii. Seed $2×10^6$ cells to each 150 mm petri dish or 175 cm$^2$ flask with 30 ml PTT-6.
ix. Observe cells for attachment, colony formation, and confluence every three days. When cells reach 40-50% confluence, observe cells every one-two days to prevent over-expansion. DO NOT allow cells to expand beyond 80% confluence. A real time cell culturing monitoring system can be used in place of the light microscope.
x. Replace media every 2-3 days.

2.6 Cryopreserving MSC Cells
a. Perform viable particle while working in the biosafety cabinet.
b. When cells reach 70-80% confluence, detach cells using 2 ml 1× TrypLE-EDTA for each 150 mm petri dish or 175 cm2 flask.
  i. Remove PTT-6 from the petri dish.
  ii. Wash with 5 ml HBSS or PBS without calcium or magnesium.
  iii. Add 2 ml 1× TrypLE-EDTA and swirl for 1-2 minutes.
  iv. Tilt the dish 30-45° to allow cells to shift down by gravitational flow. Gentle tapping on the side of the petri dish helps to expedite detachment.
  v. Add 10 ml PTT-6 to inactivate TrypLE. Mix well to dissociate cell clumps.
  vi. Transfer cells to 15 ml centrifuge tube using a Pasteur pipette.
  vii. Centrifuge for 10 minutes at 1200 rpm.
  viii. Aspirate medium and resuspend with 10 ml PTT-6.
  ix. Aliquot 50 μl and determine total viable cell number and % viability as above. Cell count will need to be performed within 15 minutes as the cells may start clumping.
c. Preparing cells for cryopreservation
  i. Prepare Cell Suspension Media and Cryopreservation Media and freeze the cells 2.7. Subculturing (expansion) of MSC in a Quantum Bioreactor (Terumo BTC, Inc.)

It is also possible to use a Quantum Bioreactor can used to expand the MSC. The starting cell number for the expansion in the Quantum Bioreactor should range between 20 to 30 million cells per run. The typical yield per run is 300 to 700 million MSC at harvest. The Bioreactor is operated following the protocol of the manufacturer. The so obtained mesenchymal stem cells are typically cryo-preserved (see below) and serve as Working Cell Bank.

Materials/Reagents:
1. Quantum Expansion Set
2. Quantum Waste Bag
3. Quantum Media Bag
4. Quantum Inlet Bag
5. PTT-6
6. PBS
7. Fibronectin
8. TrypLE
9. 3 ml syringe
10. Glucose test strips
11. Lactate test strips
12. 60 ml Cell Culture Plate or equivalent
13. Medical Grade 5% $CO_2$ Gas-mix
14. 50 ml Combi-tip Equipment:
1. Biosafety Cabinet
2. Glucose Meter (Bayer Healthcare/Ascensia Contour Blood Glucose Meter)
3. Lactate Plus (Nova Biomedical)
4. Peristaltic pump with head
5. Centrifuge, Eppendorf 5810
6. Sterile Tube Connector
7. M4 Repeat Pipettor
8. RF Sealer Procedure:
1. Preparing the Quantum Bioreactor
  a) Priming the Quantum Bioreactor
  b) Coating the bioreactor:
    1) Prepare the fibronectin solution in the biosafety cabinet.
      1) Allow lyophilized fibronectin to acclimate to room temperature (>15 min at room temperature)
      2) Add 5 ml of sterile distilled water; do not swirl or agitate
      3) Allow fibronectin to go into solution for 30 min.
      4) Using a 10 ml syringe attached with an 18 g needle, transfer the fibronectin solution to a Ccell inlet bag containing 95 ml of PBS.
    2) Attach the bag to the "reagent" line
    3) Check for bubbles (bubbles may be removed by using "Remove IC Air" or "Remove EC Air" and using "Wash" as the inlet source.
    4) Open or set up program for coating the bioreactor (FIG. 1. Steps 3-5).
    5) Run the program
    6) While the program is running to coat the bioreactor, prepare a media bag with 4 L of PTT-6 media.
    7) Attach the media bag to the IC Media line using a sterile tube connector.
    8) When the bioreactor coating steps are completed, detach the cell inlet bag used for fibronectin solution using a RF sealer.
  c) Washing off excess fibronectin
  d) Conditioning the bioreactor with media
2. Culturing the Cells in the Quantum Bioreactor
  a) Loading and attaching the cells with Uniform Suspension:
  b) Feeding and cultivation of the cells
    1) Chose media flow rate to feed the cells.
    2) Sample for lactate and glucose everyday.
    3) Adjust the flow rate of the media as the lactate levels increase. The actual maximal tolerable lactate concentration will be defined by a flask culture from which the cells originate. Determine if adequate PTT-6 media is in the media bag. If necessary, replace the PTT-6 media bag with a fresh PTT-6 media bag.
   4) When the flow rate has reached the desired value, measure lactate level every 8-12 hours. If the lactate level does not decrease or if the lactate level continues to increase, harvest the cells.
3. Harvesting the Cells from the Quantum Bioreactor
   a) When lactate concentration does not decrease, harvest the cells after sampling for lactate and glucose for the last time.
   b) Harvesting the cells:
      1) Attach cell inlet bag filled with 100 ml TrypLE to the "Reagent" line using a sterile tube connector.
      2) Confirm sufficient PBS is in the PBS bag. If not, attach a new bag with at least 1.7 liters of PBS to the "Wash" line using a sterile tube connector.
      3) Run the Harvest program
4. Cryopreserving the Cells
   1) Once the cells have been harvested, transfer the cells to 50 ml centrifuge tube to pellet the cells.
   2) Resuspend using 25 ml of cold cell suspension solution. Count the cells using Sysmex or Biorad Cell counter. Attach the cell count report to the respective Quantum Processing Batch Record.
   3) Adjust cell concentration to $2 \times 10^7/\text{ml}$
   4) Add equal volume cryopreservation solution and mix well (do not shake or vortex)
   5) Using a repeat pipettor, add 1 ml of the cell suspension in cryopreservative to each 1.8 ml vial. Cryopreserve using the CRF program as described in the SOP D6.100 CB Cryopreservation Using Controlled Rate Freezers
   6) Store the vials in a designated liquid nitrogen storage space.
   7) Attach the CRF run report to the form respective MSC P3-Quantum Processing Batch Record.

3. Analysis of Stem Cell Marker Expression in Mesenchymal Cord Lining Stem Populations Isolated from Umbilical Cord Tissue, Using Different Culture Media Flow cytometry experiments were carried out to to analyse mesenchymal stem cells isolated from the umbilical cord for the expression of the mesenchymal stem cell markers CD73, CD90 and CD105.

For these experiments, mesenchymal stem cells were isolated from umbilical cord tissue by cultivation of the umbilical cord tissue in three different cultivation media, followed by subculturing of the mesenchymal stem cells in the respective medium as set forth in Example 2.

The three following culture media were used in these experiments: a) 90% (v/v/DMEM supplemented with 10% FBS (v/v), b) the culture medium PTT-4 described in US patent application application 2008/0248005 and the corresponding International patent application WO 2007/046775 that consist of 90% (v/v) CMRL1066, and 10% (v/v) FBS (see paragraph [0183] of WO 2007/046775 and c) the culture medium of the present invention PTT-6 the composition of which is described herein. In this flow cytometry analysis, two different samples of the cord lining mesenchymal stem cell (CLMC) population were analysed for each of the three used culture media.

The following protocol was used for the flow cytometry analysis.

Materials and Methods

| Instruments name | Company Name | Serial Name |
|---|---|---|
| BD FACS CANDO | BD | V07300367 |
| Inverted Microscope, CKX41SF | Olympus | 4K40846 |
| Centrifuge, Micro spin Tabletop | Biosan | 010213-1201-0003 |

| Reagent list | Company Name | CatLog Number |
|---|---|---|
| 10 X Trypsin | Biowest | X0930-100 |
| 10 X PBS | Lonza | 17-517Q |
| DMEM | Lonza | 12-604F |
| Fetal Bovine Serum | GE healthcare | A11-151 |

| Antibody list | Company Name | CatLog Number |
|---|---|---|
| Human CD73 Purified AD2 0.1 mg | BD | 550256 |
| Human CD90 Purified 5E10 1 mL | BD | 550402 |
| Human CD105 Purified 266 0.1 mg | BD | 555690 |
| Alexa Fluor 647 goat anti-mouse IgG (H + L) *2 mg/mL* | BD | A21235 |

| Reagents name | Composition |
|---|---|
| 1 XPBS (1 L) | 100 ml of 10 X PBS + 900 ml of sterile distilled H20 |
| 1x PBA (50 ml) | 49.5 ml of 1XPBS + 0.5 ml of FBS |

Procedure a) Cell Isolation and Cultivation from the Umbilical Cord Lining Membrane
   1. Explant tissue samples were incubated in a cell culture plate and submerged in the respective medium, then keep it in $CO_2$ incubator at 37° C. as explained in Example 2.
   2. The medium was changed every 3 days.
   3. Cell outgrowth from tissue culture explants was monitored under light microscopy.
   4. At a confluence of about 70%, cells were separated from dish by trypsinization (0.0125% trypsin/0.05% EDTA) and used for flow cytometry experiments.

b) Trypsinization of Cells for Experiments
   1. Remove medium from cell culture plate
   2. Gently rinse with sterile 1×PBS to remove traces of FBS as FBS will interfere with the enzymatic action of trypsin.
   3. Add 1× trypsin to cell culture plate and incubate for 3-5 min in 37° C.
   4. Observe cells under microscope to ensure that they are dislodged. Neutralize trypsin by adding complete media containing FBS (DMEM with 10% FBS).
   5. Use a pipette to break up cell clumps by pipetting cells in media against a wall of the plate. Collect and transfer cell suspension into 50 ml centrifuge tubes
   6. Add sterile 1×PBS to plate and rinse it, Collect cell suspension into the same centrifuge tube.
   7. Centrifuge it at 1800 rpm for 10 mins.

8. Discard supernatant and re-suspend cell pellet with PBA medium.

c) Counting Cells
1. Ensure that the haemocytometer and its cover slip are clean and dry, preferably by washing them with 70% ethanol and letting them dry before wiping them with Kim wipes (lint-free paper).
2. Aliquot a small amount of cells in suspension into a micro centrifuge tube and remove from the BSC hood.
3. Stain cells in suspension with an equal volume of Trypan Blue, e.g. to 500 µl of suspension add 500 µl of Trypan Blue (dilution factor=2×, resulting in 0.2% Trypan Blue solution).
4. Avoid exposure of cells to Trypan Blue for longer than 30 mins as Trypan Blue is toxic and will lead to an increase in non-viable cells, giving a false cell count.
5. Add 20 µl of the cell suspension mixture to each chamber of a haemocytometer and view under a light microscope.
   a. Count the number of viable cells (bright cells; non-viable cells take up Trypan Blue readily and thus are dark) in each quadrant of the haemocytometer for a total of 8 quadrants in the upper and lower chamber.
   Total cell count is given as (Average number of cells/quadrant)×$10^4$ cells/ml.

d) Staining Cells
   i. Preparation before staining cells
      Cell suspension are aliquot into 3 tubes (CD73, CD90, CD105) in duplicates and 2 tubes (negative control), each containing 50,000 cells.
   ii. Staining with primary antibody (Ab)
      Add 1 µl [0.5 mg/ml Ab] of primary antibody to 100 ul cell suspension. Incubate at 4° C. for 45 min.
      Make up to 1 ml with PBA.
      Centrifuge 8000 rpm at 4° C. for 5 mins.
      Remove supernatant.
      Add 1 ml of PBA and re-suspend pellet
      Centrifuge 8000 rpm at 4° C. for 5 mins.
      Remove supernatant.
      Re-suspend in 100 ul PBA.
   iii. Staining with secondary Ab—in the dark
      Add 1 ul [0.5 mg/ml ab] of secondary antibody to 100 ul cell suspension. Incubate at 4° C. for 30 min.
      Make up to 1 ml with PBA.
      Centrifuge 8000 rpm at 4° C. for 5 mins.
      Remove supernatant.
      Add 1 ml of PBA and re-suspend pellet
      Centrifuge 8000 rpm at 4° C. for 5 mins.
      Remove supernatant
      Re-suspend in 200-300 ul PBA for flow cytometry analysis
      Transfer cells to FACS tube for reading in BD FACS CANDO flow cytometry.

Figure 6B:
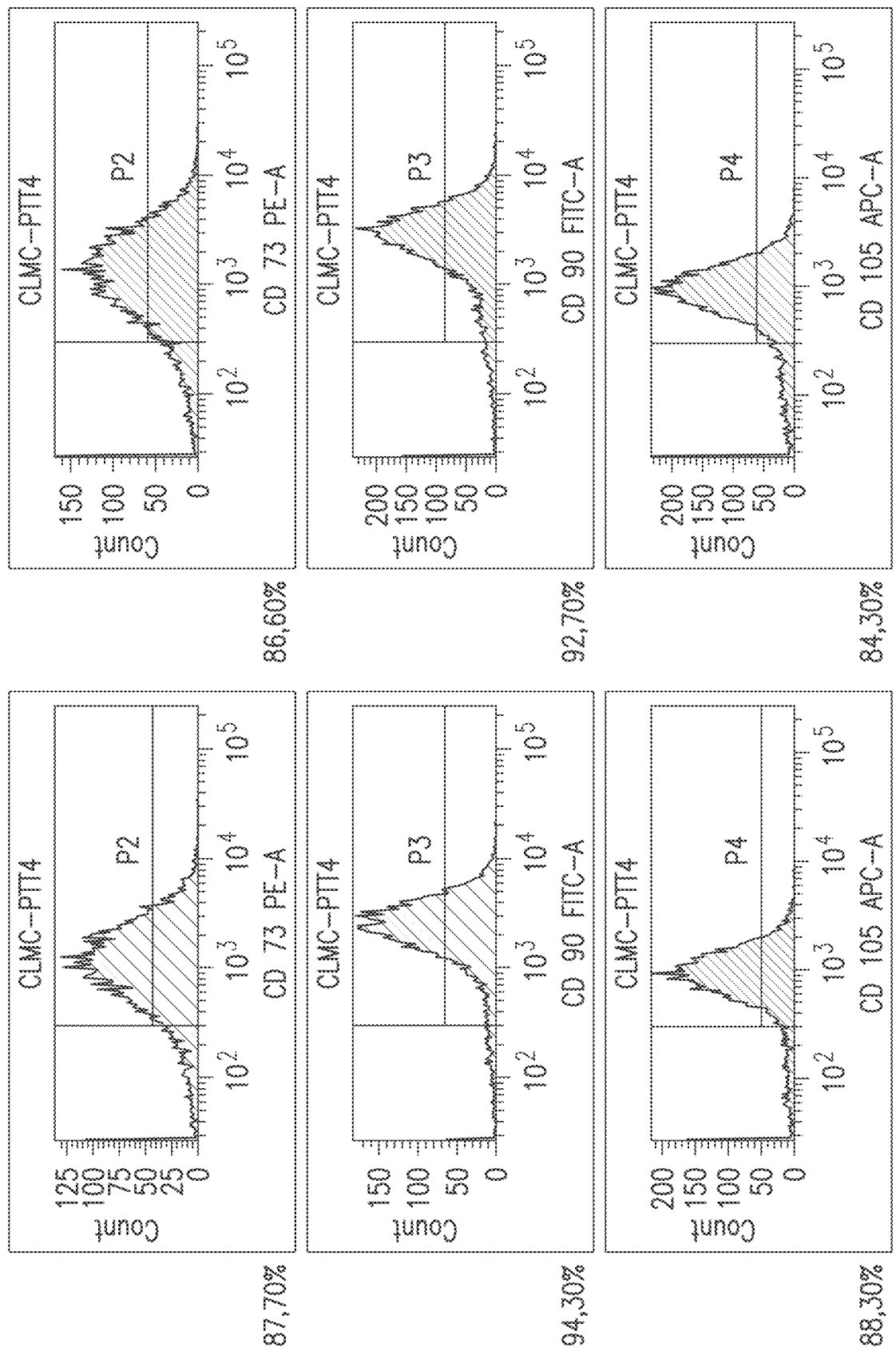
Figure 6C:
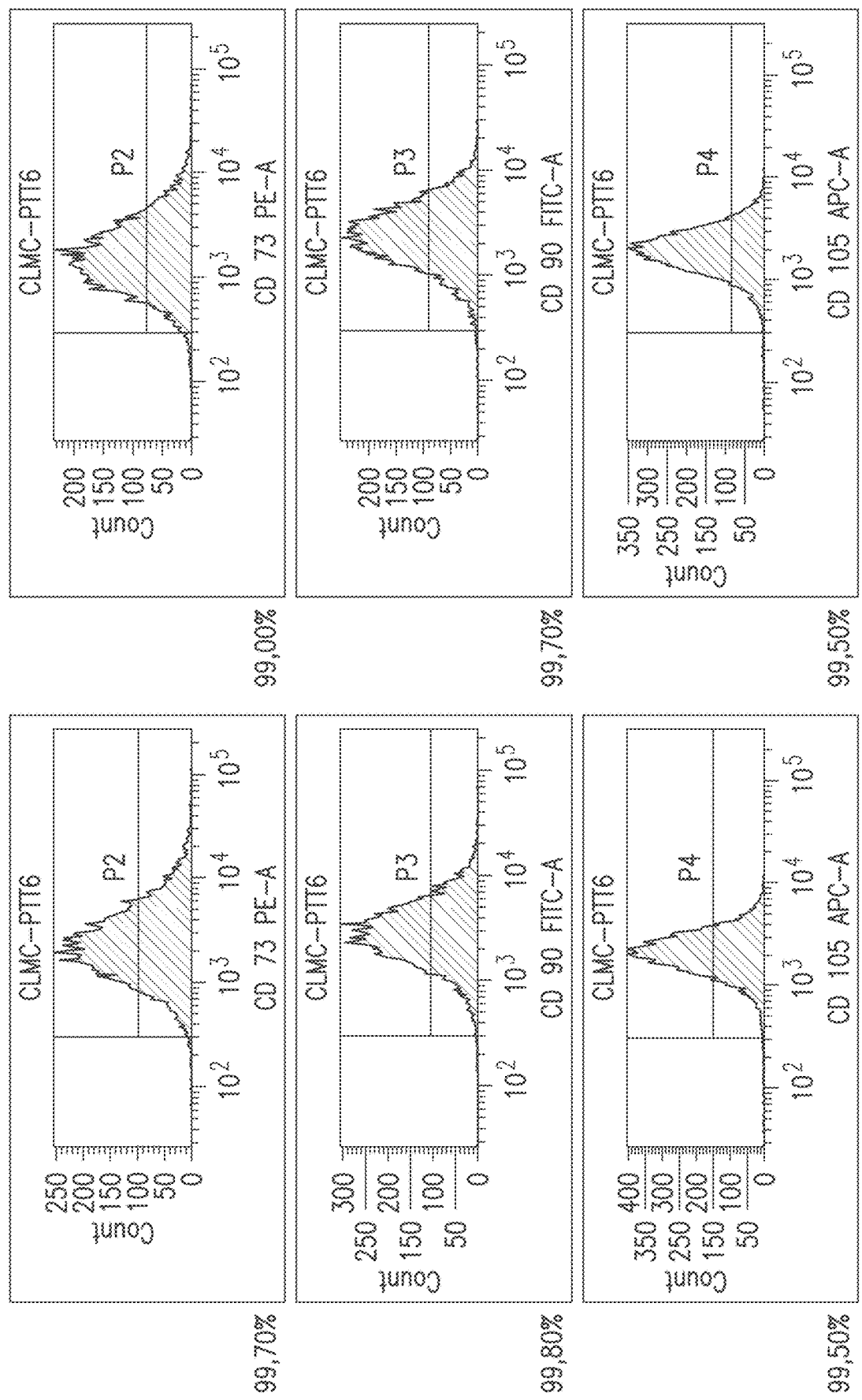

The results of the flow cytometry analysis are shown in FIG. 6a to FIG. 6c. FIG. 6a shows the percentage of isolated mesenchymal cord lining stem cells expressing stem cell markers CD73, CD90 and CD105 after isolation from umbilical cord tissue and cultivation in DMEM/10% FBS, FIG. 6b shows the percentage of isolated mesenchymal cord lining stem cells expressing stem cell markers CD73, CD90 and CD105 after isolation from umbilical cord tissue and cultivation in PTT-4 and FIG. 6c shows the percentage of isolated mesenchymal cord lining stem cells expressing stem cell markers CD73, CD90 and CD105 after isolation from umbilical cord tissue and cultivation in PTT-6. As can be seen from FIG. 6a, the population isolated using DMEM/10% FBS as culture medium cultivation has about 75% CD73+ cells, 78% 90+ cells and 80% CD105+ cells (average of two experiments), while after isolation/cultivation of umbilical cord tissue using PTT-4 culture medium (see FIG. 6b) the number of mesenchymal stem cells that are CD73-positive, CD90-positive and CD105-positive are about 87% (CD73+ cells), 93%/CD90+ cells) and 86% (CD105+ cells) average of two experiments. The purity of the mesenchymal stem cell population that was obtained by means of cultivation in the PTT-6 medium of the present invention is at least 99.0% with respect to all three markers (CD73, CD90, CD105), meaning the purity of this cell population is significant higher than for cultivation using PTT-4 medium or DMEM/10% FBS. In addition, and even more importantly, the mesenchymal stem cell population obtained by means of cultivation in PTT-6 is essentially a 100% pure and defined stem cell population. This makes the stem cell population of the present invention the ideal candidate for stem cell-based therapies. Thus, this population of mesenchymal cord lining stem cells may become the gold standard for such stem cell-based therapeutic approaches.

Figure 7A:
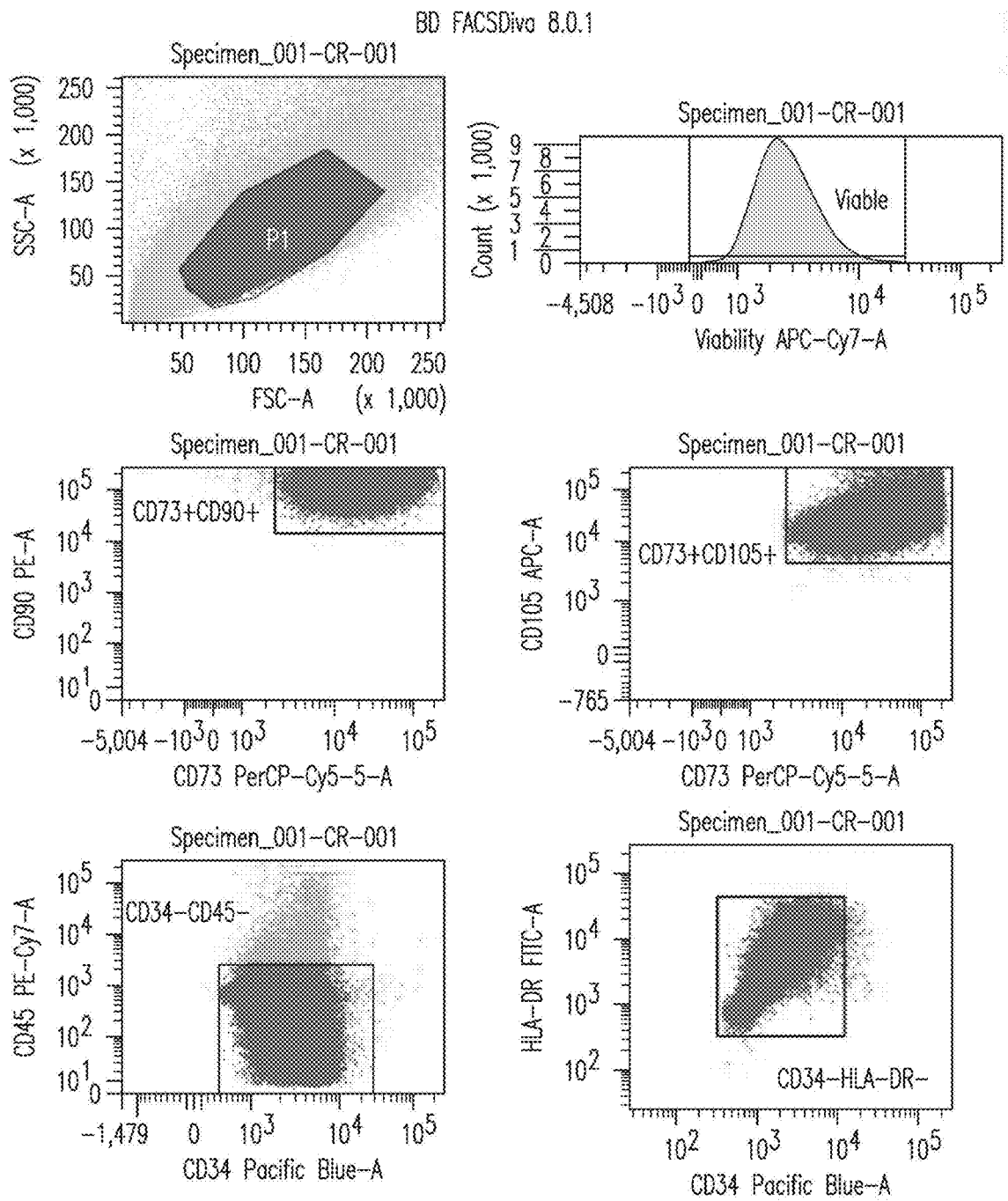
FIGS. 7A-B show the results of flow cytometry experiments in which mesenchymal stem cells isolated from the umbilical cord have been analysed for their expression of stem cells markers (CD73, CD90 and CD105, CD34, CD45 and HLA-DR (Human Leukocyte Antigen—antigen D Related) that are used for defining the suitability of multipotent human mesenchymal stem cells for cellular therapy and compared to the expression of these markers by bone marrow mesenchymal stem cells. For this experiment, the mesenchymal stem cells of the aminotic membrane of the umbilical cord were isolated from umbilical cord tissue by cultivation of the umbilical cord tissue in the culture medium of the present invention PTT-6 while the bone marrow mesenchymal stem cells were isolated from human bone marrow using a standard protocol.
Figure 7B:
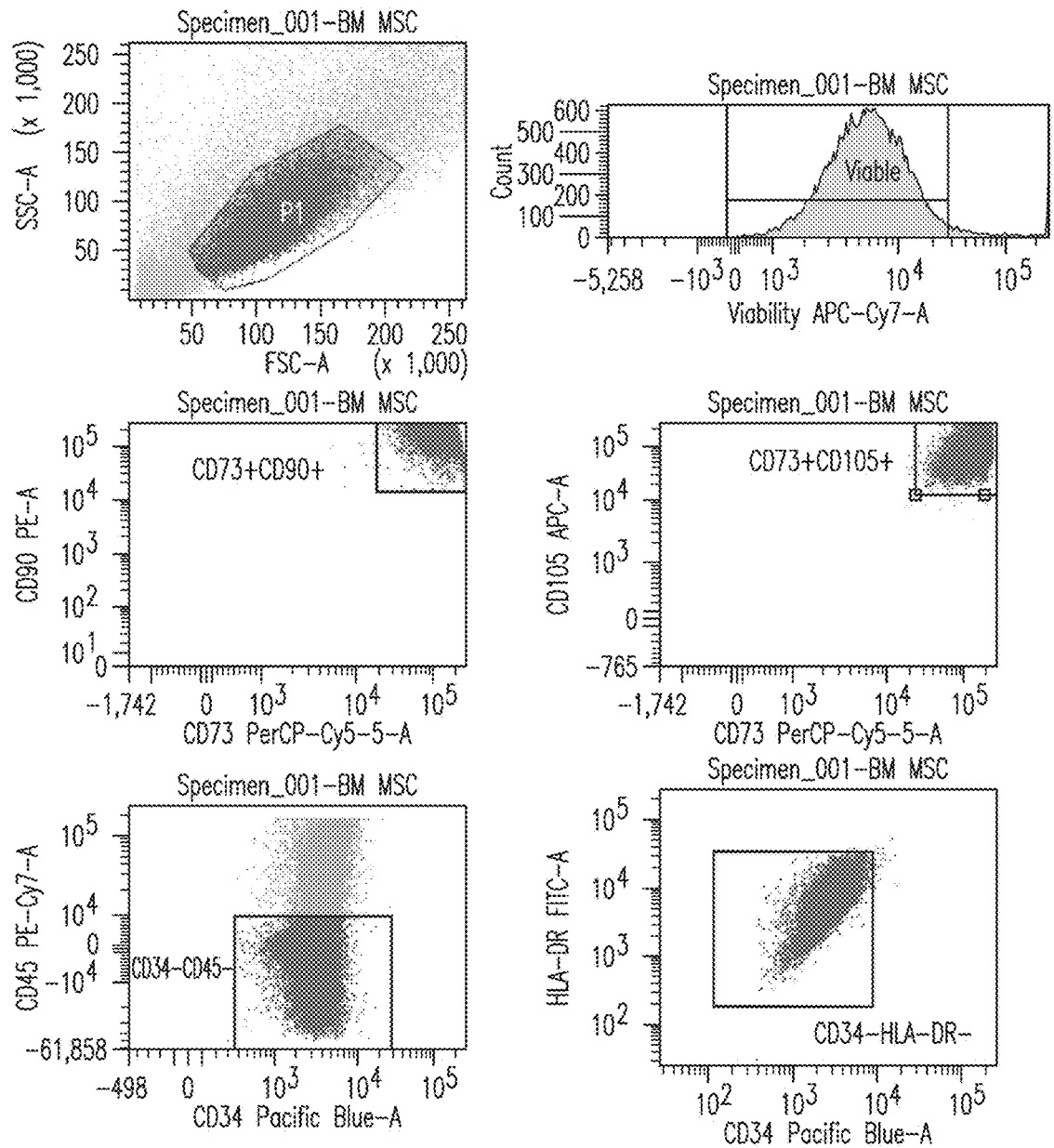

The findings shown in FIG. 6 are further corroborated by the results of the flow cytometry analysis that are shown in FIG. 7a and FIG. 7b. FIG. 7a shows the percentage of isolated mesenchymal cord lining stem cells (mesenchymal stem cells of the amniotic membrane of umbilical cord) that express the stem cell markers CD73, CD90 and CD105 and lack expression of CD34, CD45 and HLA-DR after isolation from umbilical cord tissue and cultivation in PTT-6 medium. As shown in FIG. 7a, the mesenchymal stem cell population contained 97.5% viable cells of which 100% expressed each of CD73, CD90 and CD105 (see the rows "CD73+CD90+" and "CD73+CD105+") while 99.2% of the stem cell population did not express CD45 and 100% of the stem cell population did not express CD34 and HLA-DR (see the rows "CD34−CD45− and "CD34-HLA-DR−). Thus, the mesenchymal stem cells population obtained by cultivation in PTT-6 medium is essentially a 100% pure and defined stem cell population that meets the criteria that mesenchymal stem cells are to fulfill to be used for cell therapy (95% or more of the stem cell population express CD73, CD90 and CD105, while 98% or more of the stem cell population lack expression of CD34, CD45 and HLA-DR, see Sensebe et al. "Production of mesenchymal stromal/stem cells according to good manufacturing practices: a review", supra). It is noted here that the present mesenchymal stem cells of the amniotic membrane are adhere to plastic in standard culture conditions and differentiate in vitro into osteoblasts, adipocytes and chondroblasts, see U.S. Pat. Nos. 9,085,755, 8,287,854 or WO2007/046775 and thus meet the criteria generally accepted for use of mesenchymal stem cells in cellular therapy.

FIG. 7b shows the percentage of isolated bone marrow mesenchymal stem cells that express CD73, CD90 and CD105 and lack expression of CD34, CD45 and HLA-DR. As shown in FIG. 7b, the bone marrow mesenchymal stem cell population contained 94.3% viable cells of which 100% expressed each of CD73, CD90 and CD105 (see the rows "CD73+CD90+" and "CD73+CD105+") while only 62.8% of the bone marrow stem cell population lacked expression of CD45 and 99.9% of the stem cell population lacked expression CD34 and HLA-DR (see the rows "CD34−CD45− and "CD34−HLA-DR−). Thus, the bone marrow mesenchymal stem cells that are considered to be the gold standard of mesenchymal stem cells are by far less homogenous/pure in terms of stem cell marker than the mesenchymal stem cells population (of the amniotic membrane of the umbilical cord) of the present application. This finding also shows that the stem cell population of the present invention may be the ideal candidate for stem cell-based therapies and may become the gold standard for stem cell-based therapeutic approaches.

4. Analysis of Wound Healing Marker Protein Secretion in Mesenchymal Stem Cell Populations Isolated Cultivated in the Culture Medium of the Invention Based on the highly remarkable results (obtaining an essentially 100% pure and defined mesenchymal stem cell population by cultivation in PTT-6) various isolated mesenchymal stem cell populations were cultivated in PTT-6 and were analysed with respect to the secretion of wound healing marker protein compared to cultivation in PTT-4 medium (serving as the reference medium).

In more detail, the following isolated mesenchymal stem cell populations were analysed.

mesenchymal stem cells of the amniotic membrane of umbilical cord (cord lining MSC/CL-MSC). This population of CL-MSC was isolated by tissue explant of human cord lining membrane as described in Example 2 of WO2007/046775 (cultivation in DMEM supplemented with 10% fetal bovine serum, DMEM/10% FBS)

mesenchymal stem cells of the Wharton's jelly (WJ-MSC). This population of WJ-MSC was isolated by tissue explant (cultivation in DMEM with 4,500 mg/mL glucose and 2 mM L-glutamine, supplemented with 10% human serum/FBS and antibiotic solution) of Wharton's jelly of human umbilical cord as described by Beeravolu et al. "Isolation and Characterization of Mesenchymal Stromal Cells from Human Umbilical Cord and Fetal Placenta." J Vis Exp. 2017; (122): 55224.

Adipose-tissue derived mesenchymal stem cells (AT-MSC). This population of AT-MSC was isolated from adipose tissue of donated skin tissue after abdominoplasty by tissue explant (cultivation in DMEM supplemented with 5% penicillin/streptomycin and 10% FBS) as described by Schneider et al, "Adipose-derived mesenchymal stem cells from liposuction and resected fat are feasible sources for regenerative medicine" Eur J Med Res. 2017; 22: 17.

Bone Marrow mesenchymal stem cells (BM-MSC). This population of BM-MSC was a gift of AO Foundation, Davos, Switzerland.

placental mesenchymal stem cells (PT-MSC). This population of PT-MSC was isolated from placenta as described in Beeravolu et al. "Isolation and Characterization of Mesenchymal Stromal Cells from Human Umbilical Cord and Fetal Placenta." J Vis Exp. 2017; (122): 55224.

Culture Protocol for Cultivation of the Isolated MSCs 5 million MSCs from each source were plated in 100 mm tissue culture dishes in DMEM/F12/10% FCS for 24 hrs.

Medium was discarded and PTT-6/PTT-4 was added to culture for 24 hours.

Discard medium and cells washed with PBS.

10 ml DMEM added to culture for 24 hours.

Discard medium and 5 ml DMEM added to culture.

After 24 hrs culture, conditioned media were harvested, centrifuged to remove cell debris, supernatant aliquoted into tubes for storage at −80° C. and subsequent analysis of marker protein secretion by cytokine assays Cytokine Assays on PTT-6 vs. PTT-4 Media Supernatants from MSCs of CL-MSC, WJ-MSC, Bone Marrow MSC, and Adipose MSC Origin Cytokine Detection was performed in MSC Supernatants. Measurements and analysis has been conducted using Luminex 200 and Xponent software.

The goal of this experiment was to measure relative levels of Multiplex (PDGF-AA, PDGF-BB, IL-10, VEGF, Ang-1, and HGF), TGFβ1 Singleplex, and bFGF2 Singleplex cytokines on cell culture supernatants. The supernatants are (MSC, mesenchymal stem cell; CL, cord lining; WJ, Wharton's Jelly; AT, adipose tissue; BM, bone marrow):

CL-MSC cultured in PTT-4
WJ-MSC cultured in PTT-4
AT-MSC cultured in PTT-4
BM-MSC cultured in PTT-4
CL-MSC cultured in PTT-6
WJ-MSC cultured in PTT-6
AT-MSC cultured in PTT-6
BM-MSC cultured in PTT-6

Each sample was tested in triplicate (3 wells) except the samples supplied in PTT-4, which were tested in 6 wells. In addition, samples CR001A, CR001C, CR001D, and CR001G were included as a positive control to validate the cytokine assay (the conditioned media from CR001A, CR001C, CR001D and CR001G were not prepared by cultivation of cells in PTT-6 or PTT-4)

The aim of this experiment was to generate cytokine profiles of MSCs cultured either in PTT-4 or PTT-6 and to compare the profiles of MSCs from different tissue origins (umbilical cord lining vs. Wharton's Jelly vs. adipose tissue vs. bone marrow). The profile will shed light onto which stem cell population grown in which medium would secrete more of the cytokines of interest in order to promote wound healing.

The plate set-up for all plates is described in FIG. 8. The following acronyms are used in the following: MSC, mesenchymal stem cell; CL, cord lining; WJ, Wharton's Jelly; AT, adipose tissue; BM, bone marrow.

Multiplex analysis

Multiplex information:

R&D Systems/Bio-techne cat. #LXSAHM. This kit is lot #L123680, expires Aug. 28, 2018, with the following analytes:

Ang-1, angiopoietin
VEGF, vascular endothelial growth factor
PDGF-AA, platelet-derived growth factor (PDGF-AA refers to disulfide-linked homodimer consisting of A chains, while PDGF-BB consists of a B homodimer. R&D states that PDGF-BB antibody detects PDGF-AB heterodimer as well)
PDGF-BB
HGF, hepatocyte growth factor
IL-10, interleukin-10

Figure 9:
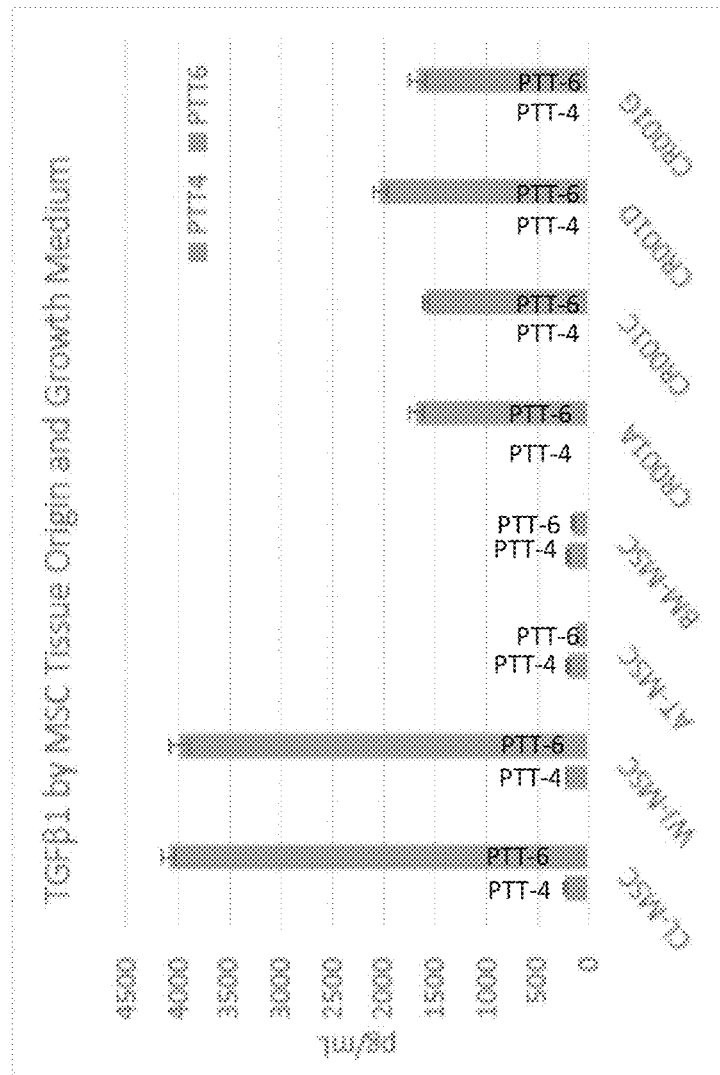
FIG. 9 shows singleplex measurement of TGFβ1. As can be seen cultures CL-MSC and WJ-MSC produce more TGFβ1 when grown in PTT-6 than when grown in PTT-4. Only AT-MSC and BM-MSC cultures produced more or less equal amounts of TGFβ1 when grown in PTT-6 or PTT-4. All error bars are standard deviation from triplicate measurements.
Figure 10A:
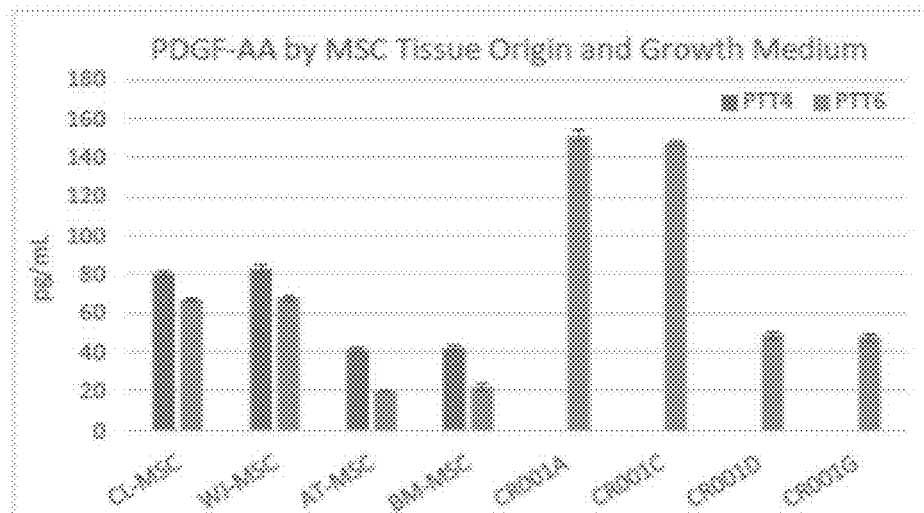
FIG. 10A shows multiplex measurement of PDGF-AA. As can be seen cultures CL-MSC, WJ-MSC, AT-MSC and BM-MSC cultures produce more PDGF-AA when grown in PTT-4 than when grown in PTT-6. All error bars are standard deviation from triplicate measurements.
Figure 10B:
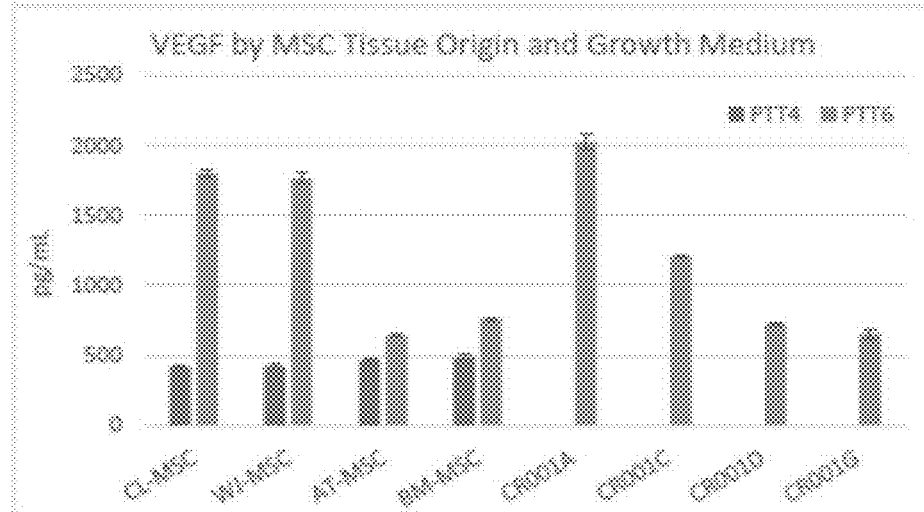
FIG. 10B shows multiplex measurement of VEGF. As can be seen cultures CL-MSC, WJ-MSC, AT-MSC and BM-MSC cultures produce more VEGF when grown in PTT-6 than when grown in PTT-4. All error bars are standard deviation from triplicate measurements.
Figure 10C:
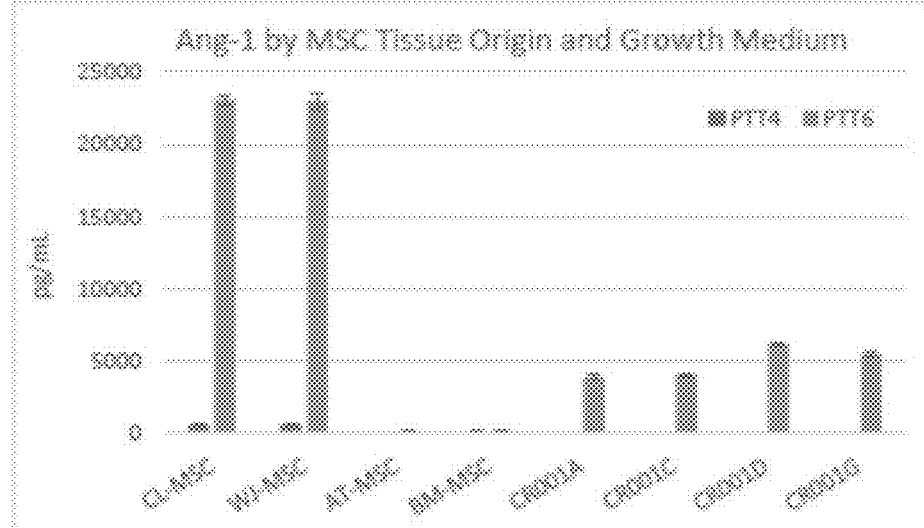
FIG. 10C shows multiplex measurement of Ang-1. As can be seen cultures CL-MSC and WJ-MSC cultures produce much more Ang-1 when grown in PTT-6 than when grown in PTT-4. Cultures AT-MSC and BM-MSC essentially did not produce any Ang-1. All error bars are standard deviation from triplicate measurements.
Figure 11:
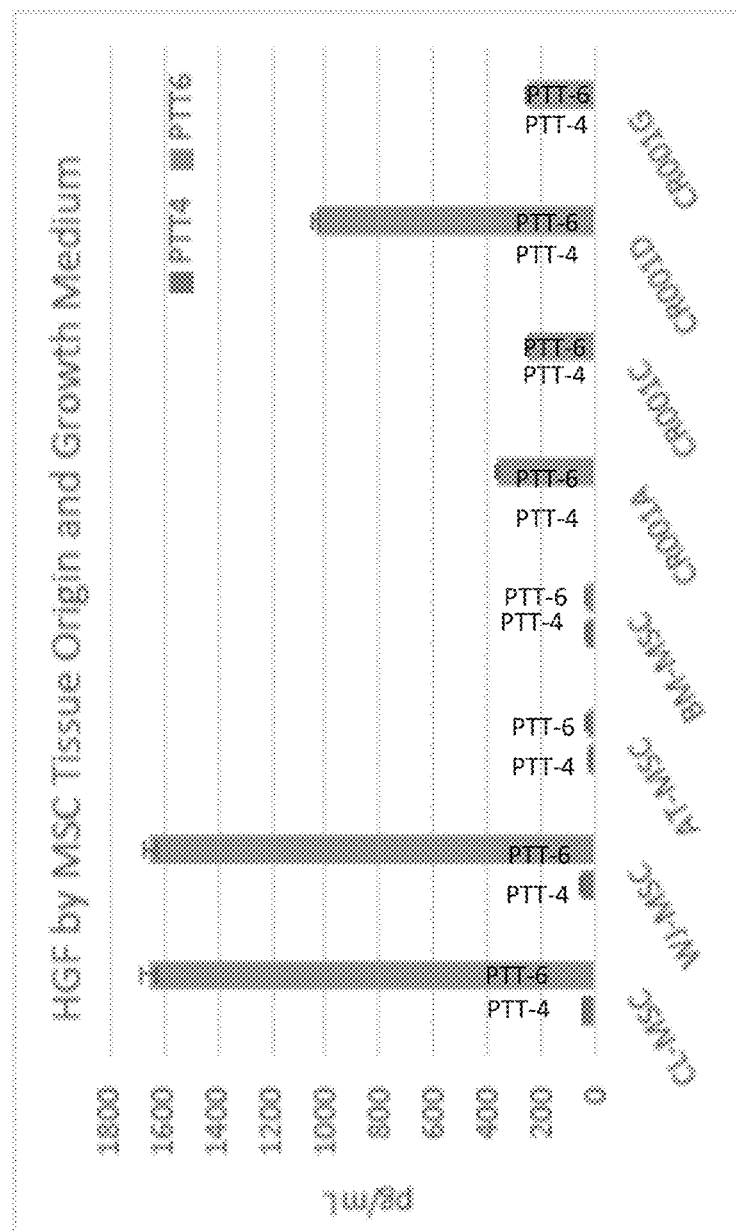
FIG. 11 shows multiplex measurement of HGF. As can be seen cultures CL-MSC and WJ-MSC cultures produce much more HGF when grown in PTT-6 than when grown in PTT-4. Cultures AT-MSC and BM-MSC essentially did not produce any HGF. All error bars are standard deviation from triplicate measurements.
Figure 12:
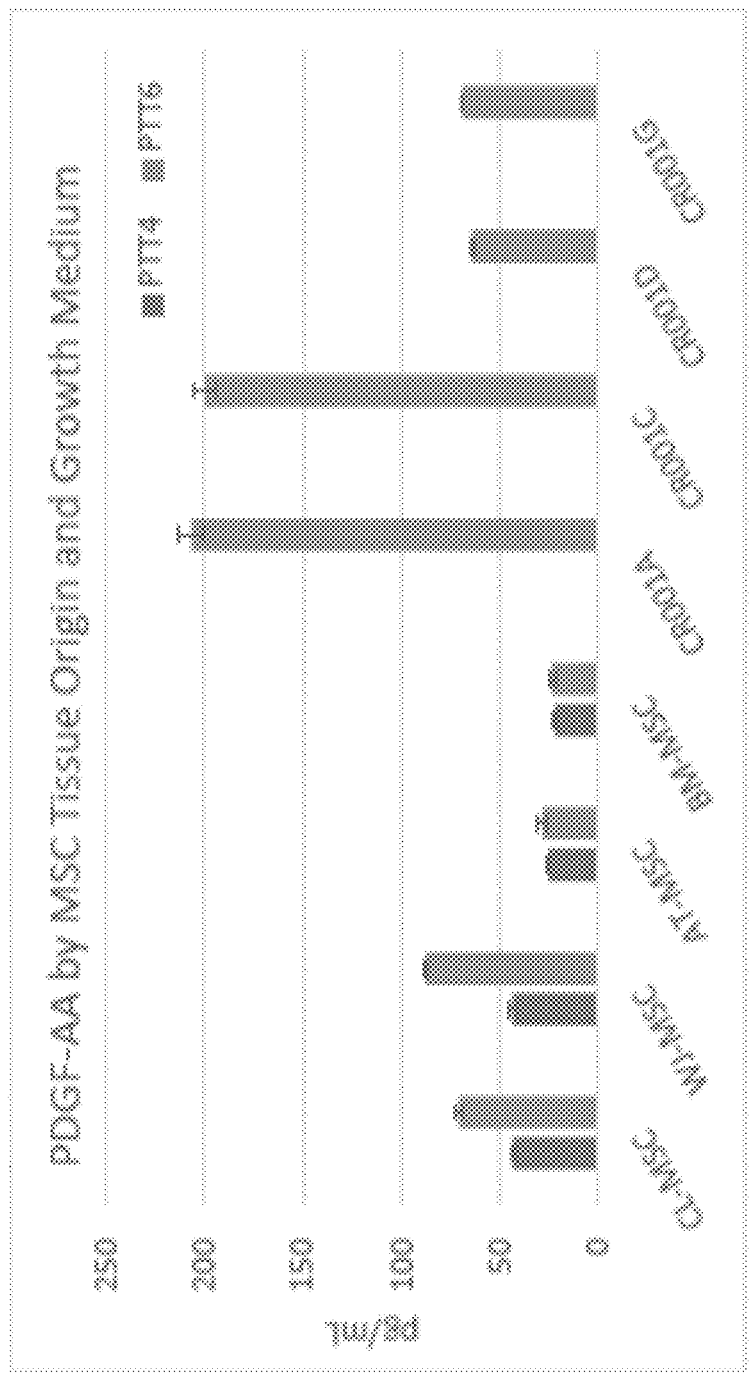
FIG. 12 shows multiplex measurement of PDGF-AA. As can be seen cultures CL-MSC and WJ-MSC cultures produce more PDGF-AA when grown in PTT-4 than when grown in PTT-6. Cultures AT-MSC and BM-MSC produced equal amounts of PDGF-AA in both culture media. All error bars are standard deviation from triplicate measurements.
Figure 13A:
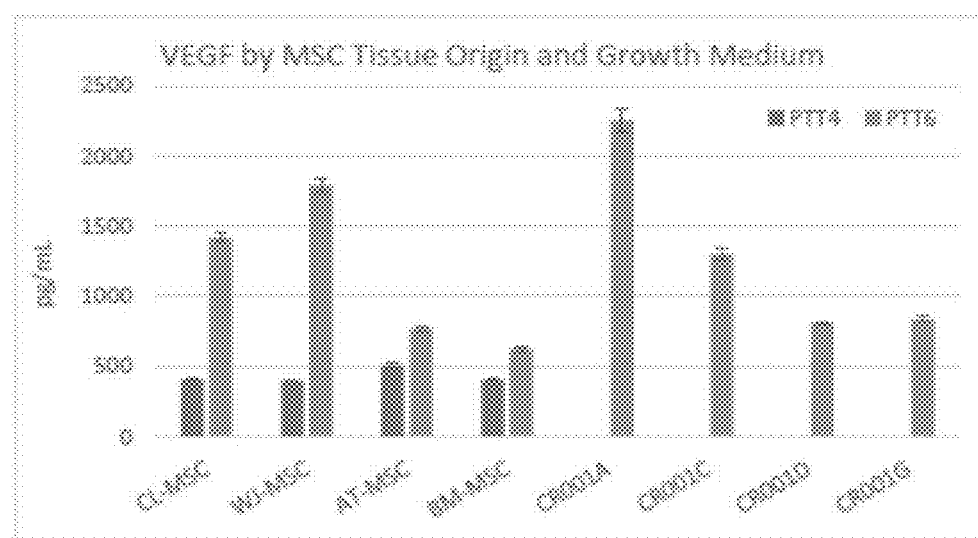
FIG. 13A shows multiplex measurement of VEGF. As can be seen cultures CL-MSC, WJ-MSC, AT-MSC and BM-MSC cultures produce more VEGF when grown in PTT-6 than when grown in PTT-4. All error bars are standard deviation from triplicate measurements.
Figure 13B:
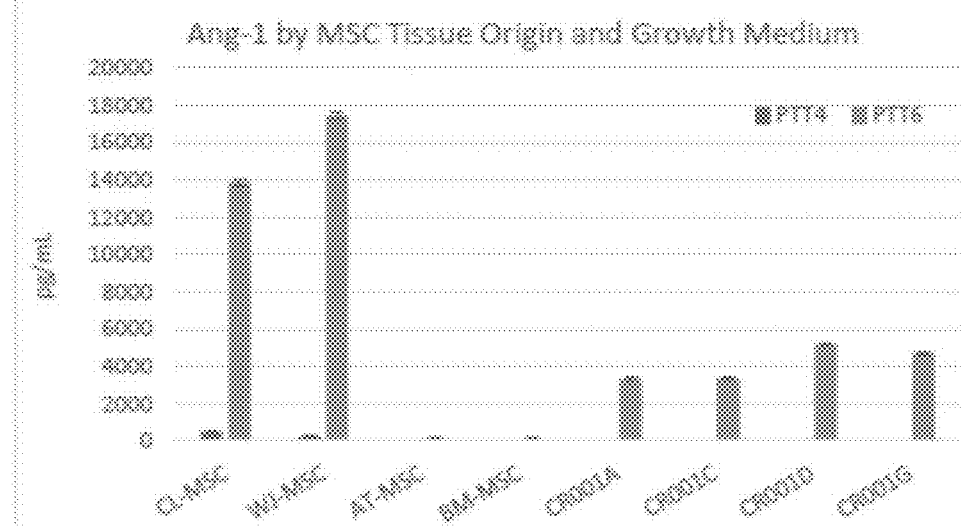
FIG. 13B shows multiplex measurement of Ang-1. As can be seen cultures CL-MSC and WJ-MSC cultures produce much more Ang-1 when grown in PTT-6 than when grown in PTT-4. Cultures AT-MSC and BM-MSC essentially did not produce any Ang-1. All error bars are standard deviation from triplicate measurements.
Figure 13C:
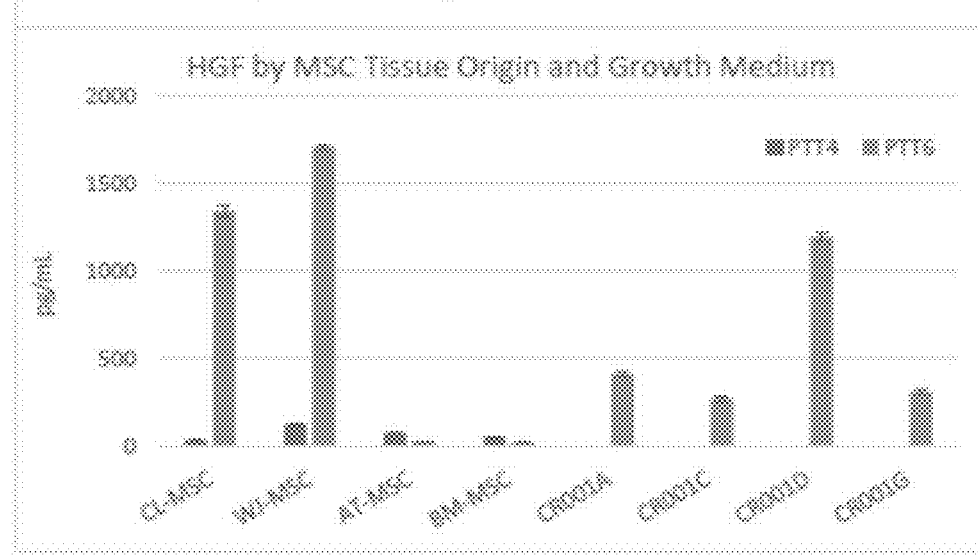
FIG. 13C shows multiplex measurement of HGF. As can be seen cultures CL-MSC and WJ-MSC cultures produce much more HGF when grown in PTT-6 than when grown in PTT-4. Cultures AT-MSC and BM-MSC essentially did not produce any HGF. All error bars are standard deviation from triplicate measurements.
Figure 14:
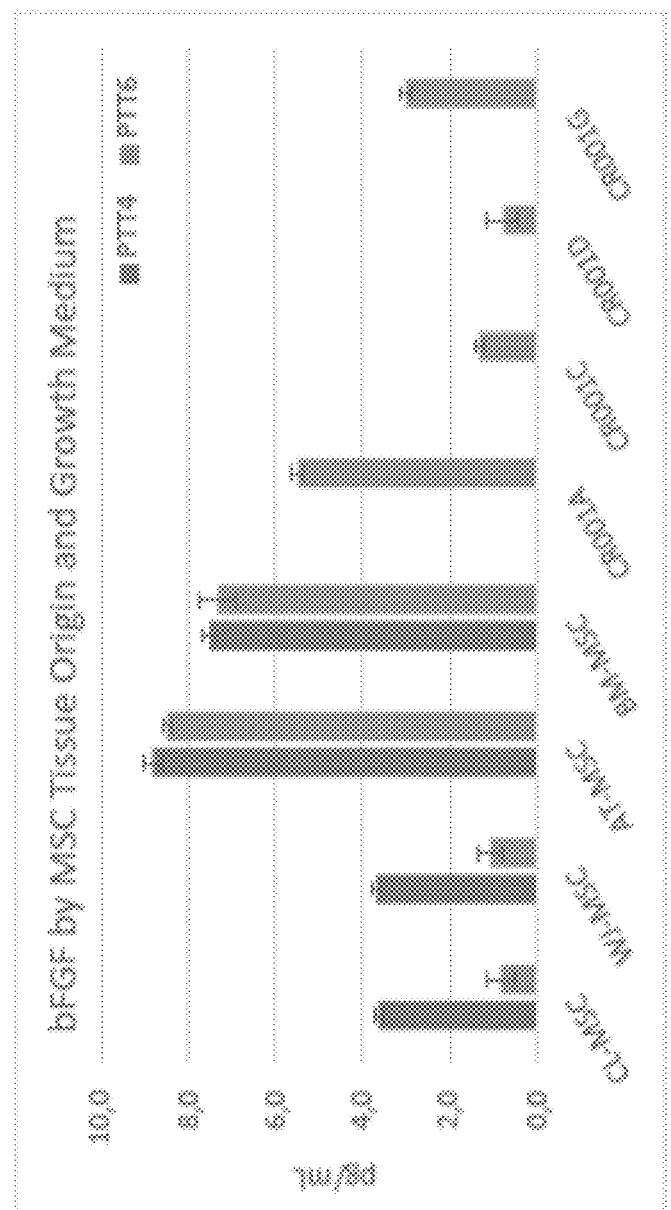
FIG. 14 shows multiplex measurement of bFGF. As can be seen cultures CL-MSC and WJ-MSC cultures produce more bFGF when grown in PTT-6 than when grown in PTT-4. Cultures AT-MSC and BM-MSC produced equal amounts of bFGF when cultured in PTT-4 and PTT-6. All error bars are standard deviation from triplicate measurements.
Figure 15:
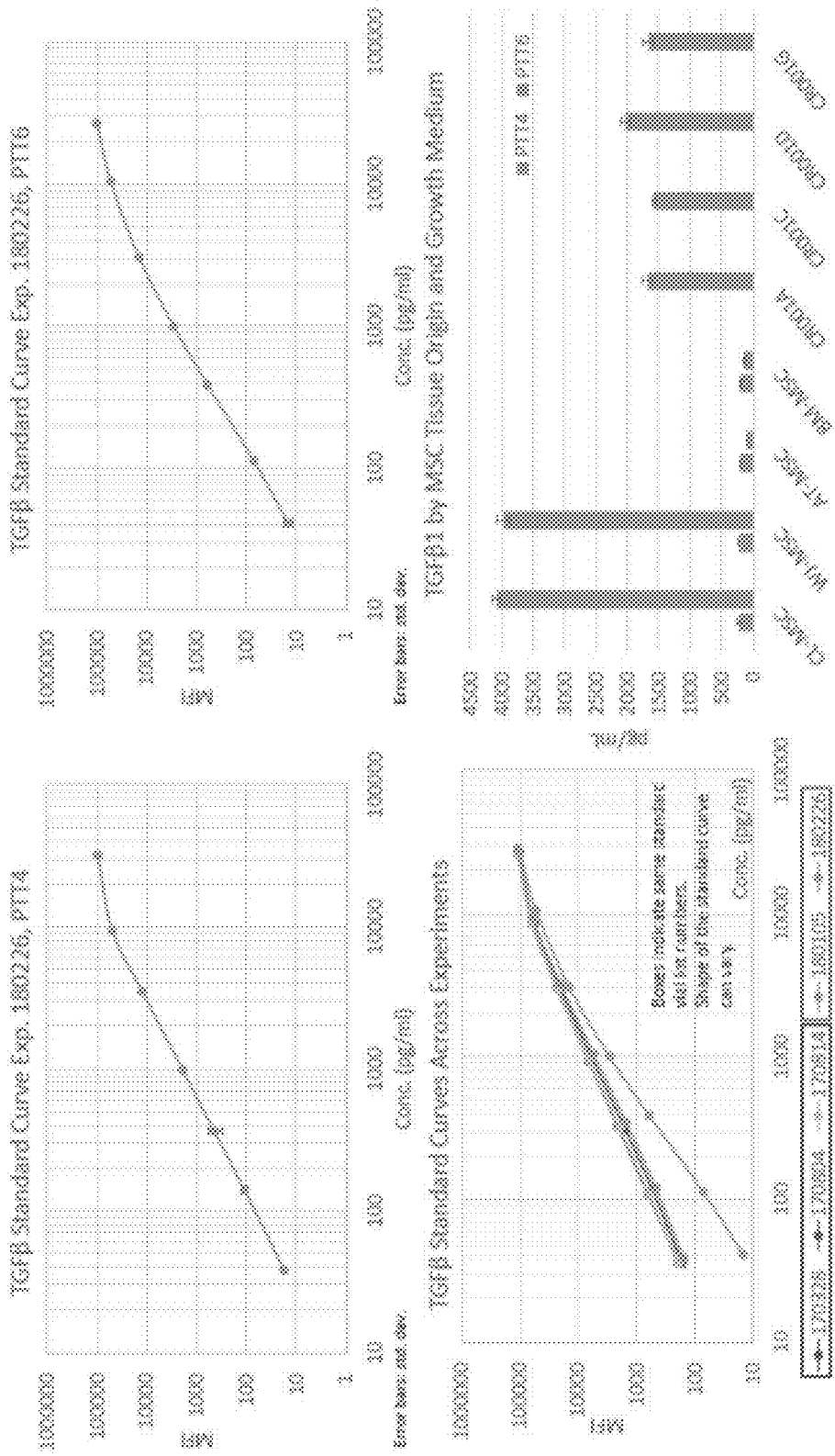
FIG. 15 summarizes measurement of TGFβ1 over 5 different experiments (170328, 170804, 170814, 180105, 180226). Mean fluorescent intensity (MFI) measured for the TGFβ standard curves across experiments is depicted in the graph below on the left-hand side. MFI for the TGFβ standard curves obtained in PTT-4 and PTT-6 medium are shown in above graphs. The graph below on the right-hand side depicts that cultures CL-MSC and WJ-MSC produce more TGFβ1 when grown in PTT-6 than when grown in PTT-4. AT-MSC and BM-MSC cultures produced equal amounts of TGFβ1 when grown in PTT-6 or PTT-4. All error bars are standard deviation from different measurements for the experiments 170328, 170804, 170814, 180105, 180226.
Figure 16:
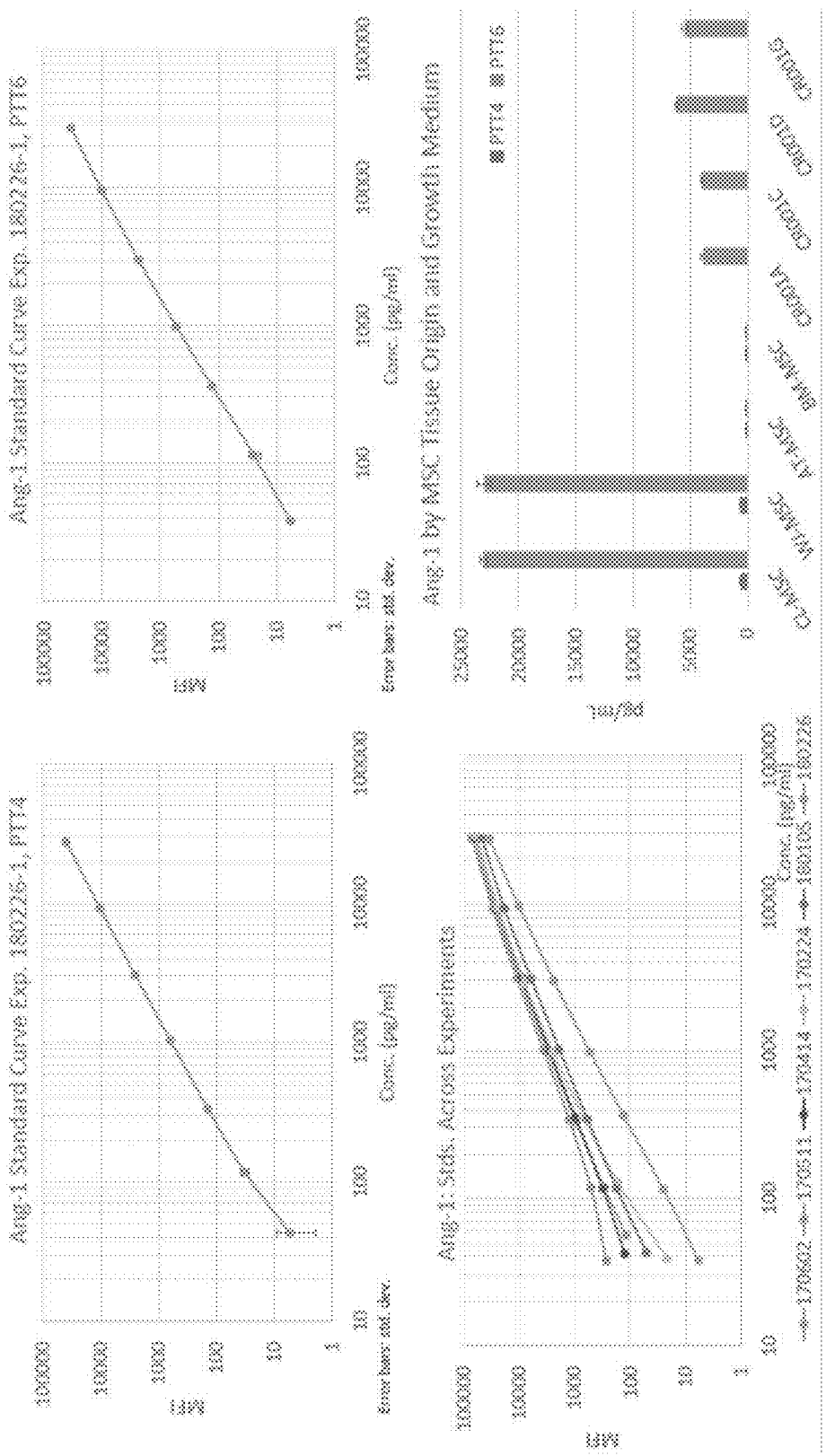
FIG. 16 summarizes measurement of Ang-1 over 6 different experiments (170602, 170511, 170414, 170224, 180105, 180226). Mean fluorescent intensity (MFI) measured for the Ang-1 standard curves across experiments is depicted in the graph below on the left-hand side. MFI for the Ang-1 standard curves obtained in PTT-4 and PTT-6 medium are shown in above graphs. The graph below on the right-hand side depicts that cultures CL-MSC and WJ-MSC produce more Ang-1 when grown in PTT-6 than when grown in PTT-4. Only AT-MSC and BM-MSC cultures produced essentially equal amounts of Ang-1 when grown in PTT-6 or PTT-4. All error bars are standard deviation from different measurements for the experiments 170602, 170511, 170414, 170224, 180105, 180226.

TGFβ1 Singleplex information: R&D Systems/Biotechne):

Base kit, cat. #LTGM00, lot #P156217, received 02/27/18, expires 08/30/18.
TGFβ1 component, cat. #LTGM100, lot #P161760, received 02/27/18, expires 11/27/19.

bFGF2 Singleplex information (used on Mar. 19, 2018): eBioscience/Thermo:

Base kit, cat. #EPX010-10420-901, lot #172174000, expires 01/31/20.
bFGF2 component, cat. #EPX01A-12074-901, lot #169751102, expires 12/31/19.

bFGF2 Singleplex information (used on Mar. 22, 2018): eBioscience/Thermo:
  Base kit, cat. #EPX010-10420-901, lot #172174000, expires 01/31/20.
  bFGF2 component, cat. #EPX01A-12074-901, lot #166916102, expires 12/31/19.
Multiplex Information:
  R&D Systems/Bio-techne cat. #LXSAHM. This kit is lot #L123999, expires 09/25/18, with the following analytes:
    Ang-1, angiopoietin
    VEGF, vascular endothelial growth factor
    PDGF-AA, platelet-derived growth factor2,
    PDGF-BB
    HGF, hepatocyte growth factor
    IL-10, interleukin-10
    bFGF, basic fibroblast growth factor
Data Entry
  Raw data output is in PDF and Excel formats. Data in Excel format are used to process the data.
Procedure
  Cytokine Detection in MSC Supernatants was carried out in accordance with the detailed protocol information. As part of this experiment, the protocol has a single amendment: Std. 8 in the Multiplex kit is no longer used. The reason for discontinuing Std. 8 is because R&D Systems protocol itself uses only Standards 1 through κ. Furthermore, Std. 8 was validated at ClinImmune for only two of the six analytes that comprise the Multiplex: PDGF-BB and HGF. In the case of PDGF-BB, this analyte was never detected in the supernatants. In the case of HGF, that analyte falls in the mid-region of the standard curve. Since the Standards are reconstituted using growth media, standard curves were constructed with both PTT-6 and PTT-4. Test samples grown in either PTT-6 or PTT-4 were extrapolated from respective standard curves.
  The results were extrapolated by the Luminex software from the analyte-specific standard curve that is generated by the same software: the analysis algorithm is set to Logistic 5P Weighted with weighted analysis, using $1/y2$ for weighting.
Samples
1. PTT-4 and PTT-6 media (not exposed to MSCs)
2. Supernatants of MSC's to be tested
3. Optional: supernatants from CL-MSCs from different donors; CR001A, C, D, and G.
Experiments Result Summary
  TGFβ1 Singleplex Assay
    Used aliquot 1 of 3—are shown in FIG. 9. All error bars are standard deviation from triplicate measurements.
  FIG. 9: Singleplex measurement of TGFβ1. As can be seen cultures CL-MSC and WJ-MSC produce more TGFβ1 when grown in PTT-6 than when grown in PTT-4. Only AT-MSC and BM-MSC cultures produced more or less equal amounts of TGFβ1 when grown in PTT-6 or PTT-4. All error bars are standard deviation from triplicate measurements.
  1st Multiplex Assay
    Used aliquot 1 of 3.
    PDGF-BB and IL-10 were not detected in any samples.
    Data are depicted in FIGS. 10 and 11.
  FIG. 10: FIG. 10A Multiplex measurement of PDGF-AA. As can be seen cultures CL-MSC, WJ-MSC, AT-MSC and BM-MSC cultures produce more PDGF-AA when grown in PTT-4 than when grown in PTT-6. All error bars are standard deviation from triplicate measurements. FIG. 10B Multiplex measurement of VEGF. As can be seen cultures CL-MSC, WJ-MSC, AT-MSC and BM-MSC cultures produce more VEGF when grown in PTT-6 than when grown in PTT-4. All error bars are standard deviation from triplicate measurements. FIG. 10C Multiplex measurement of Ang-1. As can be seen cultures CL-MSC and WJ-MSC cultures produce much more Ang-1 when grown in PTT-6 than when grown in PTT-4. Cultures AT-MSC and BM-MSC essentially did not produce any Ang-1. All error bars are standard deviation from triplicate measurements.
  FIG. 11: Multiplex measurement of HGF. As can be seen cultures CL-MSC and WJ-MSC cultures produce much more HGF when grown in PTT-6 than when grown in PTT-4. Cultures AT-MSC and BM-MSC essentially did not produce any HGF. All error bars are standard deviation from triplicate measurements.
  Multiplex Assay (with bFGF Included)
    Used aliquot 3 of 3. Data are shown in FIG. 12-14.
  FIG. 12: Multiplex measurement of PDGF-AA. As can be seen cultures CL-MSC and WJ-MSC cultures produce more PDGF-AA when grown in PTT-4 than when grown in PTT-6. Cultures AT-MSC and BM-MSC produced equal amounts of PDGF-AA in both culture media. All error bars are standard deviation from triplicate measurements.
  FIG. 13: FIG. 13A Multiplex measurement of VEGF. As can be seen cultures CL-MSC, WJ-MSC, AT-MSC and BM-MSC cultures produce more VEGF when grown in PTT-6 than when grown in PTT-4. All error bars are standard deviation from triplicate measurements. FIG. 13B Multiplex measurement of Ang-1 Multiplex Assay. As can be seen cultures CL-MSC and WJ-MSC cultures produce much more Ang-1 when grown in PTT-6 than when grown in PTT-4. Cultures AT-MSC and BM-MSC essentially did not produce any Ang-1. All error bars are standard deviation from triplicate measurements. FIG. 13C. Multiplex measurement of HGF. As can be seen cultures CL-MSC and WJ-MSC cultures produce much more HGF when grown in PTT-6 than when grown in PTT-4. Cultures AT-MSC and BM-MSC essentially did not produce any HGF. All error bars are standard deviation from triplicate measurements.
  FIG. 14: Multiplex measurement of bFGF. As can be seen cultures CL-MSC and WJ-MSC cultures produce more bFGF when grown in PTT-6 than when grown in PTT-4. Cultures AT-MSC and BM-MSC produced equal amounts of bFGF when cultured in PTT-4 and PTT-6. All error bars are standard deviation from triplicate measurements.
    It should be noted that the bFGF samples are very low in abundance, at or near the lower end of detection limit.
  FIG. 15 to FIG. 21 depict a summary of data obtained over different experiments.
  FIG. 15: Summarizes measurement of TGFβ1 over 5 different experiments (170328, 170804, 170814, 180105, 180226). Mean fluorescent intensity (MFI) measured for the TGFβ standard curves across experiments is depicted in the graph below on the left-hand side. MFI for the TGFβ standard curves obtained in PTT-4 and PTT-6 medium are shown in above graphs. The graph below on the right-hand side depicts that cultures CL-MSC and WJ-MSC produce more TGFβ1 when grown in PTT-6 than when grown in PTT-4. AT-MSC and BM-MSC cultures produced equal amounts of TGFβ1 when grown in PTT-6 or PTT-4. All error bars are standard deviation from different measurements for the experiments 170328, 170804, 170814, 180105, 180226.
  FIG. 16: Summarizes measurement of Ang-1 over 6 different experiments (170602, 170511, 170414, 170224, 180105, 180226). Mean fluorescent intensity (MFI) measured for the Ang-1 standard curves across experiments is depicted in the graph below on the left-hand side. MFI for the Ang-1 standard curves obtained in PTT-4 and PTT-6 medium are shown in above graphs. The graph below on the right-hand side depicts that cultures CL-MSC and WJ-MSC produce more Ang-1 when grown in PTT-6 than when grown in PTT-4. Only AT-MSC and BM-MSC cultures produced essentially equal amounts of Ang-1 when grown in PTT-6 or PTT-4. All error bars are standard deviation from different measurements for the experiments 170602, 170511, 170414, 170224, 180105, 180226.

Figure 17:
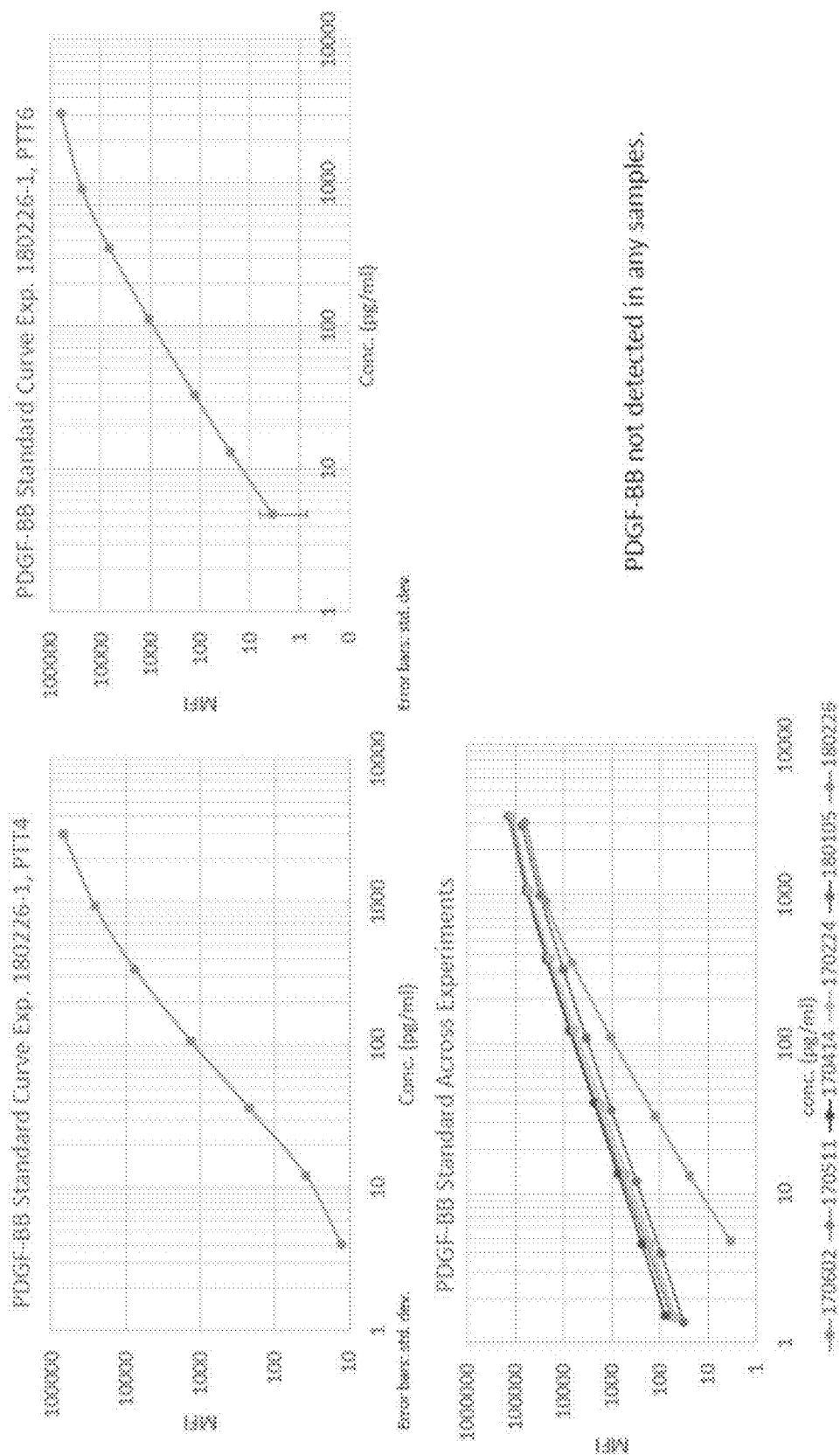
FIG. 17 summarizes measurement of PDGF-BB over 6 different experiments (170602, 170511, 170414, 170224, 180105, 180226). Mean fluorescent intensity (MFI) measured for the PDGF-BB standard curves across experiments is depicted in the graph below on the left-hand side. MFI for the PDGF-BB standard curves obtained in PTT-4 and PTT-6 medium are shown in above graphs. Notably, in none of the experiments PDGF-BB has been detected.

FIG. 17: Summarizes measurement of PDGF-BB over 6 different experiments (170602, 170511, 170414, 170224, 180105, 180226). Mean fluorescent intensity (MFI) measured for the PDGF-BB standard curves across experiments is depicted in the graph below on the left-hand side. MFI for the PDGF-BB standard curves obtained in PTT-4 and PTT-6 medium are shown in above graphs. Notably, in none of the experiments PDGF-BB has been detected.

Figure 18:
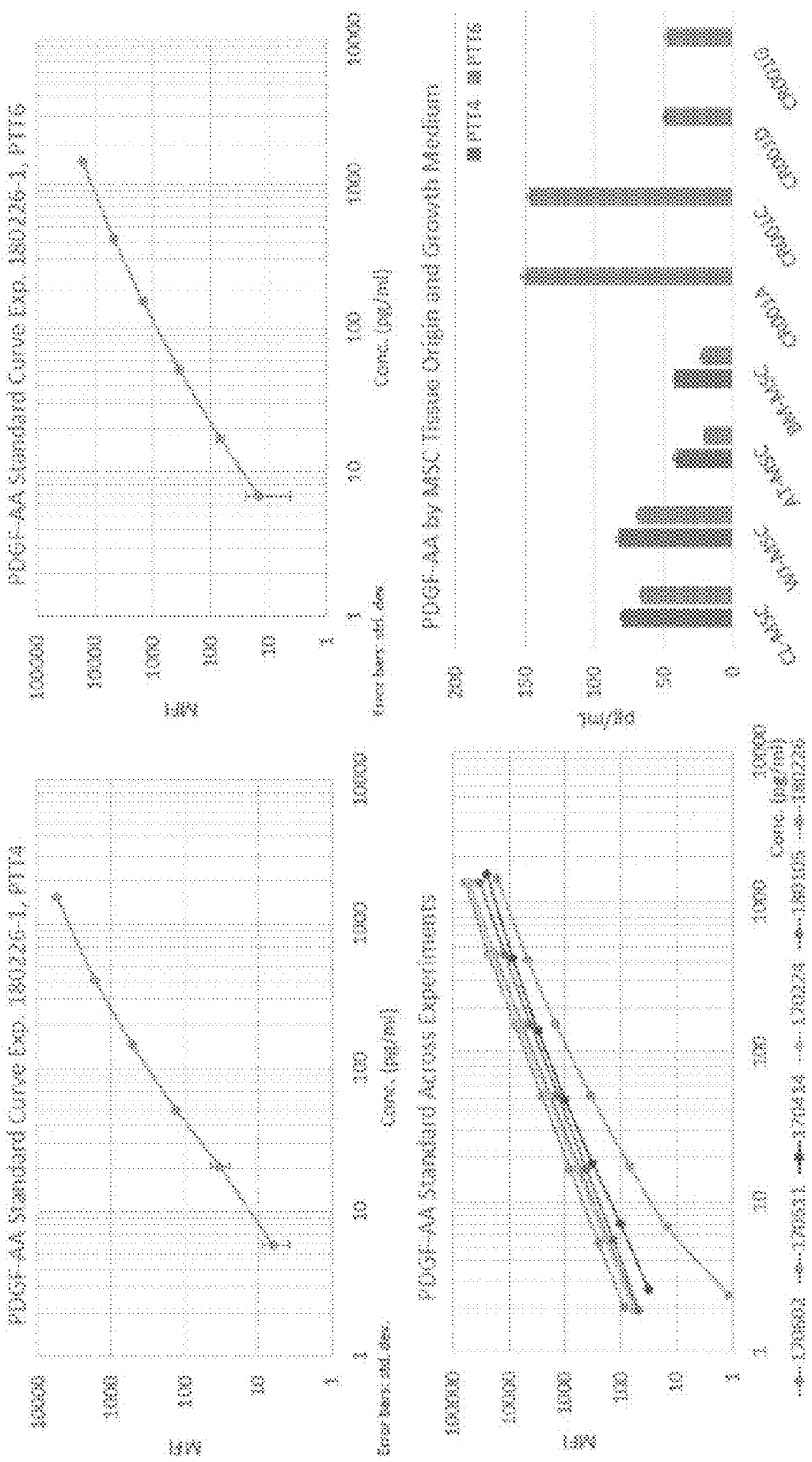
FIG. 18 summarizes measurement of PDGF-AA over 6 different experiments (170602, 170511, 170414, 170224, 180105, 180226). Mean fluorescent intensity (MFI) measured for the PDGF-AA standard curves across experiments is depicted in the graph below on the left-hand side. MFI for the PDGF-AA standard curves obtained in PTT-4 and PTT-6 medium are shown in above graphs. The graph below on the right-hand side depicts that cultures CL-MSC, AT-MSC and BM-MSC and WJ-MSC cultures produce slightly more PDGF-AA when grown in PTT-4 than when grown in PTT-6. All error bars are standard deviation from measurements of experiments 170602, 170511, 170414, 170224, 180105, 180226.

FIG. 18: Summarizes measurement of PDGF-AA over 6 different experiments (170602, 170511, 170414, 170224, 180105, 180226). Mean fluorescent intensity (MFI) measured for the PDGF-AA standard curves across experiments is depicted in the graph below on the left-hand side. MFI for the PDGF-AA standard curves obtained in PTT-4 and PTT-6 medium are shown in above graphs. The graph below on the right-hand side depicts that cultures CL-MSC, AT-MSC and BM-MSC and WJ-MSC cultures produce slightly more PDGF-AA when grown in PTT-4 than when grown in PTT-6. All error bars are standard deviation from measurements of experiments 170602, 170511, 170414, 170224, 180105, 180226.

Figure 19:
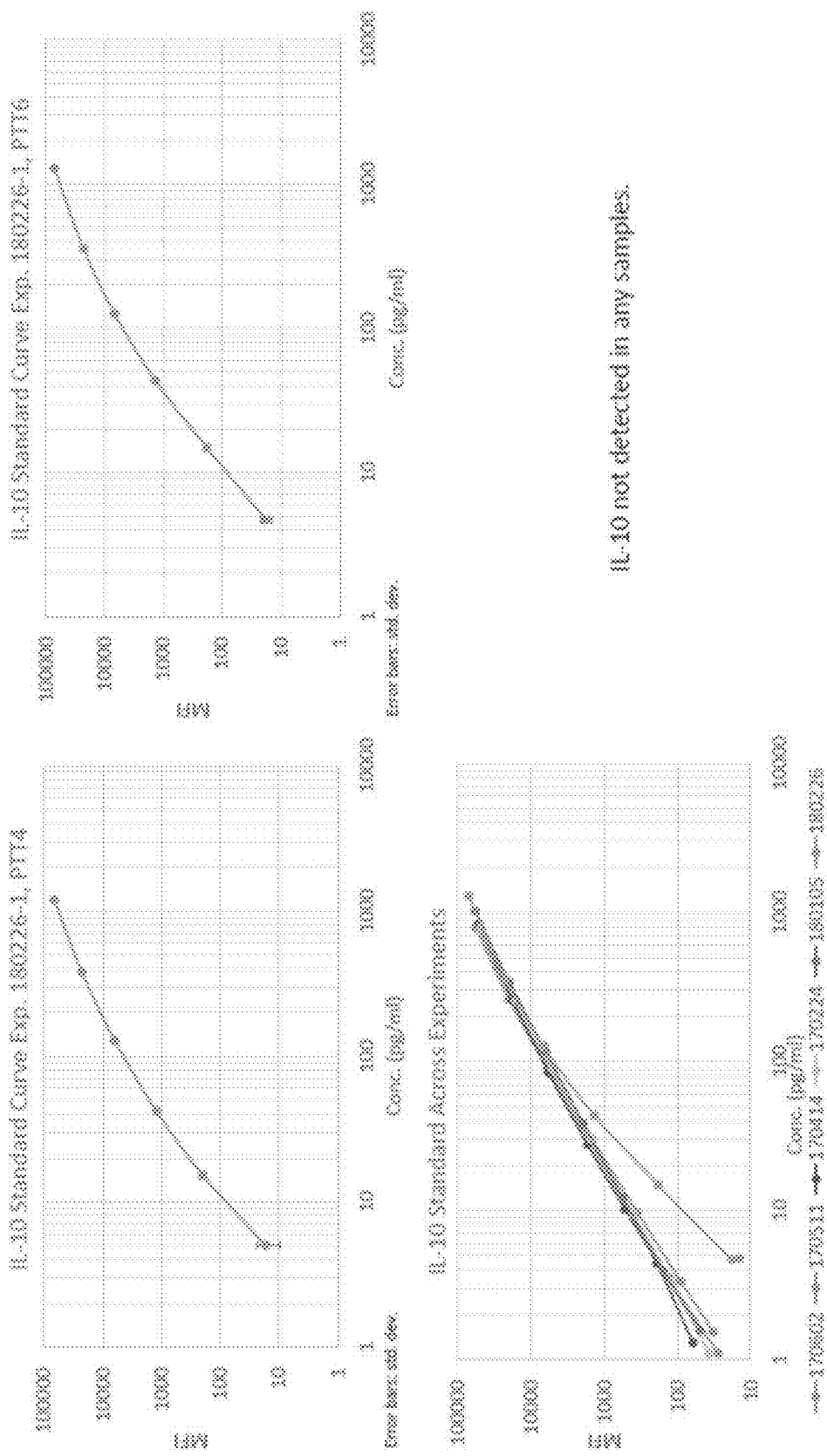
FIG. 19 summarizes measurement of IL-10 over 6 different experiments (170602, 170511, 170414, 170224, 180105, 180226). Mean fluorescent intensity (MFI) measured for the IL-10 standard curves across experiments is depicted in the graph below on the left-hand side. MFI for the IL-10 standard curves obtained in PTT-4 and PTT-6 medium are shown in above graphs. Notably, in none of the experiments IL-10 has been detected.

FIG. 19: Summarizes measurement of IL-10 over 6 different experiments (170602, 170511, 170414, 170224, 180105, 180226). Mean fluorescent intensity (MFI) measured for the IL-10 standard curves across experiments is depicted in the graph below on the left-hand side. MFI for the IL-10 standard curves obtained in PTT-4 and PTT-6 medium are shown in above graphs. Notably, in none of the experiments IL-10 has been detected.

Figure 20:
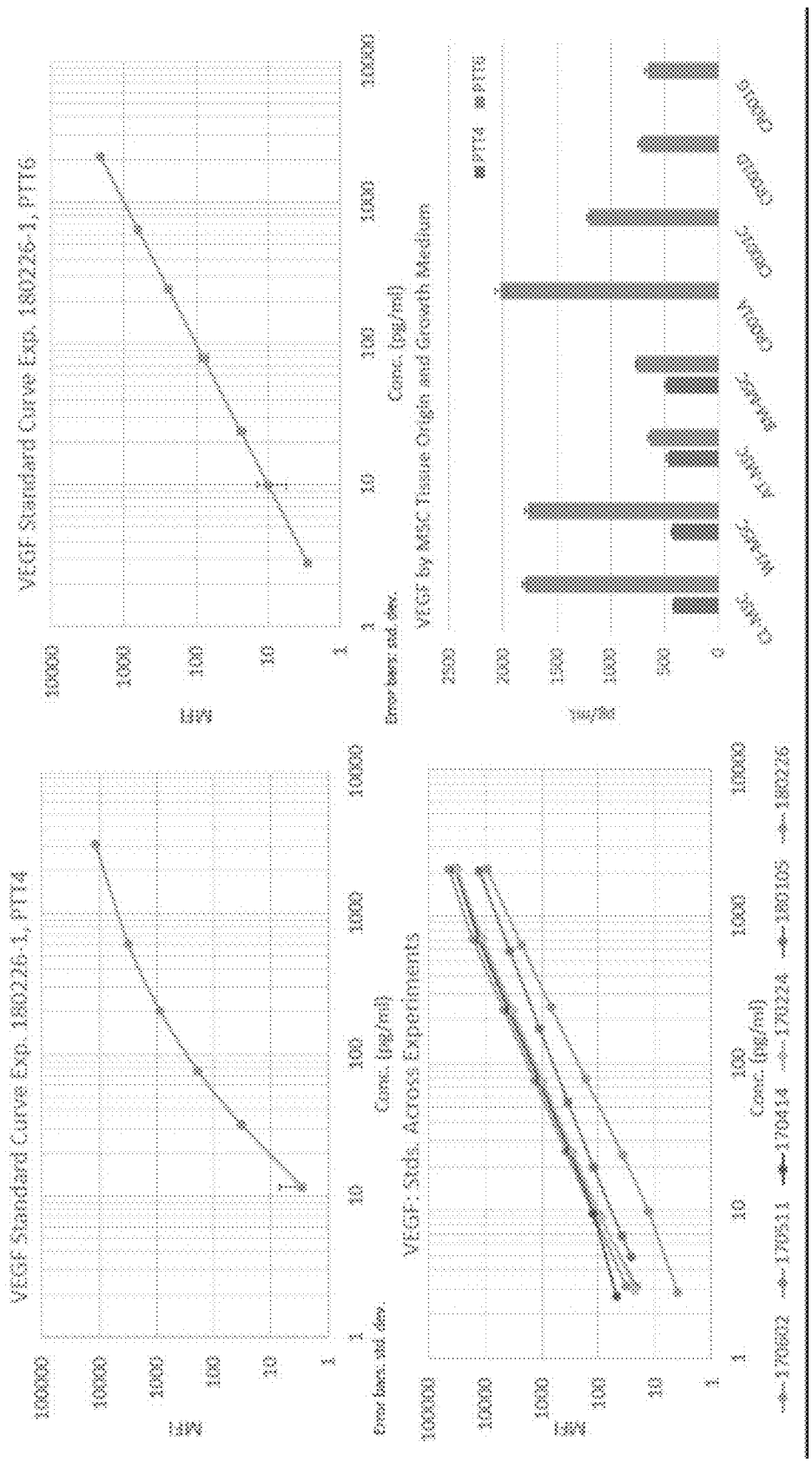
FIG. 20 summarizes measurement of VEGF over 6 different experiments (170602, 170511, 170414, 170224, 180105, 180226). Mean fluorescent intensity (MFI) measured for the VEGF standard curves across experiments is depicted in the graph below on the left-hand side. MFI for the VEGF standard curves obtained in PTT-4 and PTT-6 medium are shown in above graphs. The graph below on the right-hand side depicts that cultures CL-MSC, AT-MSC and BM-MSC and WJ-MSC produce more VEGF when grown in PTT-6 than when grown in PTT-4. All error bars are standard deviation from different measurements for the experiments 170602, 170511, 170414, 170224, 180105, 180226.

FIG. 20: Summarizes measurement of VEGF over 6 different experiments (170602, 170511, 170414, 170224, 180105, 180226). Mean fluorescent intensity (MFI) measured for the VEGF standard curves across experiments is depicted in the graph below on the left-hand side. MFI for the VEGF standard curves obtained in PTT-4 and PTT-6 medium are shown in above graphs. The graph below on the right-hand side depicts that cultures CL-MSC, AT-MSC and BM-MSC and WJ-MSC produce more VEGF when grown in PTT-6 than when grown in PTT-4. All error bars are standard deviation from different measurements for the experiments 170602, 170511, 170414, 170224, 180105, 180226.

Figure 21:
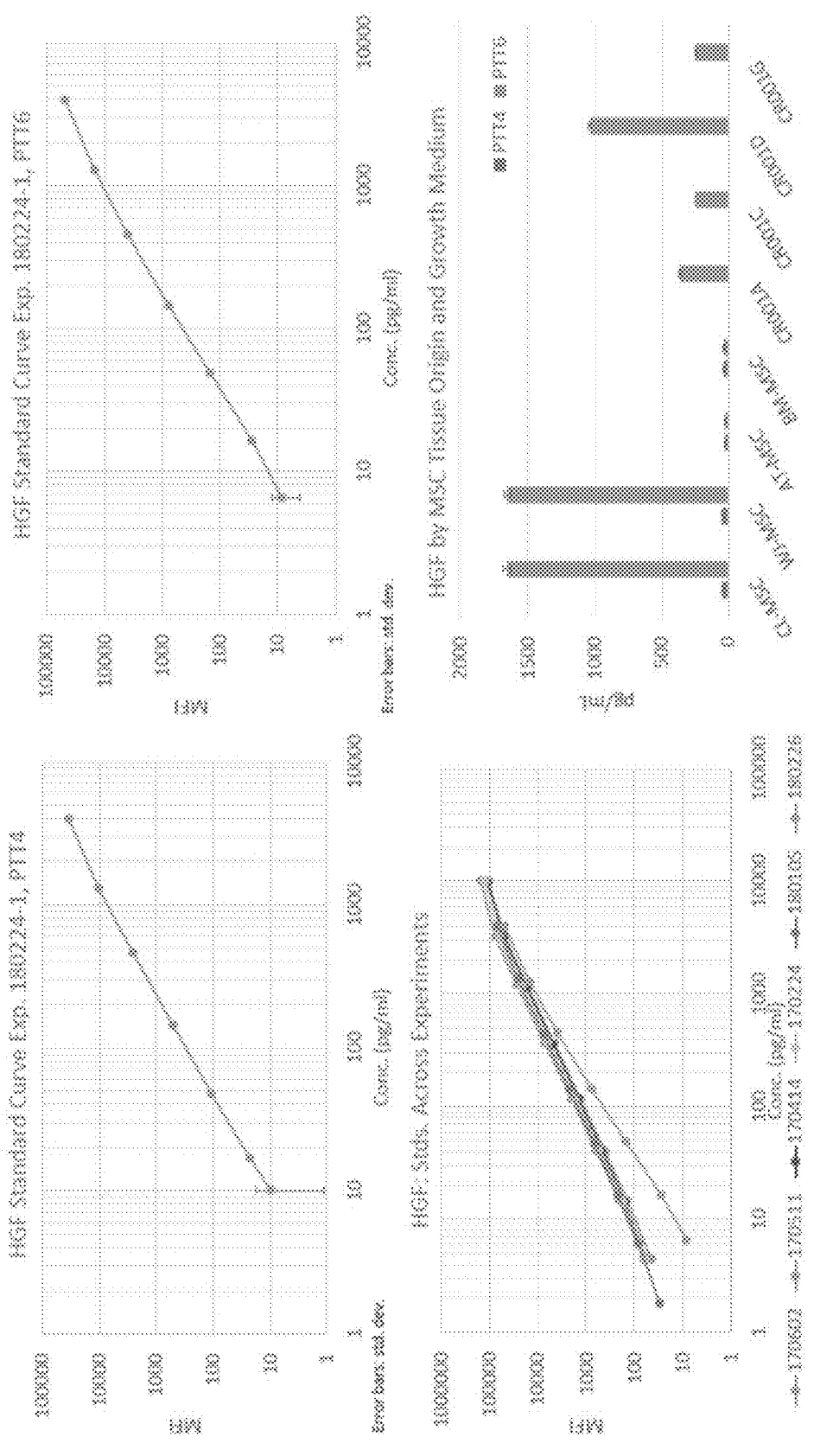
FIG. 21 summarizes measurement of HGF over 6 different experiments (170602, 170511, 170414, 170224, 180105, 180226). Mean fluorescent intensity (MFI) measured for the HGF standard curves across experiments is depicted in the graph below on the left-hand side. MFI for the HGF standard curves obtained in PTT-4 and PTT-6 medium are shown in above graphs. The graph below on the right-hand side depicts that cultures CL-MSC, and WJ-MSC produce more HGF when grown in PTT-6 than when grown in PTT-4. On the other hand cultures AT-MSC and BM-MSC did not produce as much HGF as the other cultures. All error bars are standard deviation from different measurements for the experiments 170602, 170511, 170414, 170224, 180105, 180226.

FIG. 21: Summarizes measurement of HGF over 6 different experiments (170602, 170511, 170414, 170224, 180105, 180226). Mean fluorescent intensity (MFI) measured for the HGF standard curves across experiments is depicted in the graph below on the left-hand side. MFI for the HGF standard curves obtained in PTT-4 and PTT-6 medium are shown in above graphs. The graph below on the right-hand side depicts that cultures CL-MSC, and WJ-MSC produce more HGF when grown in PTT-6 than when grown in PTT-4. On the other hand cultures AT-MSC and BM-MSC did not produce as much HGF as the other cultures. All error bars are standard deviation from different measurements for the experiments 170602, 170511, 170414, 170224, 180105, 180226.

Cytokine Assays on PTT-6 vs. PTT-4 Media or DMEM/F12-Supernatants from MSCs of CL-MSC, WJ-MSC, and Placenta MSC Origin The cytokine detection was performed in MSC Supernatants. Measurements and analysis were conducted as described above.

The goal of this experiment was to measure relative levels of Multiplex (PDGF-AA, PDGF-BB, IL-10, VEGF, Ang-1, and HGF), TGFβ1 Singleplex, and bFGF2 Singleplex cytokines on cell culture supernatants. The supernatants are obtained from mesenchymal stem cells from cord lining (CL), from Wharton's Jelly (WJ) and from placenta. The mesenchymal stem cells were cultivated in PTT-6, PPT-4 or DMEM/F12 medium.

CL-MSC cultured in PTT-4
WJ-MSC cultured in PTT-4
Placental MSC cultured in PTT-4
CL-MSC cultured in PTT-6
WJ-MSC cultured in PTT-6
Placental MSC cultured in PTT-6
CL-MSC cultured in DMEM/F12
WJ-MSC cultured in DMEM/F12

Each sample was tested in triplicate except the samples of supernatant of placental The aim of this experiment was to generate cytokine profiles of MSCs cultured either in PTT-4 or PTT-6 and to compare the profiles of MSCs from different tissue origins (umbilical cord lining vs. Wharton's Jelly vs. placental MSC). The cytokine measurements were carried as described above. The profile will shed light onto which stem cell population grown in which medium would secrete more of the cytokines of interest in order to promote wound healing.

Figure 22:
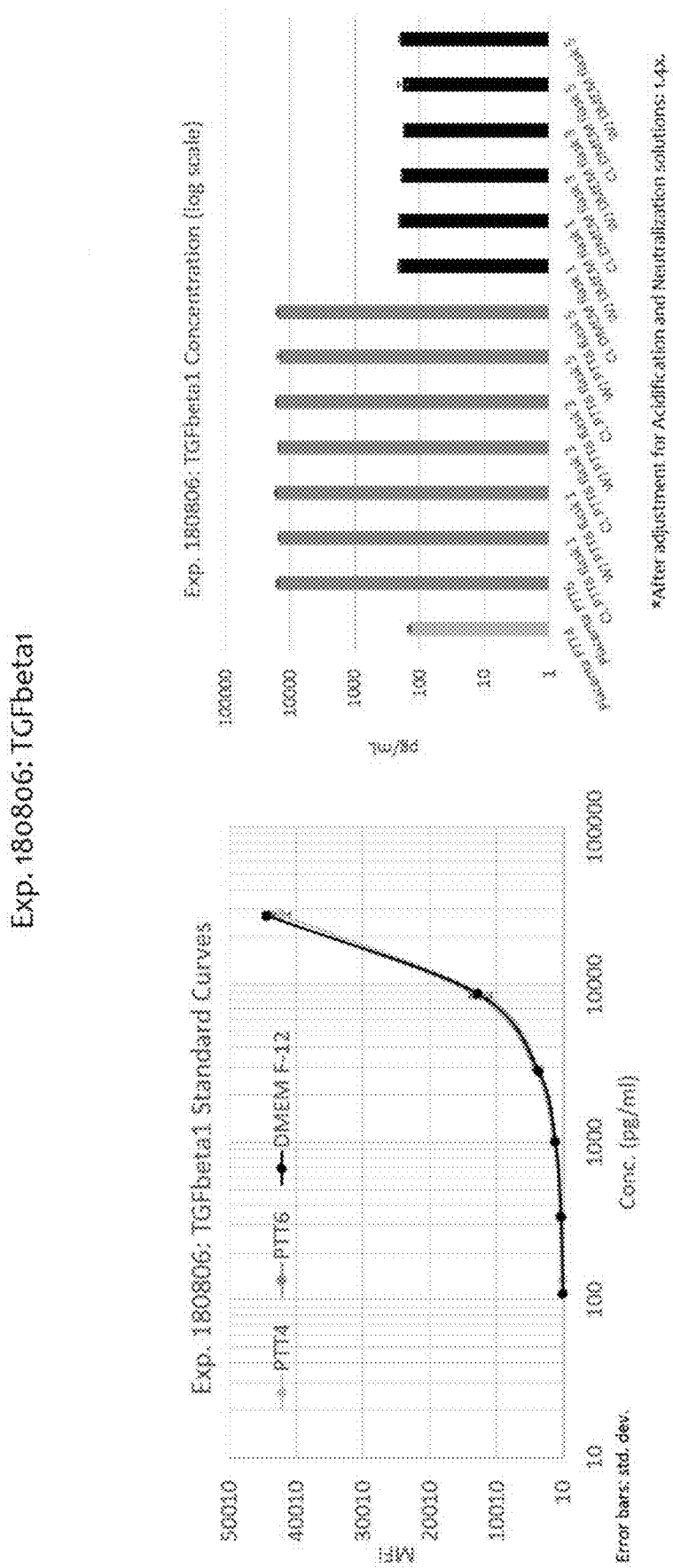
FIG. 22: Singleplex measurement of TGFβ1. Mean fluorescent intensity (MFI) measured for the standard TGFβ1 curves across experiments is depicted in the graph on the left-hand side As can be seen the graph on the right-hand sidall of CL-MSC, WJ-MSC and placental MSC produce more TGFβ1 when grown in PTT-6 than when grown in PTT-4 or DMEM/F12 (referred to only as DMEM in FIG. 22).

FIG. 22: Singleplex measurement of TGFβ1. Mean fluorescent intensity (MFI) measured for the standard TGFβ1 curves across experiments is depicted in the graph on the left-hand side As can be seen the graph on the right-hand sidall of CL-MSC, WJ-MSC and placental MSC produce more TGFβ1 when grown in PTT-6 than when grown in PTT-4 or DMEM/F12 (referred to only as DMEM in FIG. 22).

Figure 23:
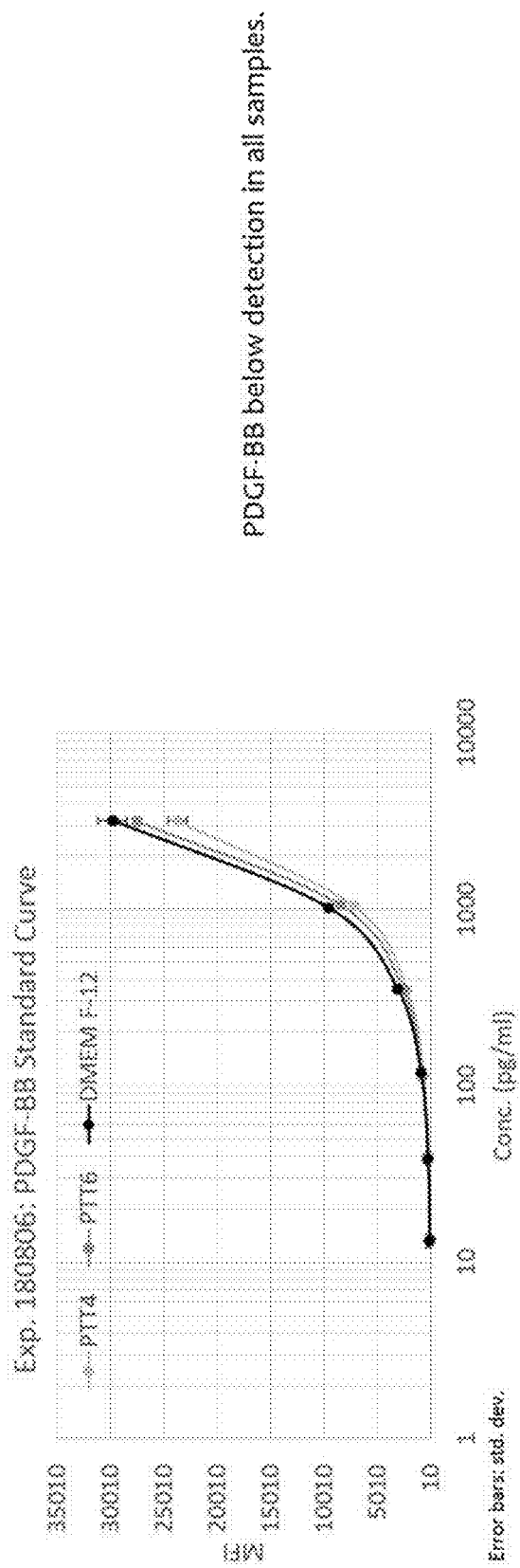
FIG. 23: Summarizes measurement of PDGF-BB in the analysed supernatants of CL-MSC, WJ-MSC and placental MSC cultured in PTT-6, PTT-4 or DMEM/F12. Mean fluorescent intensity (MFI) measured for the PDGF-BB standard curves across experiments is depicted in the graph on the left-hand side. Notably, in none of the experiments PDGF-BB has been detected.

FIG. 23: Summarizes measurement of PDGF-BB in the analysed supernatants of CL-MSC, WJ-MSC and placental MSC cultured in PTT-6, PTT-4 or DMEM/F12. Mean fluorescent intensity (MFI) measured for the PDGF-BB standard curves across experiments is depicted in the graph on the left-hand side. Notably, in none of the experiments PDGF-BB has been detected.

Figure 24:
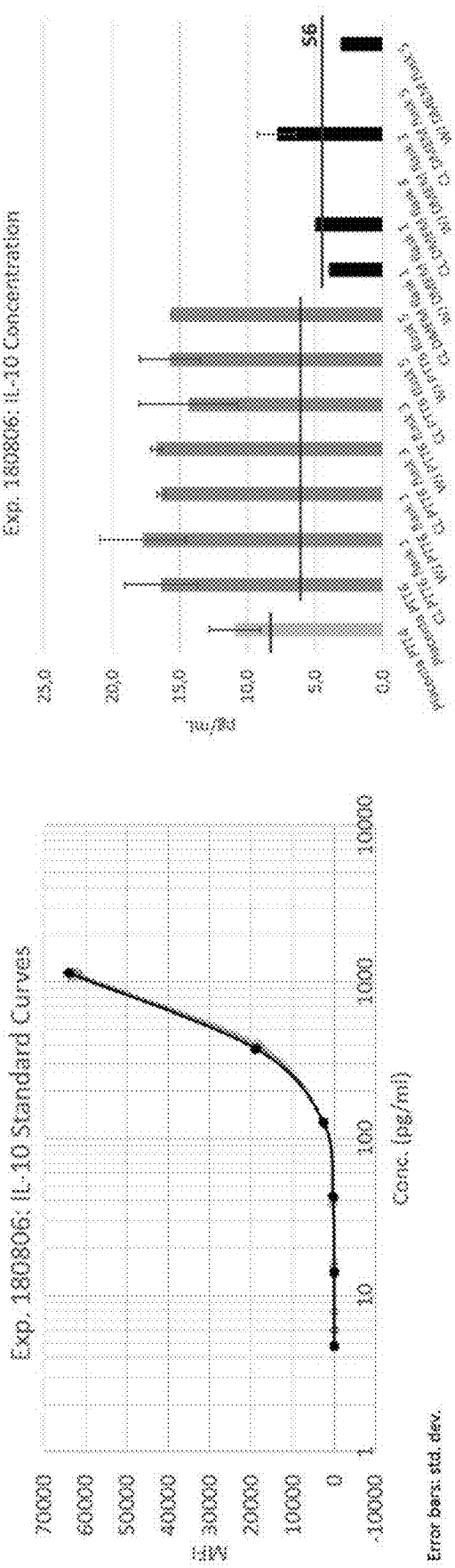
FIG. 24: Summarizes measurement of IL-10 in the analysed supernatants of CL-MSC, WJ-MSC and placental MSC cultured in PTT-6, PTT-4 or DMEM/F12. Mean fluorescent intensity (MFI) measured for the VEGF standard curves across experiments is depicted in the graph on the left-hand side. S6 denotes the lowest standard used in the assay. Any samples that fall below are considered below detection. As can be seen from the graph on the right-hand side, all of CL-MSC, WJ-MSC and placental MSC produce detectable levels of IL-10 when grown in PTT-6 while little or no IL-10 were detected when the MSC's were grown in PTT-4 or DMEM/F12

FIG. 24: Summarizes measurement of IL-10 in the analysed supernatants of CL-MSC, WJ-MSC and placental MSC cultured in PTT-6, PTT-4 or DMEM/F12. Mean fluorescent intensity (MFI) measured for the VEGF standard curves across experiments is depicted in the graph on the left-hand side. S6 denotes the lowest standard used in the assay. Any samples that fall below are considered below detection. As can be seen from the graph on the right-hand side, all of CL-MSC, WJ-MSC and placental MSC produce detectable levels of IL-10 when grown in PTT-6 while little or no IL-10 were detected when the MSC's were grown in PTT-4 or DMEM/F12

Figure 25:
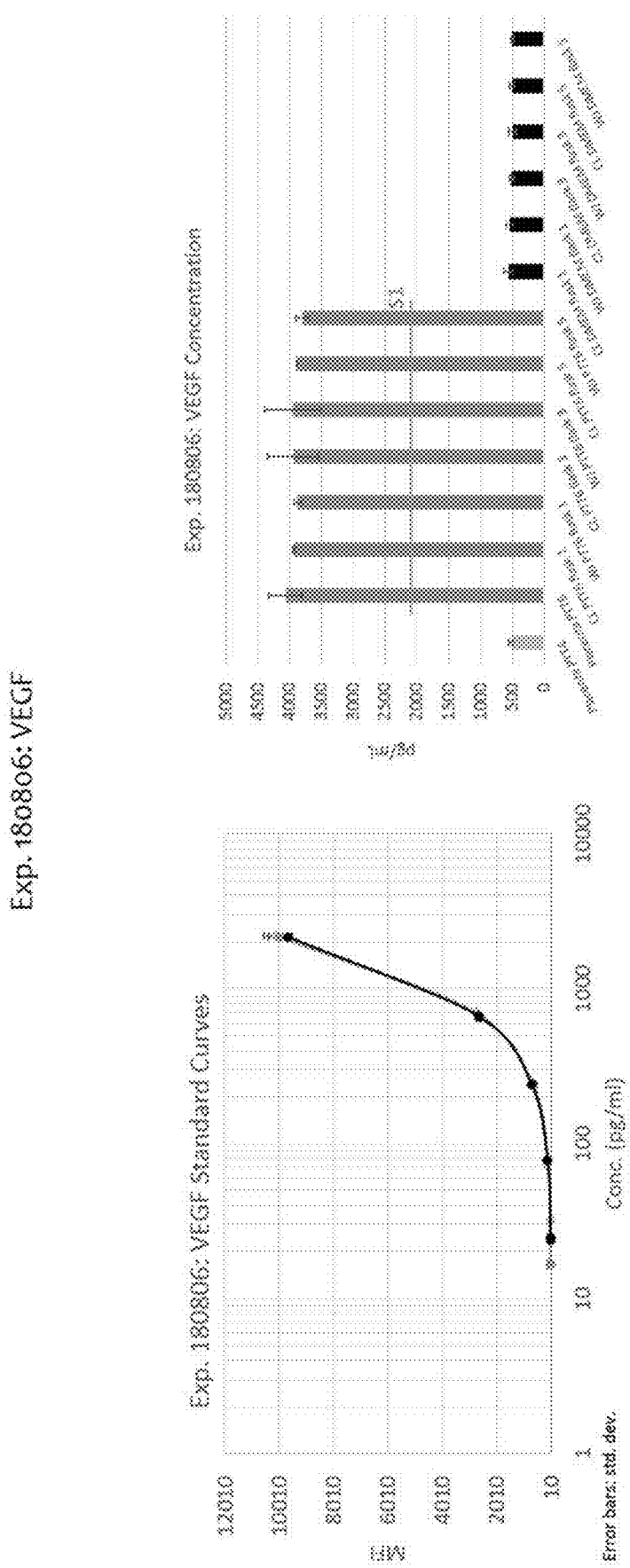
FIG. 25: Summarizes measurement of VEGF in the analysed supernatants of CL-MSC, WJ-MSC and placental MSC cultured in PTT-6, PTT-4 or DMEM/F12. Mean fluorescent intensity (MFI) measured for the VEGF standard curves across experiments is depicted in the graph on the left-hand side. 51 denotes the highest standard used in the assay. Any samples that fall above are considered extrapolated (too concentrated). As can be seen from the graph on the right-hand side, all of CL-MSC, WJ-MSC and placental MSC produce much higher levels of VEGF when grown in PTT-6 compared to when the MSC's were grown in PTT-4 or DMEM/F12.

FIG. 25: Summarizes measurement of VEGF in the analysed supernatants of CL-MSC, WJ-MSC and placental MSC cultured in PTT-6, PTT-4 or DMEM/F12. Mean fluorescent intensity (MFI) measured for the VEGF standard curves across experiments is depicted in the graph on the left-hand side. 51 denotes the highest standard used in the assay. Any samples that fall above are considered extrapolated (too concentrated). As can be seen from the graph on the right-hand side, all of CL-MSC, WJ-MSC and placental MSC produce much higher levels of VEGF when grown in PTT-6 compared to when the MSC's were grown in PTT-4 or DMEM/F12.

Figure 26:
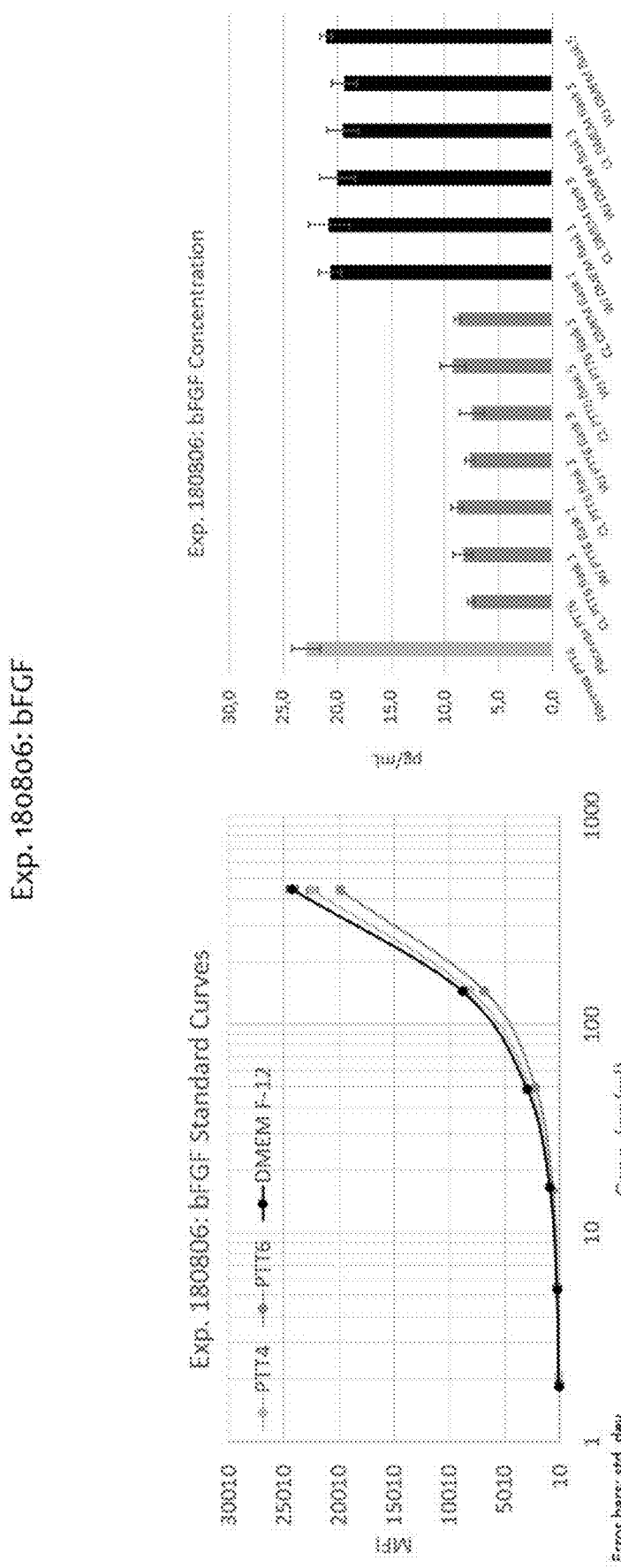
FIG. 26: Summarizes multiplex measurement of bFGF. Mean fluorescent intensity (MFI) measured for the PDGF-AA standard curves across experiments is depicted in the graph on the left-hand side. As can be seen from the graph on the right-hand side cultured CL-MSC and WJ-MSC produce more bFGF when grown in PTT-6 than when grown in PTT-4. As can be seen, all of CL-MSC, WJ-MSC and placental MSC produce much lower levels of bFGF when grown in PTT-6 compared to when the MSC's were grown in PTT-4 or DMEM/F12.

FIG. 26: Summarizes multiplex measurement of bFGF. Mean fluorescent intensity (MFI) measured for the PDGF-AA standard curves across experiments is depicted in the graph on the left-hand side. As can be seen from the graph on the right-hand side cultured CL-MSC and WJ-MSC produce more bFGF when grown in PTT-6 than when grown in PTT-4. As can be seen, all of CL-MSC, WJ-MSC and placental MSC produce much lower levels of bFGF when grown in PTT-6 compared to when the MSC's were grown in PTT-4 or DMEM/F12.

Figure 27:
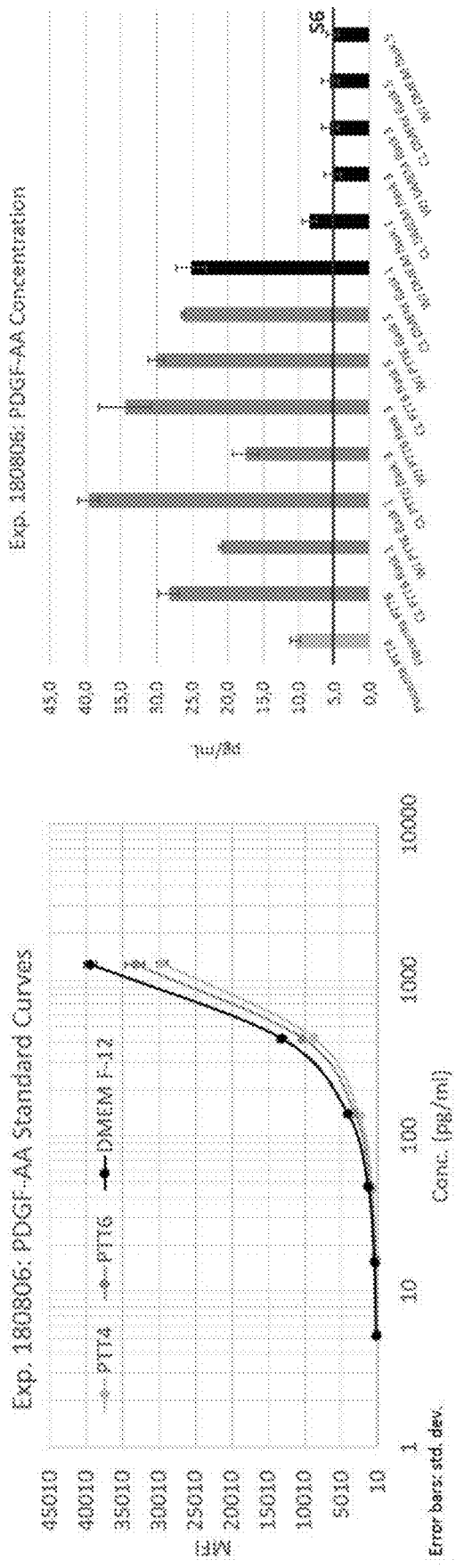
FIG. 27: Summarizes measurement of PDGF-AA. Mean fluorescent intensity (MFI) measured for the PDGF-AA standard curves across experiments is depicted in the graph on the left-hand side. S6 denotes the lowest standard used in the assay. Any samples that fall below are considered below detection As can be seen, all of CL-MSC, WJ-MSC and placental MSC produce higher levels of PDGF-AS when grown in PTT-6 compared to when the MSC's were grown in PTT-4 or DMEM/F12.

FIG. 27: Summarizes measurement of PDGF-AA. Mean fluorescent intensity (MFI) measured for the PDGF-AA standard curves across experiments is depicted in the graph on the left-hand side. S6 denotes the lowest standard used in the assay. Any samples that fall below are considered below detection As can be seen, all of CL-MSC, WJ-MSC and placental MSC produce higher levels of PDGF-AS when grown in PTT-6 compared to when the MSC's were grown in PTT-4 or DMEM/F12.

Figure 28:
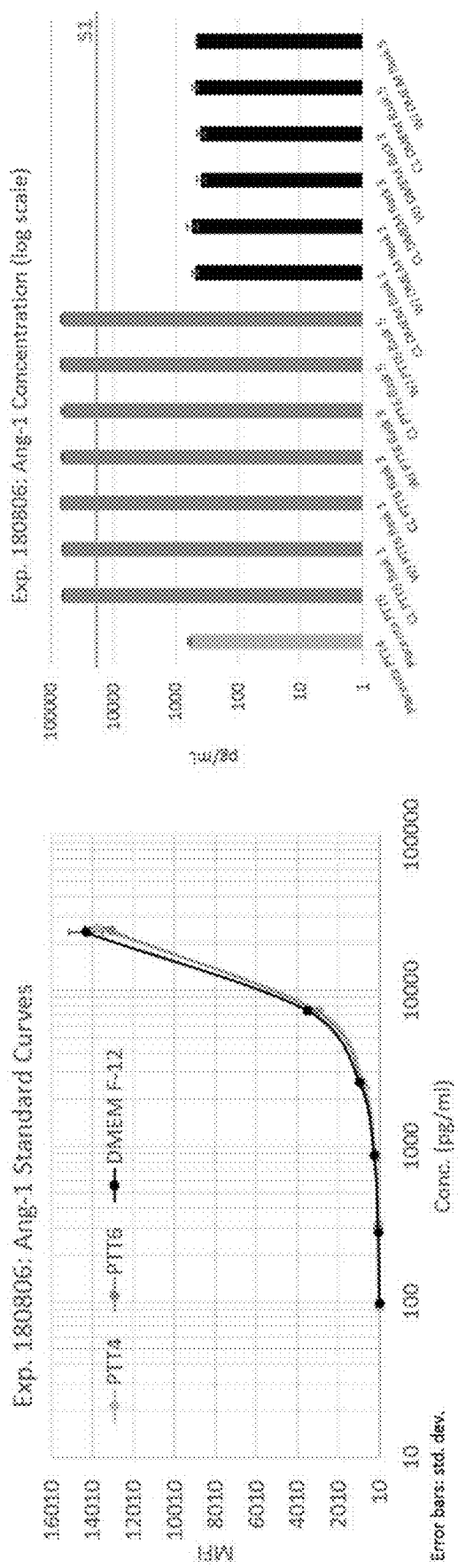
FIG. 28: Summarizes measurement of Ang-1. Mean fluorescent intensity (MFI) measured for the Ang-1 standard curves across experiments is depicted in the graph on the left-hand side. 51 denotes the highest standard used in the assay. Any samples that fall above are considered extrapolated (too concentrated). The graph on the right-hand side depicts that all of CL-MSC, WJ-MSC and placental MSC produce much higher levels of Ang-1 when grown in PTT-6 compared to when the MSC's were grown in PTT-4 or DMEM/F12.

FIG. 28: Summarizes measurement of Ang-1. Mean fluorescent intensity (MFI) measured for the Ang-1 standard curves across experiments is depicted in the graph on the left-hand side. 51 denotes the highest standard used in the assay. Any samples that fall above are considered extrapolated (too concentrated). The graph on the right-hand side depicts that all of CL-MSC, WJ-MSC and placental MSC produce much higher levels of Ang-1 when grown in PTT-6 compared to when the MSC's were grown in PTT-4 or DMEM/F12.

Figure 29:
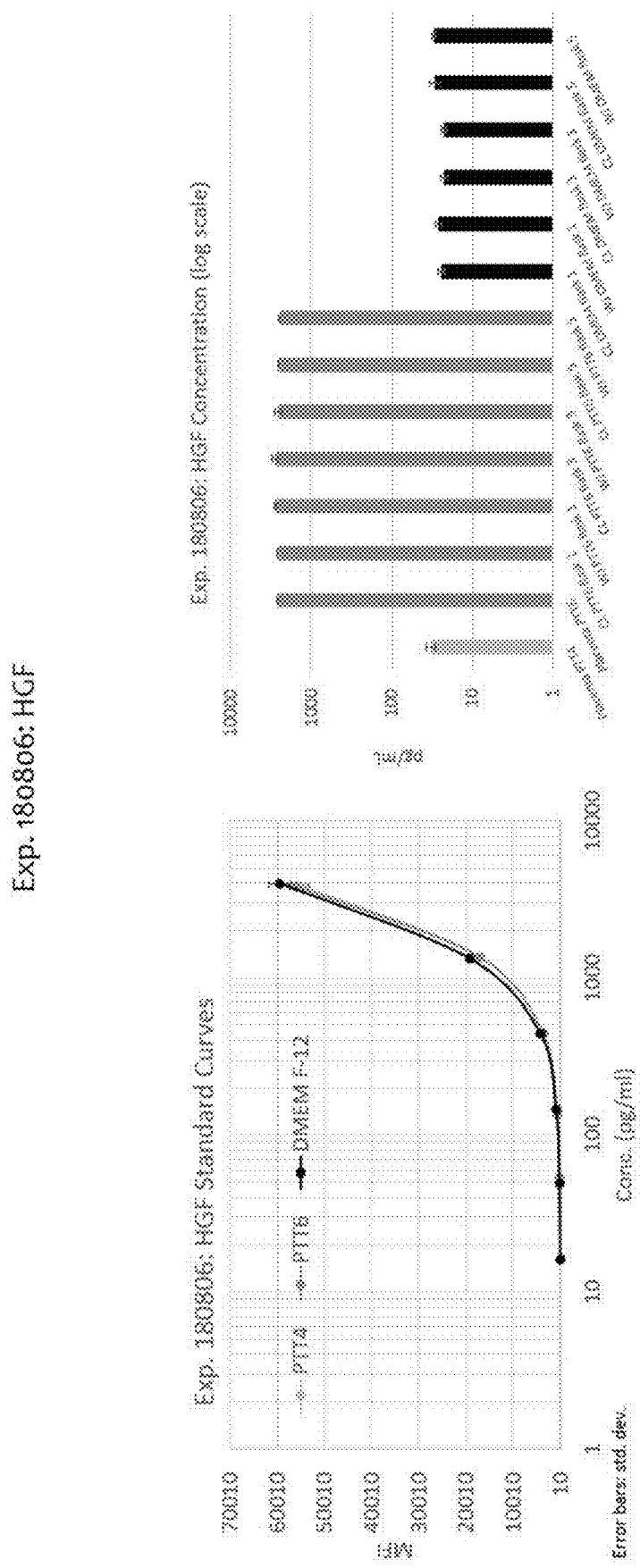
FIG. 29: Summarizes measurement of HGF. Mean fluorescent intensity (MFI) measured for the HGF standard curves across experiments is depicted in the graph on the left-hand side. The graph on the right-hand side depicts that all of CL-MSC, WJ-MSC and placental MSC produce much higher levels of Ang-1 when grown in PTT-6 compared to when the MSC's were grown in PTT-4 or DMEM/F12.

FIG. 29: Summarizes measurement of HGF. Mean fluorescent intensity (MFI) measured for the HGF standard curves across experiments is depicted in the graph on the left-hand side. The graph on the right-hand side depicts that all of CL-MSC, WJ-MSC and placental MSC produce much higher levels of Ang-1 when grown in PTT-6 compared to when the MSC's were grown in PTT-4 or DMEM/F12.

From the above described experiments the following can be concluded. When mesenchymal stem cells, in particular mesenchymal stem cells isolated from a compartment of the umbilical cord or isolated from the placenta, are cultured in PTT-6 medium, the secretion of the factors Angiopoietin 1 (Ang-1), TGF-β1, VEGF, and HGF by the mesenchymal stem cell population is significantly increased when compared to their production level in PTT-4 medium or a commercially available culture medium such as DMEM/F12. Notably, PTT-6 medium is able to increase the production/secretion of these factors irrespective of the natural environment/compartment of the mesenchymal stem population.

Since the PTT-6 medium causes secretion of all of Ang-1, TGF-β1, VEGF, and HGF (the involvement of which in wound healing is known, as discussed herein) in mesenchymal stem cell populations, it is clear that the PTT-6 medium has the effect of inducing or improving wound healing properties of a wide range of mesenchymal stem cell population, irrespective of the natural environment/compartment of the mesenchymal stem population from which the mesenchymal stem cells have been originally derived—it is noted here again that Experiment 4 was carried out with cell populations that had been isolated from their natural environment prior to cultivation in PTT-6.

In addition, cultivation of mesenchymal stem cells in PTT-6 by tissue explant provides a highly homogenous mesenchymal stem cell population (that contained 97.5% viable cells of which 100% expressed each of CD73, CD90 and CD105 while 99.2% of the stem cell population did not express CD45 and 100% of the stem cell population did not express CD34 and HLA-DR (see the rows "CD34−CD45− and "CD34−HLA-DR−) of the amniotic membrane of the umbilical. Since the cultivation of a mesenchymal stem cell population of Wharton's Jelly in PTT-6 has the same positive effect on production of the cytokines Ang-1, TGF-β1, VEGF, and HGF as it has on the production of these cytokines in cord lining stem cells, it can be expected that cultivation of Wharton's jelly in PTT-6 will also result in such a highly homogenous mesenchymal Wharton's jelly stem cell population. It can therefore also be expected that tissue explant of other compartments of the umbilical cord such as cultivation of the umbilical cord vessel will result in a perivascular (PV) mesenchymal stem cell population of similar homogeneity. Likewise, tissue explant of placental tissue including the amniotic membrane of placenta by cultivation in PTT-6 can be expect to yield a placental mesenchymal stem cell population of similar homogeneity. Thus, the present provides a generally applicable methodology to obtain a mesenchymal stem cell population, wherein at least about 91% or more, about 92% or more, about 93% or more, about 94% or more, about 95% or more, about 96% or more, about 97% or more, about 98% or more about 99% or more cells of the isolated mesenchymal stem cell population express each of CD73, CD90 and CD105 and lack expression of each of CD34, CD45 and HLA-DR.

The invention is also characterized by the following items.

1. A method of inducing or improving wound healing properties of a mesenchymal stem cell population, the method comprising cultivating the mesenchymal stem cell population in a culture medium comprising DMEM (Dulbecco's modified eagle medium), F12 (Ham's F12 Medium), M171 (Medium 171) and FBS (Fetal Bovine Serum).

2. The method of item 1, wherein the mesenchymal stem cell population is selected from the group consisting of a mesenchymal stem cell population of the umbilical cord, a placental mesenchymal stem cell population, a mesenchymal stem cell population of the cord-placenta junction, a mesenchymal stem cell population of the cord blood, a mesenchymal stem cell population of the bone marrow, and an adipose-tissue derived mesenchymal stem cell population.

3. The method of item 2, wherein the mesenchymal stem cell population of the umbilical cord is selected from the group consisting of a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord and a mixed mesenchymal stem cell population of the umbilical cord (MC).

4. The method of any of items 1 to 3, wherein the culture medium comprises DMEM in a final concentration of about 55 to 65% (v/v), F12 in a final concentration of about 5 to 15% (v/v), M171 in a final concentration of about 15 to 30% (v/v) and FBS in a final concentration of about 1 to 8% (v/v).

5. The method of item 4, wherein the culture medium comprises DMEM in a final concentration of about 57.5 to 62.5% (v/v), F12 in a final concentration of about 7.5 to 12.5% (v/v), M171 in a final concentration of about 17.5 to 25.0% (v/v) and FBS in a final concentration of about 1.75 to 3.5% (v/v).

6. The method of item 5, wherein the culture medium comprises DMEM in a final concentration of about 61.8%

(v/v), F12 in a final concentration of about 11.8% (v/v), M171 in a final concentration of about 23.6% (v/v) and FBS in a final concentration of about 2.5% (v/v).
7. The method of any of items 1 to 6, wherein the culture medium further comprises Epidermal Growth Factor (EGF) in a final concentration of about 1 ng/ml to about 20 ng/ml.
8. The method of item 7, wherein the culture medium comprises EGF in a final concentration of about 10 ng/ml.
9. The method of any of items 1 to 8, wherein the culture medium comprises Insulin in a final concentration of about 1 μg/ml to 10 μg/ml.
10. The method of item 9, wherein the culture medium comprises Insulin in a final concentration of about 5 μg/ml.
11. The method of any of items 1 to 10, wherein the culture medium further comprises at least one of the following supplements: adenine, hydrocortisone, and 3,3',5-Triiodo-L-thyronine sodium salt (T3).
12. The method of any of items 1 to 11, wherein the culture medium comprises all three of adenine, hydrocortisone, and 3,3',5-Triiodo-L-thyronine sodium salt (T3).
13. The method of item 12 or 13, wherein the culture medium comprises adenine in a final concentration of about 0.01 to about 0.1 μg/ml adenine, hydrocortisone in a final concentration of about 0.1 to about 10 μg/ml hydrocortisone and/or 3, 3', 5-Triiodo-L-thyronine sodium salt (T3) in a final concentration of about 0.5 to about 5 ng/ml.
14. The method of any of items 1 to 13, wherein cultivating the mesenchymal stem cell population in the culture medium as defined in any of the foregoing items 1 to 13 results in an increase of the expression and/or secretion of at least one of Angiopoietin 1 (Ang-1), TGF-β (in particular TGF-β1), VEGF, and HGF by the mesenchymal stem cell population relative to a reference culture medium that does not comprise all of DMEM (Dulbecco's modified eagle medium), F12 (Ham's F12 Medium), M171 (Medium 171) and FBS (Fetal Bovine Serum).
15. The method of item 14, wherein the reference medium consists of 90% (v/v) CMRL1066, and 10% (v/v) FBS.
16. The method of any of the foregoing items, wherein the mesenchymal stem cell population has been isolated from its natural environment prior to cultivation in the culture medium as defined in any of the foregoing items 1 to 13.
17. The method of any of items 1 to 15, comprising isolating the mesenchymal stem cell population from a natural tissue environment by cultivating the natural tissue in the cell culture medium as defined in any of the foregoing items 1 to 13.
18. The method of item 17, wherein the tissue is an umbilical cord tissue.
19. The method of item 18, wherein the umbilical cord tissue is selected from the group consisting of tissue of the entire umbilical cord, tissue comprising the amniotic membrane of umbilical cord, tissue comprising Wharton's jelly, tissue comprising the amniotic membrane, the amnion and Wharton's jelly, the isolated umbilical cord blood vessels, Wharton's jelly separated from the other components of umbilical cord tissue, and isolated amniotic membrane of the umbilical cord.
20. The method of item 17, wherein the tissue comprises or is amniotic membrane tissue of placenta.
21. The method of any of the foregoing items 17 to 20, wherein the umbilical cord tissue is a piece of the entire umbilical cord, a piece of the amniotic membrane of the umbilical cord or a piece of the amniotic membrane of placenta.
22. The method of any of items 19 to 22, comprising culturing the umbilical cord tissue or the amniotic membrane tissue of the placenta till the cell outgrowth of the mesenchymal stem cell population of the amniotic membrane reaches about 70-80% confluency.
23. The method of item 22, comprising removing the mesenchymal stem cell population from the cultivation container used for the cultivation.
24. The method of item 23, wherein removing the mesenchymal stem cell population from the cultivation container is carried out by enzymatic treatment.
25. The method of item 24, wherein the enzymatic treatment comprises trypsination.
26. The method of any of items 23 to 25, wherein the mesenchymal stem cell population is transferred for subculturing to a cultivation container for subculturing.
27. The method of any of items 1 to 16, wherein the mesenchymal stem cell population is transferred for culturing to a cultivation container for subculturing.
28. The method of item 26 or 27, wherein the mesenchymal cell population is suspended for culturing or subculturing at a concentration $1.0 \times 10^6$ cells/ml.
29. The method of item 28, wherein the mesenchymal stem cell population is subcultured in a culture medium as defined in any of the items 1 to 13.
30. The method of item 29, wherein the mesenchymal stem cell population is subcultured till the mesenchymal stem cells reach about 70-80% confluency.
31. The method of any of items 26 to 30, wherein the culturing or subculturing is carried out in a self-contained bioreactor.
32. The method of item 31, wherein the bioreactor is selected from the group consisting of a parallel-plate bioreactor, a hollow-fiber bioreactor and and a micro-fluidic bioreactor.
33. The method of any of the foregoing items wherein cultivation is carried out in a $CO_2$ cell culture incubator at a temperature of 37° C.
34. The method of item 33, comprising removing the mesenchymal stem cell population from the cultivation container used for the (sub)cultivation.
35. The method of item 34, wherein removing the mesenchymal stem cell population from the cultivation container is carried out by enzymatic treatment.
36. The method of item 35, wherein the enzymatic treatment comprises trypsination.
37. The method of item 36, further comprising collecting the isolated mesenchymal stem cell population.
38. The method of any of the foregoing items, wherein at least about 90% or more, about 91% or more, about 92% or more, about 93% or more, about 94% or more, about 95% or more, about 96% or more, about 97% or more, about 98% or more about 99% or more of the isolated mesenchymal stem cells express the following markers: CD73, CD90 and CD105.
39. The method of any of the foregoing items, wherein at least about 90% or more, about 91% or more, about 92% or more, about 93% or more, about 94% or more, about 95% or more, about 96% or more, about 97% or more, about 98% or more about 99% or more of the isolated mesenchymal stem cells lack expression of the following markers: CD34, CD45 and HLA-DR (Human Leukocyte Antigen—antigen D Related).
40. The method of any of items 38 or 39, wherein about 97% or more, about 98% or more about 99% or more of the isolated mesenchymal stem cells express CD73, CD90 and CD105 and lack expression of CD34, CD45 and HLA-DR.

41. The method of any of the foregoing items, further comprising preserving the isolated stem/progenitor cell population for further use.

42. The method of item 41, wherein preserving is carried out by cryo-preservation.

43. An isolated mesenchymal stem population, wherein at least about 90% or more cells of the stem cell population express each of the following markers: CD73, CD90 and CD105.

44. The mesenchymal stem cell population of item 43, wherein least about 90% or more cells of the stem cell population lack expression of the following markers: CD34, CD45 and HLA-DR.

45. The mesenchymal stem cell population of item 44, wherein at least about 91% or more, about 92% or more, about 93% or more, about 94% or more, about 95% or more, about 96% or more, about 97% or more, about 98% or more about 99% or more cells of the isolated mesenchymal stem cell population express each of CD73, CD90 and CD105 and lack expression of each of CD34, CD45 and HLA-DR.

46. The mesenchymal stem cell population of any of items 43 to 45, wherein the mesenchymal stem cell population is selected from the group consisting of a mesenchymal stem cell population of the umbilical cord, a placental mesenchymal stem cell population, a mesenchymal stem cell population of the cord blood, a mesenchymal stem cell population of the bone marrow, and an adipose-tissue derived mesenchymal stem cell population.

47. The mesenchymal stem cell population of any of items 43 to 46, wherein the mesenchymal stem cell population of the umbilical cord is selected from the group consisting of a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord and a mixed mesenchymal stem cell population of the umbilical cord (MC).

48. The mesenchymal stem cell population of any of items 43 to 47, wherein the population is obtainable by the method as defined in any of items 1 to 42.

49. The mesenchymal stem cell population of any of items 43 to 48, wherein the population is obtained by the method as defined in any of items 1 to 42.

50. A pharmaceutical composition comprising an isolated mesenchymal stem cell population as defined in any of items 43 to 47, wherein at least about 90% or more cells of the stem cell population express each of the following markers: CD73, CD90 and CD105 and lack expression of each of the following markers: CD34, CD45 and HLA-DR.

51. The pharmaceutical composition of item 50, wherein the pharmaceutical composition is adapted for systemic or topical application.

52. The pharmaceutical composition of item 50 or 51, further comprising a pharmaceutically acceptable excipient.

53. A method of making a culture medium suitable of inducing or improving wound healing properties of a mesenchymal stem cell population, the method comprising, mixing to obtain a final volume of 500 ml culture medium:
   i. 250 ml of DMEM
   ii. 118 ml M171
   iii. 118 ml DMEM/F12
   iv. 12.5 ml Fetal Bovine Serum (FBS) (final concentration of 2.5%)

54. The method of item 53, further comprising adding
   v. 1 ml EGF stock solution (5 μg/ml) to achieve a final concentration of 10 ng/ml)
   vi. Insulin 0.175 ml stock solution (14.28 mg/ml) to achieve a final concentration of 5 μg/ml.

55. The method of item 53 or 54, further comprising adding to DMEM one or more of the following supplements: adenine, hydrocortisone, 3,3',5-Triiodo-L-thyronine sodium salt (T3), thereby reaching a total volume of 500 ml culture medium.

56. The method of item 55, wherein the final concentration of the supplements in DMEM are as follows:
   about 0.05 to 0.1 μg/ml adenine, for example about 0.025 μg/ml adenine,
   about 1 to 10 μg/ml hydrocortisone,
   about 0.5 to 5 ng/ml 3,3',5-Triiodo-L-thyronine sodium salt (T3), for example 1.36 ng/ml 3,3',5-Triiodo-L-thyronine sodium salt (T3).

57. A cell culture medium obtainable by the method of any of items 53 to 56.

58. A method of inducing or improving wound healing properties of a mesenchymal stem cell population, comprising cultivating amniotic membrane tissue in the culture medium prepared by the method as defined in any of items 53 to 56.

59. The method of item 58, wherein the mesenchymal stem cell population is selected from the group consisting of a mesenchymal stem cell population of the umbilical cord, a placental mesenchymal stem cell population, a mesenchymal stem cell population of the cord blood, a mesenchymal stem cell population of the bone marrow, and an adipose-tissue derived mesenchymal stem cell population.

60. The method of item 59, wherein the mesenchymal stem cell population of the umbilical cord is selected from the group consisting of a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord and a mixed mesenchymal stem cell population of the umbilical cord (MC).

61. A cell culture medium comprising:
   DMEM in the final concentration of about 55 to 65% (v/v),
   F12 in a final concentration of about 5 to 15% (v/v),
   M171 in a final concentration of about 15 to 30% (v/v) and
   FBS in a final concentration of about 1 to 8% (v/v).

62. The cell culture medium of item 61, wherein the culture medium comprises DMEM in the final concentration of about 57.5 to 62.5% (v/v), F12 in a final concentration of about 7.5 to 12.5% (v/v), M171 in a final concentration of about 17.5 to 25.0% (v/v) and FBS in a final concentration of about 1.75 to 3.5% (v/v).

63. The cell culture medium of item 62, wherein the culture medium comprises DMEM in a final concentration of about 61.8% (v/v), F12 in a final concentration of about 11.8% (v/v), M171 in a final concentration of about 23.6% (v/v) and FBS in a final concentration of about 2.5% (v/v).

64. The cell culture medium of any of items 61 to 62, wherein the culture medium further comprises Epidermal Growth Factor (EGF) in a final concentration of about 1 ng/ml to about 20 ng/ml.

65. The cell culture medium of any of items 61 to 65, wherein the culture medium comprises EGF in a final concentration of about 10 ng/ml.

66. The cell culture medium of any of items 61 to 65, wherein the culture medium comprises Insulin in a final concentration of about 1 μg/ml to 10 μg/ml.

67. The cell culture medium of item 66, wherein the culture medium comprises Insulin in a final concentration of about 5 µg/ml.

68. The cell culture medium of any of items 61 to 67, wherein the culture medium further comprises at least one of the following supplements: adenine, hydrocortisone, and 3,3',5-Triiodo-L-thyronine sodium salt (T3).

69. The cell culture medium of item 68, wherein the culture medium comprises all three of adenine, hydrocortisone, and 3, 3', 5-Triiodo-L-thyronine sodium salt (T3).

70. The cell culture medium of item 68 or 69, wherein the culture medium comprises adenine in a final concentration of about 0.05 to about 0.1 µg/ml adenine, hydrocortisone in a final concentration of about 1 to about 10 µg/ml hydrocortisone and/or 3, 3', 5-Triiodo-L-thyronine sodium salt (T3) in a final concentration of about 0.5 to about 5 ng/ml.

71. The cell culture medium of any of items 61 to 70, wherein 500 ml of the cell culture medium comprise:
   i. 250 ml of DMEM
   ii. 118 ml M171
   iii. 118 ml DMEM/F12
   iv. 12.5 ml Fetal Bovine Serum (FBS) (final concentration of 2.5%)

72. The cell culture medium of item 71, further comprising
   v. EGF in a final concentration of 10 ng/ml
   vi. Insulin in a final concentration of 5 µg/ml.
   vi. Insulin 0.175 ml (final concentration of 5 µg/ml)

73. The cell culture medium of item 71 or 72, further comprising adenine in a final concentration of about 0.05 to about 0.1 µg/ml adenine, hydrocortisone in a final concentration of about 1 to about 10 µg/ml hydrocortisone and/or 3,3',5-Triiodo-L-thyronine sodium salt (T3) in a final concentration of about 0.5 to about 5 ng/ml.

74. The use of a cell culture medium as defined in any of items 61 to 73 for inducing or improving wound healing properties of a mesenchymal stem cell population.

75. The use of a cell culture medium as defined in any of items 61 to 73 for isolation of a mesenchymal stem cell population.

76. The use of item 74 or 75, wherein the mesenchymal stem cell population is selected from the group consisting of a mesenchymal stem cell population of the umbilical cord, a placental mesenchymal stem cell population, a mesenchymal stem cell population of the cord blood, a mesenchymal stem cell population of the bone marrow, and an adipose-tissue derived mesenchymal stem cell population.

77. The use of item 76, wherein the mesenchymal stem cell population of the umbilical cord is selected from the group consisting of a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord and a mixed mesenchymal stem cell population of the umbilical cord (MC).

78. The use of any of items 74 to 77, wherein at least about 90% or more cells of the mesenchymal stem cell population express each of the following markers: CD73, CD90 and CD105.

79. The use of item 78, wherein least about 90% or more cells of the mesenchymal stem cell population lack expression of the following markers: CD34, CD45 and HLA-DR.

80. The use of item 79, wherein at least about 91% or more, about 92% or more, about 93% or more, about 94% or more, about 95% or more, about 96% or more, about 97% or more, about 98% or more about 99% or more cells of the isolated mesenchymal stem cell population express each of CD73, CD90 and CD105 and lack expression of each of CD34, CD45 and HLA-DR.

81. A pharmaceutical composition containing three or four of Ang-1, TGF-β1, VEGF, or HGF as the only wound healing proteins.

82. The pharmaceutical composition of item 81, formulated as a liquid or as lyophilisate/freeze-dried formulation.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention. The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group. Further embodiments of the invention will become apparent from the following claims.

What is claimed is:

1. A method of inducing or improving wound healing properties of a mesenchymal stem cell population derived from umbilical cord, the method comprising cultivating the mesenchymal stem cell population in a culture medium comprising 55 to 65% (v/v) Dulbecco's modified Eagle's medium (DMEM), 5 to 15% (v/v) Ham's F12 Medium (F12), 15 to 30% (v/v) Medium 171 (M171) and 1 to 8% (v/v) Fetal Bovine Serum (FBS) in a bioreactor under conditions such that the mesenchymal stem cell population in said culture medium results in an increase in expression and/or secretion of at least three of Angiopoietin 1 (Ang-1), TGF-β1, VEGF, and HGF by the mesenchymal stem cell population relative to cultivation of said mesenchymal stem cell population in a reference culture medium that does not comprise all of DMEM, F12, M171, and FBS.

2. The method of claim 1, wherein the mesenchymal stem cell population derived from umbilical cord is selected from the group consisting of a mesenchymal stem cell population of the amnion (AM), a perivascular (PV) mesenchymal stem cell population, a mesenchymal stem cell population of Wharton's jelly (WJ), a mesenchymal stem cell population of the amniotic membrane of umbilical cord and a mixed mesenchymal stem cell population of the umbilical cord (MC).

3. The method of claim 1, wherein the culture medium comprises DMEM in a final concentration of about 57.5 to 62.5% (v/v), F12 in a final concentration of about 7.5 to 12.5% (v/v), M171 in a final concentration of about 17.5 to 25.0% (v/v) and FBS in a final concentration of about 1.75 to 3.5% (v/v).

4. The method of claim 3, wherein the culture medium comprises DMEM in a final concentration of about 61.8% (v/v), F12 in a final concentration of about 11.8% (v/v), M171 in a final concentration of about 23.6% (v/v) and FBS in a final concentration of about 2.5% (v/v).

5. The method of claim 1, comprising isolating the mesenchymal stem cell population from a natural tissue environment by cultivating the natural tissue in the cell culture medium as defined in claim 1.

6. The method of claim 5, wherein about 90% or more, about 91% or more, about 92% or more, about 93% or more, about 94% or more, about 95% or more, about 96% or more, about 97% or more, about 98% or more, or about 99% or more of the isolated mesenchymal stem cells express the following markers: CD73, CD90 and CD105.

7. The method of claim 6 wherein about 97% or more, about 98% or more, or about 99% or more of the isolated mesenchymal stem cells express CD73, CD90 and CD105 and lack expression of CD34, CD45 and HLA-DR.

8. The method of claim 5, wherein at about 90% or more, about 91% or more, about 92% or more, about 93% or more, about 94% or more, about 95% or more, about 96% or more, about 97% or more, about 98% or more, or about 99% or more of the isolated mesenchymal stem cells lack expression of the following markers: CD34, CD45 and HLA-DR (Human Leukocyte Antigen-antigen D Related).

9. The method of claim 1, wherein the umbilical cord tissue is selected from the group consisting of tissue of the entire umbilical cord, tissue comprising the amniotic membrane of umbilical cord, tissue comprising Wharton's jelly, tissue comprising the amniotic membrane, the amnion and Wharton's jelly, the isolated umbilical cord blood vessels, Wharton's jelly separated from the other components of umbilical cord tissue, and isolated amniotic membrane of the umbilical cord.

10. The method of claim 1, wherein the umbilical cord tissue is a piece of the entire umbilical cord, or a piece of the amniotic membrane of the umbilical cord.

\* \* \* \* \*

SEQUENCE LISTING

<160> NUMBER OF SEQ ID NOS: 13

<210> SEQ ID NO 1
<211> LENGTH: 574
<212> TYPE: PRT

-continued

```
<213> ORGANISM: human

<400> SEQUENCE: 1

Met Cys Pro Arg Ala Ala Arg Ala Pro Ala Thr Leu Leu Leu Ala Leu
1               5                   10                  15

Gly Ala Val Leu Trp Pro Ala Ala Gly Ala Trp Glu Leu Thr Ile Leu
            20                  25                  30

His Thr Asn Asp Val His Ser Arg Leu Glu Gln Thr Ser Glu Asp Ser
        35                  40                  45

Ser Lys Cys Val Asn Ala Ser Arg Cys Met Gly Gly Val Ala Arg Leu
    50                  55                  60

Phe Thr Lys Val Gln Gln Ile Arg Arg Ala Glu Pro Asn Val Leu Leu
65                  70                  75                  80

Leu Asp Ala Gly Asp Gln Tyr Gln Gly Thr Ile Trp Phe Thr Val Tyr
                85                  90                  95

Lys Gly Ala Glu Val Ala His Phe Met Asn Ala Leu Arg Tyr Asp Ala
            100                 105                 110

Met Ala Leu Gly Asn His Glu Phe Asp Asn Gly Val Glu Gly Leu Ile
        115                 120                 125

Glu Pro Leu Leu Lys Glu Ala Lys Phe Pro Ile Leu Ser Ala Asn Ile
    130                 135                 140

Lys Ala Lys Gly Pro Leu Ala Ser Gln Ile Ser Gly Leu Tyr Leu Pro
145                 150                 155                 160

Tyr Lys Val Leu Pro Val Gly Asp Glu Val Val Gly Ile Val Gly Tyr
                165                 170                 175

Thr Ser Lys Glu Thr Pro Phe Leu Ser Asn Pro Gly Thr Asn Leu Val
            180                 185                 190

Phe Glu Asp Glu Ile Thr Ala Leu Gln Pro Glu Val Asp Lys Leu Lys
        195                 200                 205

Thr Leu Asn Val Asn Lys Ile Ile Ala Leu Gly His Ser Gly Phe Glu
    210                 215                 220

Met Asp Lys Leu Ile Ala Gln Lys Val Arg Gly Val Asp Val Val Val
225                 230                 235                 240

Gly Gly His Ser Asn Thr Phe Leu Tyr Thr Gly Asn Pro Pro Ser Lys
                245                 250                 255

Glu Val Pro Ala Gly Lys Tyr Pro Phe Ile Val Thr Ser Asp Asp Gly
            260                 265                 270

Arg Lys Val Pro Val Val Gln Ala Tyr Ala Phe Gly Lys Tyr Leu Gly
        275                 280                 285

Tyr Leu Lys Ile Glu Phe Asp Glu Arg Gly Asn Val Ile Ser Ser His
    290                 295                 300

Gly Asn Pro Ile Leu Leu Asn Ser Ser Ile Pro Glu Asp Pro Ser Ile
305                 310                 315                 320

Lys Ala Asp Ile Asn Lys Trp Arg Ile Lys Leu Asp Asn Tyr Ser Thr
                325                 330                 335

Gln Glu Leu Gly Lys Thr Ile Val Tyr Leu Asp Gly Ser Ser Gln Ser
            340                 345                 350

Cys Arg Phe Arg Glu Cys Asn Met Gly Asn Leu Ile Cys Asp Ala Met
        355                 360                 365

Ile Asn Asn Asn Leu Arg His Thr Asp Glu Met Phe Trp Asn His Val
    370                 375                 380

Ser Met Cys Ile Leu Asn Gly Gly Gly Ile Arg Ser Pro Ile Asp Glu
385                 390                 395                 400
```

-continued

```
Arg Asn Asn Gly Thr Ile Thr Trp Glu Asn Leu Ala Ala Val Leu Pro
                405                 410                 415

Phe Gly Gly Thr Phe Asp Leu Val Gln Leu Lys Gly Ser Thr Leu Lys
            420                 425                 430

Lys Ala Phe Glu His Ser Val His Arg Tyr Gly Gln Ser Thr Gly Glu
        435                 440                 445

Phe Leu Gln Val Gly Gly Ile His Val Val Tyr Asp Leu Ser Arg Lys
    450                 455                 460

Pro Gly Asp Arg Val Val Lys Leu Asp Val Leu Cys Thr Lys Cys Arg
465                 470                 475                 480

Val Pro Ser Tyr Asp Pro Leu Lys Met Asp Glu Val Tyr Lys Val Ile
                485                 490                 495

Leu Pro Asn Phe Leu Ala Asn Gly Gly Asp Gly Phe Gln Met Ile Lys
            500                 505                 510

Asp Glu Leu Leu Arg His Asp Ser Gly Asp Gln Asp Ile Asn Val Val
        515                 520                 525

Ser Thr Tyr Ile Ser Lys Met Lys Val Ile Tyr Pro Ala Val Glu Gly
    530                 535                 540

Arg Ile Lys Phe Ser Thr Gly Ser His Cys His Gly Ser Phe Ser Leu
545                 550                 555                 560

Ile Phe Leu Ser Leu Trp Ala Val Ile Phe Val Leu Tyr Gln
                565                 570

<210> SEQ ID NO 2
<211> LENGTH: 161
<212> TYPE: PRT
<213> ORGANISM: human

<400> SEQUENCE: 2

Met Asn Leu Ala Ile Ser Ile Ala Leu Leu Leu Thr Val Leu Gln Val
1               5                   10                  15

Ser Arg Gly Gln Lys Val Thr Ser Leu Thr Ala Cys Leu Val Asp Gln
            20                  25                  30

Ser Leu Arg Leu Asp Cys Arg His Glu Asn Thr Ser Ser Ser Pro Ile
        35                  40                  45

Gln Tyr Glu Phe Ser Leu Thr Arg Glu Thr Lys Lys His Val Leu Phe
    50                  55                  60

Gly Thr Val Gly Val Pro Glu His Thr Tyr Arg Ser Arg Thr Asn Phe
65                  70                  75                  80

Thr Ser Lys Tyr Asn Met Lys Val Leu Tyr Leu Ser Ala Phe Thr Ser
                85                  90                  95

Lys Asp Glu Gly Thr Tyr Thr Cys Ala Leu His His Ser Gly His Ser
            100                 105                 110

Pro Pro Ile Ser Ser Gln Asn Val Thr Val Leu Arg Asp Lys Leu Val
        115                 120                 125

Lys Cys Glu Gly Ile Ser Leu Leu Ala Gln Asn Thr Ser Trp Leu Leu
    130                 135                 140

Leu Leu Leu Leu Ser Leu Ser Leu Leu Gln Ala Thr Asp Phe Met Ser
145                 150                 155                 160

Leu

<210> SEQ ID NO 3
<211> LENGTH: 658
<212> TYPE: PRT
<213> ORGANISM: human
```

```
<400> SEQUENCE: 3

Met Asp Arg Gly Thr Leu Pro Leu Ala Val Ala Leu Leu Ala Ser
1               5                   10                  15

Cys Ser Leu Ser Pro Thr Ser Leu Ala Glu Thr Val His Cys Asp Leu
            20                  25                  30

Gln Pro Val Gly Pro Glu Arg Gly Glu Val Thr Tyr Thr Thr Ser Gln
            35                  40                  45

Val Ser Lys Gly Cys Val Ala Gln Ala Pro Asn Ala Ile Leu Glu Val
    50                  55                  60

His Val Leu Phe Leu Glu Phe Pro Thr Gly Pro Ser Gln Leu Glu Leu
65                  70                  75                  80

Thr Leu Gln Ala Ser Lys Gln Asn Gly Thr Trp Pro Arg Glu Val Leu
                85                  90                  95

Leu Val Leu Ser Val Asn Ser Ser Val Phe Leu His Leu Gln Ala Leu
            100                 105                 110

Gly Ile Pro Leu His Leu Ala Tyr Asn Ser Ser Leu Val Thr Phe Gln
            115                 120                 125

Glu Pro Pro Gly Val Asn Thr Thr Glu Leu Pro Ser Phe Pro Lys Thr
            130                 135                 140

Gln Ile Leu Glu Trp Ala Ala Glu Arg Gly Pro Ile Thr Ser Ala Ala
145                 150                 155                 160

Glu Leu Asn Asp Pro Gln Ser Ile Leu Leu Arg Leu Gly Gln Ala Gln
                165                 170                 175

Gly Ser Leu Ser Phe Cys Met Leu Glu Ala Ser Gln Asp Met Gly Arg
            180                 185                 190

Thr Leu Glu Trp Arg Pro Arg Thr Pro Ala Leu Val Arg Gly Cys His
            195                 200                 205

Leu Glu Gly Val Ala Gly His Lys Glu Ala His Ile Leu Arg Val Leu
210                 215                 220

Pro Gly His Ser Ala Gly Pro Arg Thr Val Thr Val Lys Val Glu Leu
225                 230                 235                 240

Ser Cys Ala Pro Gly Asp Leu Asp Ala Val Leu Ile Leu Gln Gly Pro
                245                 250                 255

Pro Tyr Val Ser Trp Leu Ile Asp Ala Asn His Asn Met Gln Ile Trp
            260                 265                 270

Thr Thr Gly Glu Tyr Ser Phe Lys Ile Phe Pro Glu Lys Asn Ile Arg
            275                 280                 285

Gly Phe Lys Leu Pro Asp Thr Pro Gln Gly Leu Leu Gly Glu Ala Arg
            290                 295                 300

Met Leu Asn Ala Ser Ile Val Ala Ser Phe Val Glu Leu Pro Leu Ala
305                 310                 315                 320

Ser Ile Val Ser Leu His Ala Ser Ser Cys Gly Gly Arg Leu Gln Thr
                325                 330                 335

Ser Pro Ala Pro Ile Gln Thr Thr Pro Pro Lys Asp Thr Cys Ser Pro
            340                 345                 350

Glu Leu Leu Met Ser Leu Ile Gln Thr Lys Cys Ala Asp Asp Ala Met
            355                 360                 365

Thr Leu Val Leu Lys Lys Glu Leu Val Ala His Leu Lys Cys Thr Ile
370                 375                 380

Thr Gly Leu Thr Phe Trp Asp Pro Ser Cys Glu Ala Glu Asp Arg Gly
385                 390                 395                 400

Asp Lys Phe Val Leu Arg Ser Ala Tyr Ser Ser Cys Gly Met Gln Val
            405                 410                 415
```

```
Ser Ala Ser Met Ile Ser Asn Glu Ala Val Val Asn Ile Leu Ser Ser
                420                 425                 430

Ser Ser Pro Gln Arg Lys Lys Val His Cys Leu Asn Met Asp Ser Leu
            435                 440                 445

Ser Phe Gln Leu Gly Leu Tyr Leu Ser Pro His Phe Leu Gln Ala Ser
        450                 455                 460

Asn Thr Ile Glu Pro Gly Gln Gln Ser Phe Val Gln Val Arg Val Ser
465                 470                 475                 480

Pro Ser Val Ser Glu Phe Leu Leu Gln Leu Asp Ser Cys His Leu Asp
                485                 490                 495

Leu Gly Pro Glu Gly Gly Thr Val Glu Leu Ile Gln Gly Arg Ala Ala
            500                 505                 510

Lys Gly Asn Cys Val Ser Leu Leu Ser Pro Ser Pro Glu Gly Asp Pro
        515                 520                 525

Arg Phe Ser Phe Leu Leu His Phe Tyr Thr Val Pro Ile Pro Lys Thr
530                 535                 540

Gly Thr Leu Ser Cys Thr Val Ala Leu Arg Pro Lys Thr Gly Ser Gln
545                 550                 555                 560

Asp Gln Glu Val His Arg Thr Val Phe Met Arg Leu Asn Ile Ile Ser
                565                 570                 575

Pro Asp Leu Ser Gly Cys Thr Ser Lys Gly Leu Val Leu Pro Ala Val
            580                 585                 590

Leu Gly Ile Thr Phe Gly Ala Phe Leu Ile Gly Ala Leu Leu Thr Ala
        595                 600                 605

Ala Leu Trp Tyr Ile Tyr Ser His Thr Arg Ser Pro Ser Lys Arg Glu
610                 615                 620

Pro Val Val Ala Val Ala Ala Pro Ala Ser Ser Glu Ser Ser Ser Thr
625                 630                 635                 640

Asn His Ser Ile Gly Ser Thr Gln Ser Thr Pro Cys Ser Thr Ser Ser
                645                 650                 655

Met Ala

<210> SEQ ID NO 4
<211> LENGTH: 385
<212> TYPE: PRT
<213> ORGANISM: human

<400> SEQUENCE: 4

Met Leu Val Arg Arg Gly Ala Arg Ala Gly Pro Arg Met Pro Arg Gly
1               5                   10                  15

Trp Thr Ala Leu Cys Leu Leu Ser Leu Leu Pro Ser Gly Phe Met Ser
            20                  25                  30

Leu Asp Asn Asn Gly Thr Ala Thr Pro Glu Leu Pro Thr Gln Gly Thr
        35                  40                  45

Phe Ser Asn Val Ser Thr Asn Val Ser Tyr Gln Glu Thr Thr Thr Pro
    50                  55                  60

Ser Thr Leu Gly Ser Thr Ser Leu His Pro Val Ser Gln His Gly Asn
65                  70                  75                  80

Glu Ala Thr Thr Asn Ile Thr Glu Thr Thr Val Lys Phe Thr Ser Thr
                85                  90                  95

Ser Val Ile Thr Ser Val Tyr Gly Asn Thr Asn Ser Ser Val Gln Ser
            100                 105                 110

Gln Thr Ser Val Ile Ser Thr Val Phe Thr Thr Pro Ala Asn Val Ser
        115                 120                 125
```

```
Thr Pro Glu Thr Thr Leu Lys Pro Ser Leu Ser Pro Gly Asn Val Ser
    130                 135                 140

Asp Leu Ser Thr Thr Ser Thr Ser Leu Ala Thr Ser Pro Thr Lys Pro
145                 150                 155                 160

Tyr Thr Ser Ser Ser Pro Ile Leu Ser Asp Ile Lys Ala Glu Ile Lys
                165                 170                 175

Cys Ser Gly Ile Arg Glu Val Lys Leu Thr Gln Gly Ile Cys Leu Glu
            180                 185                 190

Gln Asn Lys Thr Ser Ser Cys Ala Glu Phe Lys Lys Asp Arg Gly Glu
        195                 200                 205

Gly Leu Ala Arg Val Leu Cys Gly Glu Glu Gln Ala Asp Ala Asp Ala
    210                 215                 220

Gly Ala Gln Val Cys Ser Leu Leu Leu Ala Gln Ser Glu Val Arg Pro
225                 230                 235                 240

Gln Cys Leu Leu Leu Val Leu Ala Asn Arg Thr Glu Ile Ser Ser Lys
                245                 250                 255

Leu Gln Leu Met Lys Lys His Gln Ser Asp Leu Lys Lys Leu Gly Ile
            260                 265                 270

Leu Asp Phe Thr Glu Gln Asp Val Ala Ser His Gln Ser Tyr Ser Gln
        275                 280                 285

Lys Thr Leu Ile Ala Leu Val Thr Ser Gly Ala Leu Leu Ala Val Leu
    290                 295                 300

Gly Ile Thr Gly Tyr Phe Leu Met Asn Arg Arg Ser Trp Ser Pro Thr
305                 310                 315                 320

Gly Glu Arg Leu Gly Glu Asp Pro Tyr Tyr Thr Glu Asn Gly Gly Gly
                325                 330                 335

Gln Gly Tyr Ser Ser Gly Pro Gly Thr Ser Pro Glu Ala Gln Gly Lys
            340                 345                 350

Ala Ser Val Asn Arg Gly Ala Gln Glu Asn Gly Thr Gly Gln Ala Thr
        355                 360                 365

Ser Arg Asn Gly His Ser Ala Arg Gln His Val Val Ala Asp Thr Glu
    370                 375                 380

Leu
385

<210> SEQ ID NO 5
<211> LENGTH: 1304
<212> TYPE: PRT
<213> ORGANISM: human

<400> SEQUENCE: 5

Met Tyr Leu Trp Leu Lys Leu Leu Ala Phe Gly Phe Ala Phe Leu Asp
1               5                   10                  15

Thr Glu Val Phe Val Thr Gly Gln Ser Pro Thr Pro Ser Pro Thr Gly
                20                  25                  30

Leu Thr Thr Ala Lys Met Pro Ser Val Pro Leu Ser Ser Asp Pro Leu
            35                  40                  45

Pro Thr His Thr Thr Ala Phe Ser Pro Ala Ser Thr Phe Glu Arg Glu
        50                  55                  60

Asn Asp Phe Ser Glu Thr Thr Thr Ser Leu Ser Pro Asp Asn Thr Ser
65                  70                  75                  80

Thr Gln Val Ser Pro Asp Ser Leu Asp Asn Ala Ser Ala Phe Asn Thr
                85                  90                  95

Thr Gly Val Ser Ser Val Gln Thr Pro His Leu Pro Thr His Ala Asp
```

```
                100             105                 110
     Ser Gln Thr Pro Ser Ala Gly Thr Asp Thr Gln Thr Phe Ser Gly Ser
                 115                 120                 125

Ala Ala Asn Ala Lys Leu Asn Pro Thr Pro Gly Ser Asn Ala Ile Ser
                 130                 135                 140

Asp Val Pro Gly Glu Arg Ser Thr Ala Ser Thr Phe Pro Thr Asp Pro
     145                 150                 155                 160

Val Ser Pro Leu Thr Thr Thr Leu Ser Leu Ala His His Ser Ser Ala
                 165                 170                 175

Ala Leu Pro Ala Arg Thr Ser Asn Thr Thr Ile Thr Ala Asn Thr Ser
                 180                 185                 190

Asp Ala Tyr Leu Asn Ala Ser Glu Thr Thr Thr Leu Ser Pro Ser Gly
                 195                 200                 205

Ser Ala Val Ile Ser Thr Thr Thr Ile Ala Thr Thr Pro Ser Lys Pro
                 210                 215                 220

Thr Cys Asp Glu Lys Tyr Ala Asn Ile Thr Val Asp Tyr Leu Tyr Asn
     225                 230                 235                 240

Lys Glu Thr Lys Leu Phe Thr Ala Lys Leu Asn Val Asn Glu Asn Val
                 245                 250                 255

Glu Cys Gly Asn Asn Thr Cys Thr Asn Asn Glu Val His Asn Leu Thr
                 260                 265                 270

Glu Cys Lys Asn Ala Ser Val Ser Ile Ser His Asn Ser Cys Thr Ala
                 275                 280                 285

Pro Asp Lys Thr Leu Ile Leu Asp Val Pro Pro Gly Val Glu Lys Phe
     290                 295                 300

Gln Leu His Asp Cys Thr Gln Val Glu Lys Ala Asp Thr Thr Ile Cys
     305                 310                 315                 320

Leu Lys Trp Lys Asn Ile Glu Thr Phe Thr Cys Asp Thr Gln Asn Ile
                 325                 330                 335

Thr Tyr Arg Phe Gln Cys Gly Asn Met Ile Phe Asp Asn Lys Glu Ile
                 340                 345                 350

Lys Leu Glu Asn Leu Glu Pro Glu His Glu Tyr Lys Cys Asp Ser Glu
                 355                 360                 365

Ile Leu Tyr Asn Asn His Lys Phe Thr Asn Ala Ser Lys Ile Ile Lys
                 370                 375                 380

Thr Asp Phe Gly Ser Pro Gly Glu Pro Gln Ile Ile Phe Cys Arg Ser
     385                 390                 395                 400

Glu Ala Ala His Gln Gly Val Ile Thr Trp Asn Pro Pro Gln Arg Ser
                 405                 410                 415

Phe His Asn Phe Thr Leu Cys Tyr Ile Lys Glu Thr Glu Lys Asp Cys
                 420                 425                 430

Leu Asn Leu Asp Lys Asn Leu Ile Lys Tyr Asp Leu Gln Asn Leu Lys
                 435                 440                 445

Pro Tyr Thr Lys Tyr Val Leu Ser Leu His Ala Tyr Ile Ile Ala Lys
                 450                 455                 460

Val Gln Arg Asn Gly Ser Ala Ala Met Cys His Phe Thr Thr Lys Ser
     465                 470                 475                 480

Ala Pro Pro Ser Gln Val Trp Asn Met Thr Val Ser Met Thr Ser Asp
                 485                 490                 495

Asn Ser Met His Val Lys Cys Arg Pro Pro Arg Asp Arg Asn Gly Pro
                 500                 505                 510

His Glu Arg Tyr His Leu Glu Val Glu Ala Gly Asn Thr Leu Val Arg
                 515                 520                 525
```

```
Asn Glu Ser His Lys Asn Cys Asp Phe Arg Val Lys Asp Leu Gln Tyr
    530                 535                 540

Ser Thr Asp Tyr Thr Phe Lys Ala Tyr Phe His Asn Gly Asp Tyr Pro
545                 550                 555                 560

Gly Glu Pro Phe Ile Leu His His Ser Thr Ser Tyr Asn Ser Lys Ala
                565                 570                 575

Leu Ile Ala Phe Leu Ala Phe Leu Ile Ile Val Thr Ser Ile Ala Leu
                580                 585                 590

Leu Val Val Leu Tyr Lys Ile Tyr Asp Leu His Lys Lys Arg Ser Cys
            595                 600                 605

Asn Leu Asp Glu Gln Gln Glu Leu Val Glu Arg Asp Asp Glu Lys Gln
    610                 615                 620

Leu Met Asn Val Glu Pro Ile His Ala Asp Ile Leu Leu Glu Thr Tyr
625                 630                 635                 640

Lys Arg Lys Ile Ala Asp Glu Gly Arg Leu Phe Leu Ala Glu Phe Gln
                645                 650                 655

Ser Ile Pro Arg Val Phe Ser Lys Phe Pro Ile Lys Glu Ala Arg Lys
            660                 665                 670

Pro Phe Asn Gln Asn Lys Asn Arg Tyr Val Asp Ile Leu Pro Tyr Asp
    675                 680                 685

Tyr Asn Arg Val Glu Leu Ser Glu Ile Asn Gly Asp Ala Gly Ser Asn
690                 695                 700

Tyr Ile Asn Ala Ser Tyr Ile Asp Gly Phe Lys Glu Pro Arg Lys Tyr
705                 710                 715                 720

Ile Ala Ala Gln Gly Pro Arg Asp Glu Thr Val Asp Asp Phe Trp Arg
                725                 730                 735

Met Ile Trp Glu Gln Lys Ala Thr Val Ile Val Met Val Thr Arg Cys
            740                 745                 750

Glu Glu Gly Asn Arg Asn Lys Cys Ala Glu Tyr Trp Pro Ser Met Glu
    755                 760                 765

Glu Gly Thr Arg Ala Phe Gly Asp Val Val Val Lys Ile Asn Gln His
770                 775                 780

Lys Arg Cys Pro Asp Tyr Ile Ile Gln Lys Leu Asn Ile Val Asn Lys
785                 790                 795                 800

Lys Glu Lys Ala Thr Gly Arg Glu Val Thr His Ile Gln Phe Thr Ser
                805                 810                 815

Trp Pro Asp His Gly Val Pro Glu Asp Pro His Leu Leu Leu Lys Leu
            820                 825                 830

Arg Arg Arg Val Asn Ala Phe Ser Asn Phe Phe Ser Gly Pro Ile Val
    835                 840                 845

Val His Cys Ser Ala Gly Val Gly Arg Thr Gly Thr Tyr Ile Gly Ile
850                 855                 860

Asp Ala Met Leu Glu Gly Leu Glu Ala Glu Asn Lys Val Asp Val Tyr
865                 870                 875                 880

Gly Tyr Val Val Lys Leu Arg Arg Gln Arg Cys Leu Met Val Gln Val
                885                 890                 895

Glu Ala Gln Tyr Ile Leu Ile His Gln Ala Leu Val Glu Tyr Asn Gln
            900                 905                 910

Phe Gly Glu Thr Glu Val Asn Leu Ser Glu Leu His Pro Tyr Leu His
    915                 920                 925

Asn Met Lys Lys Arg Asp Pro Pro Ser Glu Pro Ser Pro Leu Glu Ala
930                 935                 940
```

-continued

```
Glu Phe Gln Arg Leu Pro Ser Tyr Arg Ser Trp Arg Thr Gln His Ile
945                 950                 955                 960

Gly Asn Gln Glu Glu Asn Lys Ser Lys Asn Arg Asn Ser Asn Val Ile
            965                 970                 975

Pro Tyr Asp Tyr Asn Arg Val Pro Leu Lys His Glu Leu Glu Met Ser
            980                 985                 990

Lys Glu Ser Glu His Asp Ser Asp Glu Ser Ser Asp Asp Asp Ser Asp
        995                 1000                1005

Ser Glu Glu Pro Ser Lys Tyr Ile Asn Ala Ser Phe Ile Met Ser
    1010                1015                1020

Tyr Trp Lys Pro Glu Val Met Ile Ala Ala Gln Gly Pro Leu Lys
    1025                1030                1035

Glu Thr Ile Gly Asp Phe Trp Gln Met Ile Phe Gln Arg Lys Val
    1040                1045                1050

Lys Val Ile Val Met Leu Thr Glu Leu Lys His Gly Asp Gln Glu
    1055                1060                1065

Ile Cys Ala Gln Tyr Trp Gly Glu Gly Lys Gln Thr Tyr Gly Asp
    1070                1075                1080

Ile Glu Val Asp Leu Lys Asp Thr Asp Lys Ser Ser Thr Tyr Thr
    1085                1090                1095

Leu Arg Val Phe Glu Leu Arg His Ser Lys Arg Lys Asp Ser Arg
    1100                1105                1110

Thr Val Tyr Gln Tyr Gln Tyr Thr Asn Trp Ser Val Glu Gln Leu
    1115                1120                1125

Pro Ala Glu Pro Lys Glu Leu Ile Ser Met Ile Gln Val Val Lys
    1130                1135                1140

Gln Lys Leu Pro Gln Lys Asn Ser Ser Glu Gly Asn Lys His His
    1145                1150                1155

Lys Ser Thr Pro Leu Leu Ile His Cys Arg Asp Gly Ser Gln Gln
    1160                1165                1170

Thr Gly Ile Phe Cys Ala Leu Leu Asn Leu Leu Glu Ser Ala Glu
    1175                1180                1185

Thr Glu Glu Val Val Asp Ile Phe Gln Val Val Lys Ala Leu Arg
    1190                1195                1200

Lys Ala Arg Pro Gly Met Val Ser Thr Phe Glu Gln Tyr Gln Phe
    1205                1210                1215

Leu Tyr Asp Val Ile Ala Ser Thr Tyr Pro Ala Gln Asn Gly Gln
    1220                1225                1230

Val Lys Lys Asn Asn His Gln Glu Asp Lys Ile Glu Phe Asp Asn
    1235                1240                1245

Glu Val Asp Lys Val Lys Gln Asp Ala Asn Cys Val Asn Pro Leu
    1250                1255                1260

Gly Ala Pro Glu Lys Leu Pro Glu Ala Lys Glu Gln Ala Glu Gly
    1265                1270                1275

Ser Glu Pro Thr Ser Gly Thr Glu Gly Pro Glu His Ser Val Asn
    1280                1285                1290

Gly Pro Ala Ser Pro Ala Leu Asn Gln Gly Ser
    1295                1300

<210> SEQ ID NO 6
<211> LENGTH: 254
<212> TYPE: PRT
<213> ORGANISM: human

<400> SEQUENCE: 6
```

```
Met Ala Ile Ser Gly Val Pro Val Leu Gly Phe Phe Ile Ile Ala Val
1               5                   10                  15

Leu Met Ser Ala Gln Glu Ser Trp Ala Ile Lys Glu Glu His Val Ile
            20                  25                  30

Ile Gln Ala Glu Phe Tyr Leu Asn Pro Asp Gln Ser Gly Glu Phe Met
        35                  40                  45

Phe Asp Phe Asp Gly Asp Glu Ile Phe His Val Asp Met Ala Lys Lys
    50                  55                  60

Glu Thr Val Trp Arg Leu Glu Glu Phe Gly Arg Phe Ala Ser Phe Glu
65                  70                  75                  80

Ala Gln Gly Ala Leu Ala Asn Ile Ala Val Asp Lys Ala Asn Leu Glu
                85                  90                  95

Ile Met Thr Lys Arg Ser Asn Tyr Thr Pro Ile Thr Asn Val Pro Pro
            100                 105                 110

Glu Val Thr Val Leu Thr Asn Ser Pro Val Glu Leu Arg Glu Pro Asn
        115                 120                 125

Val Leu Ile Cys Phe Ile Asp Lys Phe Thr Pro Pro Val Val Asn Val
    130                 135                 140

Thr Trp Leu Arg Asn Gly Lys Pro Val Thr Thr Gly Val Ser Glu Thr
145                 150                 155                 160

Val Phe Leu Pro Arg Glu Asp His Leu Phe Arg Lys Phe His Tyr Leu
                165                 170                 175

Pro Phe Leu Pro Ser Thr Glu Asp Val Tyr Asp Cys Arg Val Glu His
            180                 185                 190

Trp Gly Leu Asp Glu Pro Leu Leu Lys His Trp Glu Phe Asp Ala Pro
        195                 200                 205

Ser Pro Leu Pro Glu Thr Thr Glu Asn Val Val Cys Ala Leu Gly Leu
    210                 215                 220

Thr Val Gly Leu Val Gly Ile Ile Gly Thr Ile Phe Ile Ile Lys
225                 230                 235                 240

Gly Val Arg Lys Ser Asn Ala Ala Glu Arg Arg Gly Pro Leu
                245                 250

<210> SEQ ID NO 7
<211> LENGTH: 503
<212> TYPE: PRT
<213> ORGANISM: human

<400> SEQUENCE: 7

Met Glu Ala Ala Val Ala Ala Pro Arg Pro Arg Leu Leu Leu Leu Val
1               5                   10                  15

Leu Ala Ala Ala Ala Ala Ala Ala Ala Leu Leu Pro Gly Ala Thr
            20                  25                  30

Ala Leu Gln Cys Phe Cys His Leu Cys Thr Lys Asp Asn Phe Thr Cys
        35                  40                  45

Val Thr Asp Gly Leu Cys Phe Val Ser Val Thr Glu Thr Thr Asp Lys
    50                  55                  60

Val Ile His Asn Ser Met Cys Ile Ala Glu Ile Asp Leu Ile Pro Arg
65                  70                  75                  80

Asp Arg Pro Phe Val Cys Ala Pro Ser Ser Lys Thr Gly Ser Val Thr
                85                  90                  95

Thr Thr Tyr Cys Cys Asn Gln Asp His Cys Asn Lys Ile Glu Leu Pro
            100                 105                 110

Thr Thr Val Lys Ser Ser Pro Gly Leu Gly Pro Val Glu Leu Ala Ala
```

```
                115                 120                 125
Val Ile Ala Gly Pro Val Cys Phe Val Cys Ile Ser Leu Met Leu Met
130                 135                 140

Val Tyr Ile Cys His Asn Arg Thr Val Ile His His Arg Val Pro Asn
145                 150                 155                 160

Glu Glu Asp Pro Ser Leu Asp Arg Pro Phe Ile Ser Glu Gly Thr Thr
                165                 170                 175

Leu Lys Asp Leu Ile Tyr Asp Met Thr Thr Ser Gly Ser Gly Ser Gly
                180                 185                 190

Leu Pro Leu Leu Val Gln Arg Thr Ile Ala Arg Thr Ile Val Leu Gln
                195                 200                 205

Glu Ser Ile Gly Lys Gly Arg Phe Gly Glu Val Trp Arg Gly Lys Trp
                210                 215                 220

Arg Gly Glu Glu Val Ala Val Lys Ile Phe Ser Ser Arg Glu Glu Arg
225                 230                 235                 240

Ser Trp Phe Arg Glu Ala Glu Ile Tyr Gln Thr Val Met Leu Arg His
                245                 250                 255

Glu Asn Ile Leu Gly Phe Ile Ala Ala Asp Asn Lys Asp Asn Gly Thr
                260                 265                 270

Trp Thr Gln Leu Trp Leu Val Ser Asp Tyr His Glu His Gly Ser Leu
                275                 280                 285

Phe Asp Tyr Leu Asn Arg Tyr Thr Val Thr Val Glu Gly Met Ile Lys
                290                 295                 300

Leu Ala Leu Ser Thr Ala Ser Gly Leu Ala His Leu His Met Glu Ile
305                 310                 315                 320

Val Gly Thr Gln Gly Lys Pro Ala Ile Ala His Arg Asp Leu Lys Ser
                325                 330                 335

Lys Asn Ile Leu Val Lys Lys Asn Gly Thr Cys Cys Ile Ala Asp Leu
                340                 345                 350

Gly Leu Ala Val Arg His Asp Ser Ala Thr Asp Thr Ile Asp Ile Ala
                355                 360                 365

Pro Asn His Arg Val Gly Thr Lys Arg Tyr Met Ala Pro Glu Val Leu
                370                 375                 380

Asp Asp Ser Ile Asn Met Lys His Phe Glu Ser Phe Lys Arg Ala Asp
385                 390                 395                 400

Ile Tyr Ala Met Gly Leu Val Phe Trp Glu Ile Ala Arg Arg Cys Ser
                405                 410                 415

Ile Gly Gly Ile His Glu Asp Tyr Gln Leu Pro Tyr Tyr Asp Leu Val
                420                 425                 430

Pro Ser Asp Pro Ser Val Glu Glu Met Arg Lys Val Val Cys Glu Gln
                435                 440                 445

Lys Leu Arg Pro Asn Ile Pro Asn Arg Trp Gln Ser Cys Glu Ala Leu
                450                 455                 460

Arg Val Met Ala Lys Ile Met Arg Glu Cys Trp Tyr Ala Asn Gly Ala
465                 470                 475                 480

Ala Arg Leu Thr Ala Leu Arg Ile Lys Lys Thr Leu Ser Gln Leu Ser
                485                 490                 495

Gln Gln Glu Gly Ile Lys Met
                500

<210> SEQ ID NO 8
<211> LENGTH: 232
<212> TYPE: PRT
<213> ORGANISM: human
```

<400> SEQUENCE: 8

```
Met Asn Phe Leu Leu Ser Trp Val His Trp Ser Leu Ala Leu Leu Leu
1               5                   10                  15

Tyr Leu His His Ala Lys Trp Ser Gln Ala Ala Pro Met Ala Glu Gly
                20                  25                  30

Gly Gly Gln Asn His His Glu Val Val Lys Phe Met Asp Val Tyr Gln
                35                  40                  45

Arg Ser Tyr Cys His Pro Ile Glu Thr Leu Val Asp Ile Phe Gln Glu
        50                  55                  60

Tyr Pro Asp Glu Ile Glu Tyr Ile Phe Lys Pro Ser Cys Val Pro Leu
65                  70                  75                  80

Met Arg Cys Gly Gly Cys Cys Asn Asp Glu Gly Leu Glu Cys Val Pro
                85                  90                  95

Thr Glu Glu Ser Asn Ile Thr Met Gln Ile Met Arg Ile Lys Pro His
                100                 105                 110

Gln Gly Gln His Ile Gly Glu Met Ser Phe Leu Gln His Asn Lys Cys
                115                 120                 125

Glu Cys Arg Pro Lys Lys Asp Arg Ala Arg Gln Glu Lys Lys Ser Val
        130                 135                 140

Arg Gly Lys Gly Lys Gly Gln Lys Arg Lys Arg Lys Lys Ser Arg Tyr
145                 150                 155                 160

Lys Ser Trp Ser Val Tyr Val Gly Ala Arg Cys Cys Leu Met Pro Trp
                165                 170                 175

Ser Leu Pro Gly Pro His Pro Cys Gly Pro Cys Ser Glu Arg Arg Lys
                180                 185                 190

His Leu Phe Val Gln Asp Pro Gln Thr Cys Lys Cys Ser Cys Lys Asn
                195                 200                 205

Thr Asp Ser Arg Cys Lys Ala Arg Gln Leu Glu Leu Asn Glu Arg Thr
        210                 215                 220

Cys Arg Cys Asp Lys Pro Arg Arg
225                 230
```

<210> SEQ ID NO 9
<211> LENGTH: 1089
<212> TYPE: PRT
<213> ORGANISM: human

<400> SEQUENCE: 9

```
Met Gly Thr Ser His Pro Ala Phe Leu Val Leu Gly Cys Leu Leu Thr
1               5                   10                  15

Gly Leu Ser Leu Ile Leu Cys Gln Leu Ser Leu Pro Ser Ile Leu Pro
                20                  25                  30

Asn Glu Asn Glu Lys Val Val Gln Leu Asn Ser Ser Phe Ser Leu Arg
                35                  40                  45

Cys Phe Gly Glu Ser Glu Val Ser Trp Gln Tyr Pro Met Ser Glu Glu
        50                  55                  60

Glu Ser Ser Asp Val Glu Ile Arg Asn Glu Glu Asn Ser Gly Leu
65                  70                  75                  80

Phe Val Thr Val Leu Glu Val Ser Ser Ala Ser Ala Ala His Thr Gly
                85                  90                  95

Leu Tyr Thr Cys Tyr Tyr Asn His Thr Gln Thr Glu Glu Asn Glu Leu
                100                 105                 110

Glu Gly Arg His Ile Tyr Ile Tyr Val Pro Asp Pro Asp Val Ala Phe
                115                 120                 125
```

```
Val Pro Leu Gly Met Thr Asp Tyr Leu Val Ile Val Glu Asp Asp
    130                 135                 140

Ser Ala Ile Ile Pro Cys Arg Thr Thr Asp Pro Glu Thr Pro Val Thr
145                 150                 155                 160

Leu His Asn Ser Glu Gly Val Val Pro Ala Ser Tyr Asp Ser Arg Gln
                165                 170                 175

Gly Phe Asn Gly Thr Phe Thr Val Gly Pro Tyr Ile Cys Glu Ala Thr
            180                 185                 190

Val Lys Gly Lys Lys Phe Gln Thr Ile Pro Phe Asn Val Tyr Ala Leu
        195                 200                 205

Lys Ala Thr Ser Glu Leu Asp Leu Glu Met Glu Ala Leu Lys Thr Val
210                 215                 220

Tyr Lys Ser Gly Glu Thr Ile Val Val Thr Cys Ala Val Phe Asn Asn
225                 230                 235                 240

Glu Val Val Asp Leu Gln Trp Thr Tyr Pro Gly Glu Val Lys Gly Lys
                245                 250                 255

Gly Ile Thr Met Leu Glu Glu Ile Lys Val Pro Ser Ile Lys Leu Val
            260                 265                 270

Tyr Thr Leu Thr Val Pro Glu Ala Thr Val Lys Asp Ser Gly Asp Tyr
        275                 280                 285

Glu Cys Ala Ala Arg Gln Ala Thr Arg Glu Val Lys Glu Met Lys Lys
290                 295                 300

Val Thr Ile Ser Val His Glu Lys Gly Phe Ile Glu Ile Lys Pro Thr
305                 310                 315                 320

Phe Ser Gln Leu Glu Ala Val Asn Leu His Glu Val Lys His Phe Val
                325                 330                 335

Val Glu Val Arg Ala Tyr Pro Pro Arg Ile Ser Trp Leu Lys Asn
            340                 345                 350

Asn Leu Thr Leu Ile Glu Asn Leu Thr Glu Ile Thr Thr Asp Val Glu
        355                 360                 365

Lys Ile Gln Glu Ile Arg Tyr Arg Ser Lys Leu Lys Leu Ile Arg Ala
370                 375                 380

Lys Glu Glu Asp Ser Gly His Tyr Thr Ile Val Ala Gln Asn Glu Asp
385                 390                 395                 400

Ala Val Lys Ser Tyr Thr Phe Glu Leu Leu Thr Gln Val Pro Ser Ser
                405                 410                 415

Ile Leu Asp Leu Val Asp Asp His His Gly Ser Thr Gly Gly Gln Thr
            420                 425                 430

Val Arg Cys Thr Ala Glu Gly Thr Pro Leu Pro Asp Ile Glu Trp Met
        435                 440                 445

Ile Cys Lys Asp Ile Lys Lys Cys Asn Asn Glu Thr Ser Trp Thr Ile
450                 455                 460

Leu Ala Asn Asn Val Ser Asn Ile Ile Thr Glu Ile His Ser Arg Asp
465                 470                 475                 480

Arg Ser Thr Val Glu Gly Arg Val Thr Phe Ala Lys Val Glu Glu Thr
                485                 490                 495

Ile Ala Val Arg Cys Leu Ala Lys Asn Leu Leu Gly Ala Glu Asn Arg
            500                 505                 510

Glu Leu Lys Leu Val Ala Pro Thr Leu Arg Ser Glu Leu Thr Val Ala
        515                 520                 525

Ala Ala Val Leu Val Leu Leu Val Ile Val Ile Ile Ser Leu Ile Val
530                 535                 540
```

-continued

Leu Val Val Ile Trp Lys Gln Lys Pro Arg Tyr Glu Ile Arg Trp Arg
545                 550                 555                 560

Val Ile Glu Ser Ile Ser Pro Asp Gly His Glu Tyr Ile Tyr Val Asp
                565                 570                 575

Pro Met Gln Leu Pro Tyr Asp Ser Arg Trp Glu Phe Pro Arg Asp Gly
            580                 585                 590

Leu Val Leu Gly Arg Val Leu Gly Ser Gly Ala Phe Gly Lys Val Val
        595                 600                 605

Glu Gly Thr Ala Tyr Gly Leu Ser Arg Ser Gln Pro Val Met Lys Val
    610                 615                 620

Ala Val Lys Met Leu Lys Pro Thr Ala Arg Ser Ser Glu Lys Gln Ala
625                 630                 635                 640

Leu Met Ser Glu Leu Lys Ile Met Thr His Leu Gly Pro His Leu Asn
                645                 650                 655

Ile Val Asn Leu Leu Gly Ala Cys Thr Lys Ser Gly Pro Ile Tyr Ile
            660                 665                 670

Ile Thr Glu Tyr Cys Phe Tyr Gly Asp Leu Val Asn Tyr Leu His Lys
        675                 680                 685

Asn Arg Asp Ser Phe Leu Ser His His Pro Glu Lys Pro Lys Lys Glu
    690                 695                 700

Leu Asp Ile Phe Gly Leu Asn Pro Ala Asp Glu Ser Thr Arg Ser Tyr
705                 710                 715                 720

Val Ile Leu Ser Phe Glu Asn Asn Gly Asp Tyr Met Asp Met Lys Gln
                725                 730                 735

Ala Asp Thr Thr Gln Tyr Val Pro Met Leu Glu Arg Lys Glu Val Ser
            740                 745                 750

Lys Tyr Ser Asp Ile Gln Arg Ser Leu Tyr Asp Arg Pro Ala Ser Tyr
        755                 760                 765

Lys Lys Lys Ser Met Leu Asp Ser Glu Val Lys Asn Leu Leu Ser Asp
    770                 775                 780

Asp Asn Ser Glu Gly Leu Thr Leu Leu Asp Leu Leu Ser Phe Thr Tyr
785                 790                 795                 800

Gln Val Ala Arg Gly Met Glu Phe Leu Ala Ser Lys Asn Cys Val His
                805                 810                 815

Arg Asp Leu Ala Ala Arg Asn Val Leu Leu Ala Gln Gly Lys Ile Val
            820                 825                 830

Lys Ile Cys Asp Phe Gly Leu Ala Arg Asp Ile Met His Asp Ser Asn
        835                 840                 845

Tyr Val Ser Lys Gly Ser Thr Phe Leu Pro Val Lys Trp Met Ala Pro
    850                 855                 860

Glu Ser Ile Phe Asp Asn Leu Tyr Thr Thr Leu Ser Asp Val Trp Ser
865                 870                 875                 880

Tyr Gly Ile Leu Leu Trp Glu Ile Phe Ser Leu Gly Gly Thr Pro Tyr
                885                 890                 895

Pro Gly Met Met Val Asp Ser Thr Phe Tyr Asn Lys Ile Lys Ser Gly
            900                 905                 910

Tyr Arg Met Ala Lys Pro Asp His Ala Thr Ser Glu Val Tyr Glu Ile
        915                 920                 925

Met Val Lys Cys Trp Asn Ser Glu Pro Glu Lys Arg Pro Ser Phe Tyr
    930                 935                 940

His Leu Ser Glu Ile Val Glu Asn Leu Leu Pro Gly Gln Tyr Lys Lys
945                 950                 955                 960

Ser Tyr Glu Lys Ile His Leu Asp Phe Leu Lys Ser Asp His Pro Ala

```
                   965                 970                 975
Val Ala Arg Met Arg Val Asp Ser Asp Asn Ala Tyr Ile Gly Val Thr
            980                 985                 990

Tyr Lys Asn Glu Glu Asp Lys Leu Lys Asp Trp Glu Gly Gly Leu Asp
            995                1000                1005

Glu Gln Arg Leu Ser Ala Asp Ser Gly Tyr Ile Ile Pro Leu Pro
       1010                1015                1020

Asp Ile Asp Pro Val Pro Glu Glu Glu Asp Leu Gly Lys Arg Asn
       1025                1030                1035

Arg His Ser Ser Gln Thr Ser Glu Glu Ser Ala Ile Glu Thr Gly
       1040                1045                1050

Ser Ser Ser Ser Thr Phe Ile Lys Arg Glu Asp Glu Thr Ile Glu
       1055                1060                1065

Asp Ile Asp Met Met Asp Asp Ile Gly Ile Asp Ser Ser Asp Leu
       1070                1075                1080

Val Glu Asp Ser Phe Leu
       1085

<210> SEQ ID NO 10
<211> LENGTH: 498
<212> TYPE: PRT
<213> ORGANISM: human

<400> SEQUENCE: 10

Met Thr Val Phe Leu Ser Phe Ala Phe Leu Ala Ala Ile Leu Thr His
1               5                   10                  15

Ile Gly Cys Ser Asn Gln Arg Arg Ser Pro Glu Asn Ser Gly Arg Arg
            20                  25                  30

Tyr Asn Arg Ile Gln His Gly Gln Cys Ala Tyr Thr Phe Ile Leu Pro
        35                  40                  45

Glu His Asp Gly Asn Cys Arg Glu Ser Thr Thr Asp Gln Tyr Asn Thr
    50                  55                  60

Asn Ala Leu Gln Arg Asp Ala Pro His Val Glu Pro Asp Phe Ser Ser
65                  70                  75                  80

Gln Lys Leu Gln His Leu Glu His Val Met Glu Asn Tyr Thr Gln Trp
                85                  90                  95

Leu Gln Lys Leu Glu Asn Tyr Ile Val Glu Asn Met Lys Ser Glu Met
            100                 105                 110

Ala Gln Ile Gln Gln Asn Ala Val Gln Asn His Thr Ala Thr Met Leu
        115                 120                 125

Glu Ile Gly Thr Ser Leu Leu Ser Gln Thr Ala Glu Gln Thr Arg Lys
    130                 135                 140

Leu Thr Asp Val Glu Thr Gln Val Leu Asn Gln Thr Ser Arg Leu Glu
145                 150                 155                 160

Ile Gln Leu Leu Glu Asn Ser Leu Ser Thr Tyr Lys Leu Glu Lys Gln
                165                 170                 175

Leu Leu Gln Gln Thr Asn Glu Ile Leu Lys Ile His Glu Lys Asn Ser
            180                 185                 190

Leu Leu Glu His Lys Ile Leu Glu Met Glu Gly Lys His Lys Glu Glu
        195                 200                 205

Leu Asp Thr Leu Lys Glu Glu Lys Glu Asn Leu Gln Gly Leu Val Thr
    210                 215                 220

Arg Gln Thr Tyr Ile Ile Gln Glu Leu Glu Lys Gln Leu Asn Arg Ala
225                 230                 235                 240
```

```
Thr Thr Asn Asn Ser Val Leu Gln Lys Gln Gln Leu Glu Leu Met Asp
            245                 250                 255

Thr Val His Asn Leu Val Asn Leu Cys Thr Lys Glu Gly Val Leu Leu
            260                 265                 270

Lys Gly Gly Lys Arg Glu Glu Lys Pro Phe Arg Asp Cys Ala Asp
            275                 280                 285

Val Tyr Gln Ala Gly Phe Asn Lys Ser Gly Ile Tyr Thr Ile Tyr Ile
            290                 295                 300

Asn Asn Met Pro Glu Pro Lys Lys Val Phe Cys Asn Met Asp Val Asn
305                 310                 315                 320

Gly Gly Gly Trp Thr Val Ile Gln His Arg Glu Asp Gly Ser Leu Asp
            325                 330                 335

Phe Gln Arg Gly Trp Lys Glu Tyr Lys Met Gly Phe Gly Asn Pro Ser
            340                 345                 350

Gly Glu Tyr Trp Leu Gly Asn Glu Phe Ile Phe Ala Ile Thr Ser Gln
            355                 360                 365

Arg Gln Tyr Met Leu Arg Ile Glu Leu Met Asp Trp Glu Gly Asn Arg
            370                 375                 380

Ala Tyr Ser Gln Tyr Asp Arg Phe His Ile Gly Asn Glu Lys Gln Asn
385                 390                 395                 400

Tyr Arg Leu Tyr Leu Lys Gly His Thr Gly Thr Ala Gly Lys Gln Ser
            405                 410                 415

Ser Leu Ile Leu His Gly Ala Asp Phe Ser Thr Lys Asp Ala Asp Asn
            420                 425                 430

Asp Asn Cys Met Cys Lys Cys Ala Leu Met Leu Thr Gly Gly Trp Trp
            435                 440                 445

Phe Asp Ala Cys Gly Pro Ser Asn Leu Asn Gly Met Phe Tyr Thr Ala
            450                 455                 460

Gly Gln Asn His Gly Lys Leu Asn Gly Ile Lys Trp His Tyr Phe Lys
465                 470                 475                 480

Gly Pro Ser Tyr Ser Leu Arg Ser Thr Thr Met Met Ile Arg Pro Leu
            485                 490                 495

Asp Phe

<210> SEQ ID NO 11
<211> LENGTH: 728
<212> TYPE: PRT
<213> ORGANISM: human

<400> SEQUENCE: 11

Met Trp Val Thr Lys Leu Leu Pro Ala Leu Leu Leu Gln His Val Leu
1               5                   10                  15

Leu His Leu Leu Leu Leu Pro Ile Ala Ile Pro Tyr Ala Glu Gly Gln
            20                  25                  30

Arg Lys Arg Arg Asn Thr Ile His Glu Phe Lys Lys Ser Ala Lys Thr
            35                  40                  45

Thr Leu Ile Lys Ile Asp Pro Ala Leu Lys Ile Lys Thr Lys Lys Val
            50                  55                  60

Asn Thr Ala Asp Gln Cys Ala Asn Arg Cys Thr Arg Asn Lys Gly Leu
65                  70                  75                  80

Pro Phe Thr Cys Lys Ala Phe Val Phe Asp Lys Ala Arg Lys Gln Cys
            85                  90                  95

Leu Trp Phe Pro Phe Asn Ser Met Ser Ser Gly Val Lys Lys Glu Phe
            100                 105                 110
```

-continued

```
Gly His Glu Phe Asp Leu Tyr Glu Asn Lys Asp Tyr Ile Arg Asn Cys
            115                 120                 125

Ile Ile Gly Lys Gly Arg Ser Tyr Lys Gly Thr Val Ser Ile Thr Lys
        130                 135                 140

Ser Gly Ile Lys Cys Gln Pro Trp Ser Ser Met Ile Pro His Glu His
145                 150                 155                 160

Ser Phe Leu Pro Ser Ser Tyr Arg Gly Lys Asp Leu Gln Glu Asn Tyr
                165                 170                 175

Cys Arg Asn Pro Arg Gly Glu Glu Gly Pro Trp Cys Phe Thr Ser
            180                 185                 190

Asn Pro Glu Val Arg Tyr Glu Val Cys Asp Ile Pro Gln Cys Ser Glu
            195                 200                 205

Val Glu Cys Met Thr Cys Asn Gly Glu Ser Tyr Arg Gly Leu Met Asp
210                 215                 220

His Thr Glu Ser Gly Lys Ile Cys Gln Arg Trp Asp His Gln Thr Pro
225                 230                 235                 240

His Arg His Lys Phe Leu Pro Glu Arg Tyr Pro Asp Lys Gly Phe Asp
                245                 250                 255

Asp Asn Tyr Cys Arg Asn Pro Asp Gly Gln Pro Arg Pro Trp Cys Tyr
            260                 265                 270

Thr Leu Asp Pro His Thr Arg Trp Glu Tyr Cys Ala Ile Lys Thr Cys
        275                 280                 285

Ala Asp Asn Thr Met Asn Asp Thr Asp Val Pro Leu Glu Thr Thr Glu
        290                 295                 300

Cys Ile Gln Gly Gln Gly Glu Gly Tyr Arg Gly Thr Val Asn Thr Ile
305                 310                 315                 320

Trp Asn Gly Ile Pro Cys Gln Arg Trp Asp Ser Gln Tyr Pro His Glu
                325                 330                 335

His Asp Met Thr Pro Glu Asn Phe Lys Cys Lys Asp Leu Arg Glu Asn
            340                 345                 350

Tyr Cys Arg Asn Pro Asp Gly Ser Glu Ser Pro Trp Cys Phe Thr Thr
        355                 360                 365

Asp Pro Asn Ile Arg Val Gly Tyr Cys Ser Gln Ile Pro Asn Cys Asp
        370                 375                 380

Met Ser His Gly Gln Asp Cys Tyr Arg Gly Asn Gly Lys Asn Tyr Met
385                 390                 395                 400

Gly Asn Leu Ser Gln Thr Arg Ser Gly Leu Thr Cys Ser Met Trp Asp
                405                 410                 415

Lys Asn Met Glu Asp Leu His Arg His Ile Phe Trp Glu Pro Asp Ala
            420                 425                 430

Ser Lys Leu Asn Glu Asn Tyr Cys Arg Asn Pro Asp Asp Ala His
        435                 440                 445

Gly Pro Trp Cys Tyr Thr Gly Asn Pro Leu Ile Pro Trp Asp Tyr Cys
        450                 455                 460

Pro Ile Ser Arg Cys Glu Gly Asp Thr Thr Pro Thr Ile Val Asn Leu
465                 470                 475                 480

Asp His Pro Val Ile Ser Cys Ala Lys Thr Lys Gln Leu Arg Val Val
                485                 490                 495

Asn Gly Ile Pro Thr Arg Thr Asn Ile Gly Trp Met Val Ser Leu Arg
            500                 505                 510

Tyr Arg Asn Lys His Ile Cys Gly Gly Ser Leu Ile Lys Glu Ser Trp
        515                 520                 525

Val Leu Thr Ala Arg Gln Cys Phe Pro Ser Arg Asp Leu Lys Asp Tyr
```

```
                   530                 535                 540
Glu Ala Trp Leu Gly Ile His Asp Val His Gly Arg Gly Asp Glu Lys
545                 550                 555                 560

Cys Lys Gln Val Leu Asn Val Ser Gln Leu Val Tyr Gly Pro Glu Gly
                565                 570                 575

Ser Asp Leu Val Leu Met Lys Leu Ala Arg Pro Ala Val Leu Asp Asp
                580                 585                 590

Phe Val Ser Thr Ile Asp Leu Pro Asn Tyr Gly Cys Thr Ile Pro Glu
                595                 600                 605

Lys Thr Ser Cys Ser Val Tyr Gly Trp Gly Tyr Thr Gly Leu Ile Asn
                610                 615                 620

Tyr Asp Gly Leu Leu Arg Val Ala His Leu Tyr Ile Met Gly Asn Glu
625                 630                 635                 640

Lys Cys Ser Gln His His Arg Gly Lys Val Thr Leu Asn Glu Ser Glu
                645                 650                 655

Ile Cys Ala Gly Ala Glu Lys Ile Gly Ser Gly Pro Cys Glu Gly Asp
                660                 665                 670

Tyr Gly Gly Pro Leu Val Cys Glu Gln His Lys Met Arg Met Val Leu
                675                 680                 685

Gly Val Ile Val Pro Gly Arg Gly Cys Ala Ile Pro Asn Arg Pro Gly
                690                 695                 700

Ile Phe Val Arg Val Ala Tyr Tyr Ala Lys Trp Ile His Lys Ile Ile
705                 710                 715                 720

Leu Thr Tyr Lys Val Pro Gln Ser
                725

<210> SEQ ID NO 12
<211> LENGTH: 241
<212> TYPE: PRT
<213> ORGANISM: human

<400> SEQUENCE: 12

Met Asn Arg Cys Trp Ala Leu Phe Leu Ser Leu Cys Cys Tyr Leu Arg
1               5                   10                  15

Leu Val Ser Ala Glu Gly Asp Pro Ile Pro Glu Glu Leu Tyr Glu Met
                20                  25                  30

Leu Ser Asp His Ser Ile Arg Ser Phe Asp Asp Leu Gln Arg Leu Leu
                35                  40                  45

His Gly Asp Pro Gly Glu Glu Asp Gly Ala Glu Leu Asp Leu Asn Met
                50                  55                  60

Thr Arg Ser His Ser Gly Gly Glu Leu Glu Ser Leu Ala Arg Gly Arg
65                  70                  75                  80

Arg Ser Leu Gly Ser Leu Thr Ile Ala Glu Pro Ala Met Ile Ala Glu
                85                  90                  95

Cys Lys Thr Arg Thr Glu Val Phe Glu Ile Ser Arg Arg Leu Ile Asp
                100                 105                 110

Arg Thr Asn Ala Asn Phe Leu Val Trp Pro Pro Cys Val Glu Val Gln
                115                 120                 125

Arg Cys Ser Gly Cys Cys Asn Asn Arg Asn Val Gln Cys Arg Pro Thr
                130                 135                 140

Gln Val Gln Leu Arg Pro Val Gln Val Arg Lys Ile Glu Ile Val Arg
145                 150                 155                 160

Lys Lys Pro Ile Phe Lys Lys Ala Thr Val Thr Leu Glu Asp His Leu
                165                 170                 175
```

```
Ala Cys Lys Cys Glu Thr Val Ala Ala Ala Arg Pro Val Thr Arg Ser
            180                 185                 190

Pro Gly Gly Ser Gln Glu Gln Arg Ala Lys Thr Pro Gln Thr Arg Val
        195                 200                 205

Thr Ile Arg Thr Val Arg Val Arg Arg Pro Pro Lys Gly Lys His Arg
        210                 215                 220

Lys Phe Lys His Thr His Asp Lys Thr Ala Leu Lys Glu Thr Leu Gly
225                 230                 235                 240

Ala

<210> SEQ ID NO 13
<211> LENGTH: 178
<212> TYPE: PRT
<213> ORGANISM: human

<400> SEQUENCE: 13

Met His Ser Ser Ala Leu Leu Cys Cys Leu Val Leu Leu Thr Gly Val
1               5                   10                  15

Arg Ala Ser Pro Gly Gln Gly Thr Gln Ser Glu Asn Ser Cys Thr His
            20                  25                  30

Phe Pro Gly Asn Leu Pro Asn Met Leu Arg Asp Leu Arg Asp Ala Phe
        35                  40                  45

Ser Arg Val Lys Thr Phe Phe Gln Met Lys Asp Gln Leu Asp Asn Leu
    50                  55                  60

Leu Leu Lys Glu Ser Leu Leu Glu Asp Phe Lys Gly Tyr Leu Gly Cys
65                  70                  75                  80

Gln Ala Leu Ser Glu Met Ile Gln Phe Tyr Leu Glu Glu Val Met Pro
                85                  90                  95

Gln Ala Glu Asn Gln Asp Pro Asp Ile Lys Ala His Val Asn Ser Leu
            100                 105                 110

Gly Glu Asn Leu Lys Thr Leu Arg Leu Arg Leu Arg Arg Cys His Arg
        115                 120                 125

Phe Leu Pro Cys Glu Asn Lys Ser Lys Ala Val Glu Gln Val Lys Asn
130                 135                 140

Ala Phe Asn Lys Leu Gln Glu Lys Gly Ile Tyr Lys Ala Met Ser Glu
145                 150                 155                 160

Phe Asp Ile Phe Ile Asn Tyr Ile Glu Ala Tyr Met Thr Met Lys Ile
                165                 170                 175

Arg Asn
```